US008745499B2

(12) United States Patent
Pendergast et al.

(10) Patent No.: US 8,745,499 B2
(45) Date of Patent: Jun. 3, 2014

(54) TIMELINE SEARCH AND INDEX

(75) Inventors: Colleen Pendergast, Livermore, CA (US); Mike Stern, San Francisco, CA (US); Adam J. Leonard, Cambridge, MA (US); Linda L. Dong, Holliston, MA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 13/115,973

(22) Filed: May 25, 2011

(65) Prior Publication Data

US 2012/0210220 A1   Aug. 16, 2012

Related U.S. Application Data

(63) Continuation-in-part of application No. 13/111,912, filed on May 19, 2011.

(60) Provisional application No. 61/443,709, filed on Feb. 16, 2011, provisional application No. 61/443,707, filed on Feb. 16, 2011, provisional application No. 61/437,517, filed on Jan. 28, 2011, provisional application No. 61/443,702, filed on Feb. 16, 2011, provisional application No. 61/443,704, filed on Feb. 16, 2011.

(51) Int. Cl.
   *G06F 3/00*   (2006.01)
(52) U.S. Cl.
   USPC ............................................ 715/721; 715/713
(58) Field of Classification Search
   CPC ........................................................ G06F 3/00
   USPC ........................................ 715/721, 769, 713
   See application file for complete search history.

(56) References Cited

U.S. PATENT DOCUMENTS

| 5,521,841 | A | 5/1996  | Arman et al.    |
| 5,659,539 | A | 8/1997  | Porter et al.   |
| 5,659,792 | A | 8/1997  | Walmsley        |
| 5,664,216 | A | 9/1997  | Blumenau        |
| 5,682,326 | A | 10/1997 | Klingler et al. |
| 5,732,184 | A | 3/1998  | Chao et al.     |
| 5,781,188 | A | 7/1998  | Amiot et al.    |

(Continued)

FOREIGN PATENT DOCUMENTS

| WO | WO 2007/120694 | 10/2007 |
| WO | WO 2009/026159 | 2/2009  |
| WO | WO 2009/114134 | 9/2009  |
| WO | WO 2010/106586 | 9/2010  |

OTHER PUBLICATIONS

U.S. Appl. No. 13/155,966, filed May 25, 2011, Pendergast, Colleen, et al.

(Continued)

*Primary Examiner* — Doon Chow
*Assistant Examiner* — Le Nguyen
(74) *Attorney, Agent, or Firm* — Adeli LLP

(57) ABSTRACT

Some embodiments provide a timeline search tool for searching and navigating a timeline. The timeline search tool includes a search field that allows a user to search for clips. In some embodiments, each clip in the list of clips is selectable such that a selection of the clip causes the timeline to navigate to the position of the clip in the timeline. In some embodiments, the timeline search tool allows a user to search for clips based on keywords or markers.

26 Claims, 60 Drawing Sheets

(56) References Cited

U.S. PATENT DOCUMENTS

| | | | |
|---|---|---|---|
| 5,930,446 A | 7/1999 | Kanda | |
| 6,134,380 A | 10/2000 | Kushizaki | |
| 6,144,375 A | 11/2000 | Jain et al. | |
| 6,154,600 A | 11/2000 | Newman et al. | |
| 6,154,601 A | 11/2000 | Yaegashi et al. | |
| 6,161,115 A | 12/2000 | Ohanian | |
| 6,366,296 B1 | 4/2002 | Boreczky et al. | |
| 6,476,826 B1 | 11/2002 | Plotkin et al. | |
| 6,477,315 B1 | 11/2002 | Ohomori | |
| 6,539,163 B1 | 3/2003 | Sheasby et al. | |
| 6,546,399 B1 | 4/2003 | Reed et al. | |
| 6,628,303 B1 | 9/2003 | Foreman et al. | |
| 6,629,104 B1 | 9/2003 | Parulski et al. | |
| 6,650,826 B1 | 11/2003 | Hatta | |
| 6,658,194 B1 | 12/2003 | Omori | |
| 6,674,955 B2 | 1/2004 | Matsui et al. | |
| 6,741,996 B1 | 5/2004 | Brechner et al. | |
| 6,744,968 B1 | 6/2004 | Imai et al. | |
| 6,928,613 B1 | 8/2005 | Ishii et al. | |
| 7,035,435 B2 | 4/2006 | Li et al. | |
| 7,035,463 B1 | 4/2006 | Monobe et al. | |
| 7,062,713 B2 | 6/2006 | Schriever et al. | |
| 7,073,127 B2 | 7/2006 | Zhao et al. | |
| 7,313,755 B2 | 12/2007 | Rahman et al. | |
| 7,325,199 B1 | 1/2008 | Reid | |
| 7,336,264 B2 | 2/2008 | Cajolet et al. | |
| 7,432,940 B2 | 10/2008 | Brook et al. | |
| 7,434,155 B2 | 10/2008 | Lee | |
| 7,437,674 B2 | 10/2008 | Chen | |
| 7,444,593 B1 | 10/2008 | Reid | |
| 7,480,864 B2 | 1/2009 | Brook et al. | |
| 7,668,869 B2 | 2/2010 | Weinberger et al. | |
| 7,710,439 B2 | 5/2010 | Reid et al. | |
| 7,720,349 B2 | 5/2010 | Ogikubo | |
| 7,890,867 B1 | 2/2011 | Margulis | |
| 7,975,062 B2 | 7/2011 | Krikorian et al. | |
| 2001/0036356 A1 | 11/2001 | Weaver et al. | |
| 2001/0056434 A1 | 12/2001 | Kaplan et al. | |
| 2002/0023103 A1 | 2/2002 | Gagne | |
| 2002/0069218 A1 | 6/2002 | Sull et al. | |
| 2003/0002715 A1 | 1/2003 | Kowald | |
| 2003/0090504 A1 | 5/2003 | Brook et al. | |
| 2003/0234803 A1 | 12/2003 | Toyama et al. | |
| 2004/0027369 A1 | 2/2004 | Kellock et al. | |
| 2004/0078761 A1 | 4/2004 | Ohanian | |
| 2004/0098379 A1 | 5/2004 | Huang | |
| 2004/0125124 A1 | 7/2004 | Kim et al. | |
| 2004/0151469 A1 | 8/2004 | Engholm et al. | |
| 2004/0201609 A1 | 10/2004 | Obrador | |
| 2004/0212637 A1 | 10/2004 | Varghese | |
| 2004/0268224 A1* | 12/2004 | Balkus et al. | 715/500.1 |
| 2005/0120127 A1* | 6/2005 | Bradley et al. | 709/231 |
| 2005/0183041 A1* | 8/2005 | Chiu et al. | 715/850 |
| 2005/0257152 A1* | 11/2005 | Shimizu et al. | 715/723 |
| 2006/0008247 A1 | 1/2006 | Minami et al. | |
| 2006/0015811 A1* | 1/2006 | Tanaka et al. | 715/531 |
| 2006/0136556 A1 | 6/2006 | Stevens et al. | |
| 2006/0155684 A1 | 7/2006 | Liu et al. | |
| 2006/0233514 A1 | 10/2006 | Weng et al. | |
| 2006/0242164 A1 | 10/2006 | Evans et al. | |
| 2006/0253781 A1 | 11/2006 | Pea et al. | |
| 2006/0277454 A1 | 12/2006 | Chen | |
| 2007/0079321 A1* | 4/2007 | Ott | 725/18 |
| 2007/0124282 A1 | 5/2007 | Wittkotter | |
| 2007/0136656 A1* | 6/2007 | Nydam et al. | 715/512 |
| 2007/0154190 A1 | 7/2007 | Gilley et al. | |
| 2007/0203945 A1 | 8/2007 | Louw | |
| 2007/0204238 A1* | 8/2007 | Hua et al. | 715/838 |
| 2007/0240072 A1* | 10/2007 | Cunningham et al. | 715/764 |
| 2007/0266304 A1* | 11/2007 | Fletcher et al. | 715/500.1 |
| 2008/0072166 A1 | 3/2008 | Reddy | |
| 2008/0104127 A1 | 5/2008 | Billmaier et al. | |
| 2008/0120328 A1 | 5/2008 | Delgo et al. | |
| 2008/0126191 A1 | 5/2008 | Schiavi | |
| 2008/0138034 A1 | 6/2008 | Hiroi et al. | |
| 2008/0155459 A1 | 6/2008 | Ubillos | |
| 2008/0184121 A1* | 7/2008 | Kulas | 715/723 |
| 2009/0006475 A1 | 1/2009 | Udezue et al. | |
| 2009/0031239 A1 | 1/2009 | Coleran et al. | |
| 2009/0089690 A1 | 4/2009 | Chi et al. | |
| 2009/0182644 A1 | 7/2009 | Panagopulos et al. | |
| 2009/0201316 A1 | 8/2009 | Bhatt et al. | |
| 2009/0249185 A1* | 10/2009 | Datar et al. | 715/230 |
| 2009/0254825 A1 | 10/2009 | Sichart et al. | |
| 2009/0259623 A1 | 10/2009 | Mooneyham et al. | |
| 2010/0050080 A1 | 2/2010 | Libert et al. | |
| 2010/0063961 A1 | 3/2010 | Guiheneuf et al. | |
| 2010/0077289 A1 | 3/2010 | Das et al. | |
| 2010/0082585 A1* | 4/2010 | Barsook et al. | 707/706 |
| 2010/0083173 A1 | 4/2010 | Germann et al. | |
| 2010/0158471 A1* | 6/2010 | Ogikubo | 386/52 |
| 2010/0281366 A1 | 11/2010 | Langmacher et al. | |
| 2010/0281377 A1 | 11/2010 | Meaney et al. | |
| 2010/0281378 A1 | 11/2010 | Pendergast et al. | |
| 2010/0281386 A1 | 11/2010 | Lyons et al. | |
| 2011/0010624 A1* | 1/2011 | Vanslette et al. | 715/704 |
| 2011/0072037 A1 | 3/2011 | Lotzer | |
| 2011/0116769 A1* | 5/2011 | Sugiyama et al. | 386/282 |
| 2012/0017153 A1* | 1/2012 | Matsuda et al. | 715/725 |
| 2013/0132839 A1* | 5/2013 | Berry | 715/719 |

OTHER PUBLICATIONS

U.S. Appl. No. 13/115,970, filed May 25, 2011, Agnoli, Giovanni, et al.

U.S. Appl. No. 13/250,853, filed Sep. 30, 2011, Eppolito, Aaron M., et al.

U.S. Appl. No. 13/250,855, filed Sep. 30, 2011, Eppolito, Aaron M.

U.S. Appl. No. 13/250,857, filed Sep. 30, 2011, Eppolito, Aaron M., et al.

U.S. Appl. No. 13/400,539, filed Feb. 20, 2012, Agnoli, Giovanni, et al.

U.S. Appl. No. 13/400,540, filed Feb. 20, 2012, Pendergast, Colleen, et al.

U.S. Appl. No. 13/400,542, filed Feb. 20, 2012, Pendergast, Colleen, et al.

U.S. Appl. No. 13/400,545, filed Feb. 20, 2012, Meaney, Brian, et al.

Author Unknown, "Apple Announces Final Cut Pro 4," NAB, Apr. 6, 2003, 3 pages, Apple Inc., Las Vegas, NV, USA.

Author Unknown, "Using Adobe Premiere Elements 8 Editor," last updated Aug. 12, 2010, 313 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Author Unknown, "iMovie '08 Getting Started," Month Unknown, 2008, pp. 1-50, Apple Inc., USA.

Brenneis, Lisa, "Final Cut Pro 3 for Macinotsh: Visual QuickPro Guide, " Month Unknown, 2002, 288 pages, Peachpit Press, Berkeley, California, USA.

Casares, Juan, et al., "Simplifying Video Editing Using Metadata", Processing of Designing Interactive Systems (DIS 2002), Jun. 2002, 10 pages, London, UK, available at http://www.informedia.cs.cmu.edu/documents/silver-dis02-draft.pdf.

Diakopoulos, Nicholas, et al., "Videotater: An Approach for Pen-Based Digital Video Segmentation and Tagging", UIST'06, Oct. 15-18, 2006, 4 pages, Montreux, Switzerland, available at http://www.deakondesign.com/Documents/tn151-diakopoulos.pdf.

Kutics, Andrea, et al., "Use of Adaptive Still Image Descriptors for Annotation of Video Frames", Lecture Notes in Computer Science, Month Unknown, 2007, pp. 686-697, volume 4633, Springer-Verlag, Berlin, Heidelberg.

Long, A. Chris, et al., "Video Editing Using Lenses and Semantic Zooming", Human Computer Interaction Institute, Carnegie Mellon University, Month Unknown, 2009, pp. 1-9, Pittsburgh, PA.

Myers, Brad A., et al., "A Multi-View Intelligent Editor for Digital Video Libraries", The First ACM+IEEE Joint Conference on Digital Libraries (JCDL'01), Jun. 24-28, 2001, 10 pages, Roanoke, VA, available at http://www.informedia.cs.cmu.edu/documents/dl2001paper.pdf.

(56) References Cited

OTHER PUBLICATIONS

Shaw, Ryan, et al., "Toward Emergent Representations for Video", Proceedings of the 13th annual ACM International Conference on Multimedia, Nov. 6-11, 2005, 4 pages, Singapore.

Ulges, Adrian, et al., "Content-based Video Tagging for Online Video Portals", Proceedings of the 3rd MUSCLE/Image CLEF Workshop on Image and Video Retrieval Evaluation, Sep. 2007, 10 pages, Budapest, Hungary.

Wang, Yijin, et al. "MyVideos-A System for Home Video Management", Proceedings of the 10th ACM International Conference on Multimedia '02, Dec. 1-6, 2002, pp. 412-413, Juan-les-Pins, France.

U.S. Appl. No. 13/115,966, filed May 25, 2011, Pendergast, Colleen, et al.

* cited by examiner

3415

| Name | Start | End | Duration | Content Created |
|---|---|---|---|---|
| ▶ 🎞 Clip-2009-07-01 11;19;23 | 00:00:00;00 | 00:00:35;00 | 00:00:35;00 | July 01, 2009 8:24:58 PM |
| 🎞 Clip-2009-07-02 12;49;32 | 00:00:00;00 | 00:00:25;00 | 00:00:25;00 | July 02, 2009 7:35:54 PM |
| 🎞 Clip-2009-07-03 13;25;15 | 00:00:00;00 | 00:00:15;00 | 00:00:15;00 | July 03, 2009 9:25:48 PM |
| ▶ 🎞 Clip-2009-07-04 11;35;34 | 00:00:00;00 | 00:34:00;00 | 00:34:00;00 | July 04, 2009 9:35:56 PM |
| 🎞 Clip-2009-07-05 12;19;44 | 00:00:00;00 | 00:01:32;00 | 00:00:32;00 | July 05, 2009 9:25:37 PM |
| 🎞 Clip-2009-07-06 12;39;54 | 00:00:00;00 | 00:00:15;00 | 00:00:15;00 | July 06, 2009 5:25:56 PM |
| 🎞 Clip-2009-07-07 14;39;24 | 00:00:00;00 | 00:00:15;00 | 00:00:15;00 | July 07, 2009 5:16:58 PM |
| 🎞 Clip-2009-07-08 12;19;54 | 00:00:00;00 | 00:01:22;00 | 00:01:22;00 | July 08, 2009 9:25:18 PM |
| 🎞 Clip-2009-07-09 07;39;34 | 00:00:00;00 | 00:00:33;00 | 00:00:33;00 | July 09, 2009 9:15:58 PM |
| 🎞 Clip-2009-07-10 09;29;34 | 00:00:00;00 | 00:00:15;00 | 00:00:15;00 | July 10, 2009 5:24:58 PM |
| 🎞 Clip-2009-07-11 01;39;34 | 00:00:00;00 | 00:01:35;00 | 00:01:35;00 | July 11, 2009 9:15:38 PM |

3605

3615

| Name | Start | End | Duration | Content Created |
|---|---|---|---|---|
| ▼ 🎞 Clip-2009-07-01 11;19;23 | 00:00:00;00 | 00:00:35;00 | 00:00:35;00 | July 01, 2009 8:24:58 PM |
| ☆ favorite | 00:00:00;00 | 00:00:05;04 | 00:00:05;04 | |
| 🎞 Clip-2009-07-02 12;49;32 | 00:00:00;00 | 00:00:25;00 | 00:00:25;00 | July 02, 2009 7:35:54 PM |
| 🎞 Clip-2009-07-03 13;25;15 | 00:00:00;00 | 00:00:15;00 | 00:00:15;00 | July 03, 2009 9:25:48 PM |
| ▼ 🎞 Clip-2009-07-04 11;35;34 | 00:00:00;00 | 00:34:00;00 | 00:00:34;00 | July 04, 2009 9:35:56 PM |
| ♀ Architecture | 00:00:00;11 | 00:07:00;11 | 00:07:00;00 | |
| ☆ favorite | 00:00:00;11 | 00:05:00;11 | 00:05:00;00 | |
| ♀ Architecture | 00:20:00;00 | 00:34:00;00 | 00:14:00;00 | |
| ✗ reject | 00:31:00;18 | 00:34:00;00 | 00:03:00;00 | |
| 🎞 Clip-2009-07-06 12;39;54 | 00:00:00;00 | 00:00:15;00 | 00:00:15;00 | July 06, 2009 5:25:56 PM |
| 🎞 Clip-2009-07-07 14;39;24 | 00:00:00;00 | 00:00:15;00 | 00:00:15;00 | July 07, 2009 5:16:58 PM |
| 🎞 Clip-2009-07-08 12;19;54 | 00:00:00;00 | 00:01:22;00 | 00:01:22;00 | July 08, 2009 9:25:18 PM |

TIMELINE SEARCH AND INDEX

CLAIM OF BENEFIT TO PRIOR APPLICATIONS

This application claims the benefit of U.S. Provisional Application 61/443,709, entitled "Keywords and Dynamic Folder Structures", filed Feb. 16, 2011. U.S. Provisional Application 61/443,709 is incorporated herein by reference. This application also claims the benefit of U.S. Provisional Application 61/443,707, entitled "Efficient Media Processing", filed Feb. 16, 2011. This application is also a continuation in part of U.S. patent application Ser. No. 13/111,912, now published as U.S. Publication 2012/0209889, entitled "Data Structures for a Media-Editing Application", filed May 19, 2011. U.S. patent application Ser. No. 13/111,912 claims the benefit of U.S. Provisional Application 61/443,707. U.S. patent application Ser. No. 13/111,912 also claims the benefit of U.S. Provisional Application 61/437,517, entitled "Media-Editing Application with Video Segmentation Capabilities and Automatic Background-Render", filed Jan. 28, 2011. U.S. patent application Ser. No. 13/111,912 also claims the benefit of U.S. Provisional Application 61/443,702, entitled "Media-Editing Application with Anchored Timeline", filed Feb. 16, 2011. U.S. patent application Ser. No. 13/111,912 also claims the benefit of U.S. Provisional Application 61/443,704, entitled "Media-Editing Application with Novel Editing Tools", filed Feb. 16, 2011.

CROSS REFERENCE TO RELATED APPLICATIONS

This Application is related to the following applications: U.S. patent application Ser. No. 13/115,966, now published as U.S. Publication 2012/0210218, filed May 25 2011; and U.S. patent application Ser. No. 13/115,970, now published as U.S. Publication 2012/0210219, filed May 25, 2011.

BACKGROUND

To date, many media editing applications exist for creating media presentations by compositing several pieces of media content such as video, audio, animation, still image, etc. Such applications give users the ability to edit, combine, transition, overlay, and piece together different media content in a variety of manners to create a resulting composite presentation. Examples of media editing applications include Final Cut Pro® and iMovie®, both sold by Apple Inc.

Some media editing applications provide bins or folder-like structures to organize media content. In these applications, a user typically imports media content and creates several bins. The user then provides names for the bins and organizes the content by moving different pieces of the content into these bins. In other words, the user clears one or more areas that contain pieces of the content by placing the pieces in other areas where he or she can easily access them later. When a user needs a piece of content, the user searches for it in one of the bins. For instance, a video editor might search a bin called "People" in order to find a video clip having a wide camera shot of a group of extras. After finding the video clip, the video editor may move or copy the video clip into another bin. If the video editor cannot locate the video clip, the editor may import the clip again.

In addition to bins, some media editing applications provide keyword-tagging functionality. With keyword tagging, a user selects one or more pieces of content and associates the selected content with a keyword. Typically, the user associates the selected content through a keyword display area that lists several user-specified keywords. To make use of the keyword association, the user initiates a keyword filtering operation on a particular keyword in order to display only those pieces of content that have been associated with the particular keyword.

There are a number of shortcomings associated with the organization approaches mentioned above. For example, with bin organization, a user must search through different bins to find the right pieces of content. In addition, the user must move or copy the pieces of content in between different bins to organize them.

With keyword tagging, a user is limited to filtering down a display area to find content associated with a particular keyword. In some cases, the user has no recollection of which pieces of content are associated with which keywords. Furthermore, in most cases, an application's keyword tagging functionality is a secondary organizational feature to supplement folder-type organization.

BRIEF SUMMARY

Some embodiments of the invention provide a novel keyword association tool for organizing media content. Each keyword can be associated with an entire clip or a portion of the clip. For each specified keyword, the keyword association tool creates a collection (e.g., bin, folder, etc.) in a dynamic collection structure. In some embodiments, a keyword collection is dynamically added to the collection structure each time a new keyword is associated with a media clip. To associate a clip with a keyword, a user can drag and drop a clip onto a keyword collection that corresponds to the keyword. The same technique can be used to associate multiple clips with the keyword by simultaneously dragging and dropping the clips onto the keyword collection.

In some embodiments, the dynamic collection structure may be represented in a sidebar display area with a list of different keyword collections. Accordingly, a user does not have to search for a separate keyword association tool to associate one or more clips with different keywords. Moreover, these keyword collections operate similar to what many computer users have come to believe as bins or folders. For example, a user can (1) create different keyword collections, (2) drag and drop items onto them, and (3) select any one of them to view its keyword associated content.

In some embodiments, the keyword collections either replace or supplement folder-type organization. For example, without creating any folders, a group of items can be organized into different keyword collections. Alternatively, a group of items in a folder or bin can be organized into different keyword collections. Accordingly, the keyword collection feature provides a new model for replacing or supplementing traditional folder-type organization.

As mentioned, each keyword can be associated with an entire clip or a portion of a clip in some embodiments. To associate a keyword with a portion of a clip, the user can select the portion of the clip (e.g., using a range selector), and drag and drop the selected portion onto a keyword collection. The user can also filter a display area to display each clip or portion of a clip associated with the keyword by selecting the keyword collection.

In some embodiments, each media clip associated with a keyword is displayed with a graphical indication of the association. This allows a user to quickly assess a large group of media clips and determine which clips or ranges of the clips have been tagged with one or more keywords. To provide an indication of a range, the graphical indication, in some embodiments, spans horizontally across a portion of a clip's representation (e.g., a thumbnail representation, filmstrip representation, waveform representation, etc.).

In some embodiments, the keyword collections are provided in a hierarchical structure (e.g., of a sidebar display area) with different types of collections. For example, each keyword collection may be a part of another collection such as a media collection, disk collection, etc. Alternatively, or conjunctively, some embodiments provide filter or smart collections in the hierarchical structure. In some such embodiments, a user can create a smart collection and customize the smart collection to include or exclude each item associated with one or more different keywords.

When a keyword collection is deleted, some embodiments automatically disassociate or untag each item associated with a keyword of the keyword collection. This allows a user to quickly remove keyword associations from a large group of tagged items. The user can also disassociate a portion of a range associated with a keyword. In some embodiments, when multiple keywords are selected, a display area displays only a union of items associated with keywords of the keyword collections. In some embodiments, a keyword collection can be renamed to quickly associate its contents with another keyword (e.g., with the new name of the keyword collection) or to quickly merge or combine two keyword collections.

Some embodiments provide a keyword tagging tool for creating keyword associations. To associate a clip with a keyword, a user can select a clip or a portion of a clip, and select a keyword from the keyword tagging tool. When inputting a keyword, the keyword tagging tool may provide suggested keywords for an auto-fill operation. The keyword tagging tool, in some embodiments, includes several fields for inputting keyword shortcuts. A user can populate one or more of these fields and use shortcut keys to quickly tag different items.

In some embodiments, one or more different types of analysis are performed on a set of items to automatically organize the set into different keyword collections. For example, a clip may be organized into different keyword collections based on an analysis of the number of people (e.g., one person, two persons, group, etc.) in the clip and/or a type of shot (e.g., a close-up, medium, or wide shot). Other types of analysis may include image stabilization analysis (e.g., camera movement), color balance analysis, audio analysis (e.g., mono, stereo, silent channels), metadata analysis, etc.

The analysis operations, in some embodiments, are performed when one or more items are imported into an application (e.g., media editing application). Alternatively, or conjunctively with the analysis operations, the application, in some embodiments, identifies a source directory in which a set of items is located. When the set of items are imported, the application (1) associates the name of the source directory with the set of items and (2) creates a keyword collection that contains the set of items. Accordingly, the imported items do not have to be manually organized into the keyword collection.

Some embodiments provide a novel list view that displays a list of media clips and, for each media clip, displays each keyword associated with the media clip. In some embodiments, the list view includes a list area for displaying the list of media clips and keywords. For example, when a clip is associated with one or more keywords, the list area displays the clip with each associated keyword. In some embodiments, the list view includes a preview section for displaying a representation of a clip selected from the list view's list area. For example, the preview section may display a filmstrip representation or a sequence of thumbnail images corresponding to a set of frames in a video clip.

Some embodiments allow a user to associate a keyword with an entire clip or a portion of the clip using the list view. For example, the user can (1) select a video clip from the list area to display the clip's filmstrip representation in the preview section, (2) paint over an area of the representation to select a range of the clip, and (3) tag the range with a keyword. Alternatively, the user can select different ranges of a clip by selecting one or more keywords from the list area. The user can also filter the list area to display each clip or portion of a clip associated with a keyword.

In some embodiments, each media clip associated with a keyword is displayed in the preview section of the list view with a graphical indication of the association. To provide an indication of the clip's range that is associated with the keyword, the graphical indication, in some embodiments, spans horizontally across a portion of a clip's representation. For example, multiple graphical indications may be shown on a video clip's filmstrip representation to indicate different portions that are associated with one or more keywords.

Alternatively, or conjunctively with the graphical indication, the list view, in some embodiments, displays information related to a keyword range. For example, the list area may list a starting point and an ending point for each keyword associated with a clip's range. In some embodiments, the list area displays a duration of the keyword range. In this manner, a user of the list view can quickly see in detail which portions of the clip are associated with one or more keywords.

In some embodiments, the list area displays other items associated with a clip. These items include at least one of (1) a marker, (2) a filter or smart collection, and (3) a ratings marker. In some embodiments, a marker marks a point in time along a clip's range. For example, a user can mark a point with a marker, and specify a note or make the marker a to-do item. In some embodiments, the filter or smart collection may indicate in the list view a range of a clip that, based on an analysis, includes people (e.g., one person, two persons, a group, etc.) and/or a type of shot (e.g., a close-up, medium, or wide shot). As mentioned, other types of analysis may include image stabilization analysis (e.g., camera movement), color balance analysis, audio analysis (e.g., mono, stereo, silent channels), metadata analysis, etc.

The list view, in some embodiments, is an editing tool that can be used to perform a number of different editing operations. In some such embodiments, the list view allows an editor to input notes for media clips or keyword ranges. These notes can be notes that an editor makes regarding the contents of an entire media clip or a range of the media clip associated a keyword. In some embodiments, the editing operations entail any one of (1) creating a composite or nested clip, (2) creating markers (e.g., to-do items, completed items), (3) adding clips to a timeline for defining a composite presentation, etc.

In some embodiments, the list view is a playback tool that allows a user to play through one or more clips in the list. For example, when a user selects a clip from a list of clips and inputs a playback command, several clips from the list may be played without interruption starting from the selected clip. In some such embodiments, the user can jump to a different marked section (e.g., a keyword range) or different clip and continue playback starting from the marked section or clip.

Some embodiments provide a novel timeline search tool for searching and navigating a timeline. In some embodiments, the timeline search tool includes a search field that allows a user to search for clips. For example, the timeline search tool may display each clip in a list of clips. When a user inputs a search parameter, the timeline search tool may filter this list to display only each clip that satisfies or matches the search parameter.

In some embodiments, each clip in the list of clips is selectable such that a selection of the clip causes the timeline to navigate to the position of the clip in the timeline. For example, when a composite presentation includes many clips that make up a sequence or composite presentation, an editor can easily search the timeline to identify a particular clip and navigate the timeline to the particular clip. Accordingly, the timeline search tool allows the editor to search and navigate the timeline to identify clips.

In some embodiments, the timeline search tool displays different types of clips. These different types of clips include audio clips, video clips, and title clips. In some such embodiments, the timeline search tool allows a user to granularly search and navigate the timeline by specifying the type of clips for which to search. Alternatively, the timeline search tool, in some embodiments, provides a search function for searching all types of clips.

Alternatively, or conjunctively with the clips search, the timeline search tool allows a user to search for a clip or a portion of a clip associated with one or more keywords. In some such embodiments, the timeline search tool displays a list of each keyword associated with a clip or a portion of a clip. When a user inputs a search parameter, the timeline search tool filters this list to display only each keyword that satisfies or matches the search parameter. For example, when a composite presentation includes many clips tagged with different actors' names, an editor can easily search and navigate the timeline to identify ranges of clips tagged with a particular actor's name.

In some embodiments, a media clip in a timeline may be associated with different types of items. These types of items include at least one of (1) an analysis keyword, (2) a marker, (3) a filter or smart collection, and (4) a ratings marker. In some such embodiments, the timeline search tool allows a user to granularly search and navigate the timeline by specifying the type of items to search. Alternatively, the timeline search tool provides a search function for searching all types of items, in some embodiments.

In some embodiments, the timeline search tool allows an editor to search for markers that are placed in the timeline. As mentioned, such markers can have "to do" notes associated with them, in some embodiments. These notes can be notes that an editor makes as reminders to himself or others regarding tasks that have to be performed. Accordingly, when retrieving markers for display after a search, the method of some embodiments displays (1) the notes associated with the marker and/or (2) a check box to indicate whether the task associated with the marker has been completed. In some embodiments, the editor can check the box for a marker in the search view in order to indicate that the marker has been completed.

The timeline search tool, in some embodiments, displays each item (e.g., keyword, clip) in chronological order, starting from a first item along the timeline to a last item. To provide an indication of the location of a playhead along the timeline, the timeline search tool, in some embodiments, includes its own playhead that moves along the list of items. This playhead moves synchronously with the timeline's playhead, in some embodiments.

In some embodiments, the timeline search tool provides a search function for finding missing clips. A missing clip is a clip imported into an application that does not link back to its source. For example, a user might have moved or deleted a source file on a hard disk to break the link between the application's file entry and the source file. In some such embodiments, when the user inputs a pre-defined search parameter or keyword into the tool's search field, the timeline search tool displays each missing clip in a list. When the missing clip is selected from the list, some embodiments provide a set of options to re-establish the link for the missing clip.

In some embodiments, when one or more items are selected from the list of items, the timeline search tool displays a total time for the selected items. For example, the timeline search tool may display a total time for multiple clips, multiple ranges of clips associated with one or more keywords, etc. Displaying the total time can be useful in a number of different ways. For example, an editor may be restricted to adding only 30 seconds of stock footage. When the stock footage is tagged as such, the editor can select those items corresponding to the stock footage in the timeline search tool and know whether the total duration exceeds 30 seconds.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 36 illustrates an example of simultaneously expanding multiple different clips in the list view.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel keyword association tool for organizing media content. In some embodiments, the keyword association tool is integrated into a sidebar display area as a keyword collection. A user can create different keyword collections for different keywords. To associate a media clip with a keyword, the user can drag and drop the clip onto a corresponding keyword collection. The same technique can be used to associate multiple clips with one keyword by simultaneously dragging and dropping the clips onto a keyword collection.

In some embodiments, the keyword association tool is provided as a set of components of a media editing application. In some such embodiments, the media editing application automatically associates keywords with the media clips based on an analysis of the clips (e.g., based on a people detection operation). Each keyword can be associated with the entire clip or a portion of the clip.

The media editing application of some embodiments includes a first display area for displaying different keyword collections and a second display area for displaying media content. In many of the examples described below, the first display area is referred to as an event library, and the second display area is referred to as an event browser. This is because the keyword collections are hierarchically organized under an event category in these examples. However, the keyword collections may exist in their own hierarchy or as a part of different hierarchy.

Figure 1:
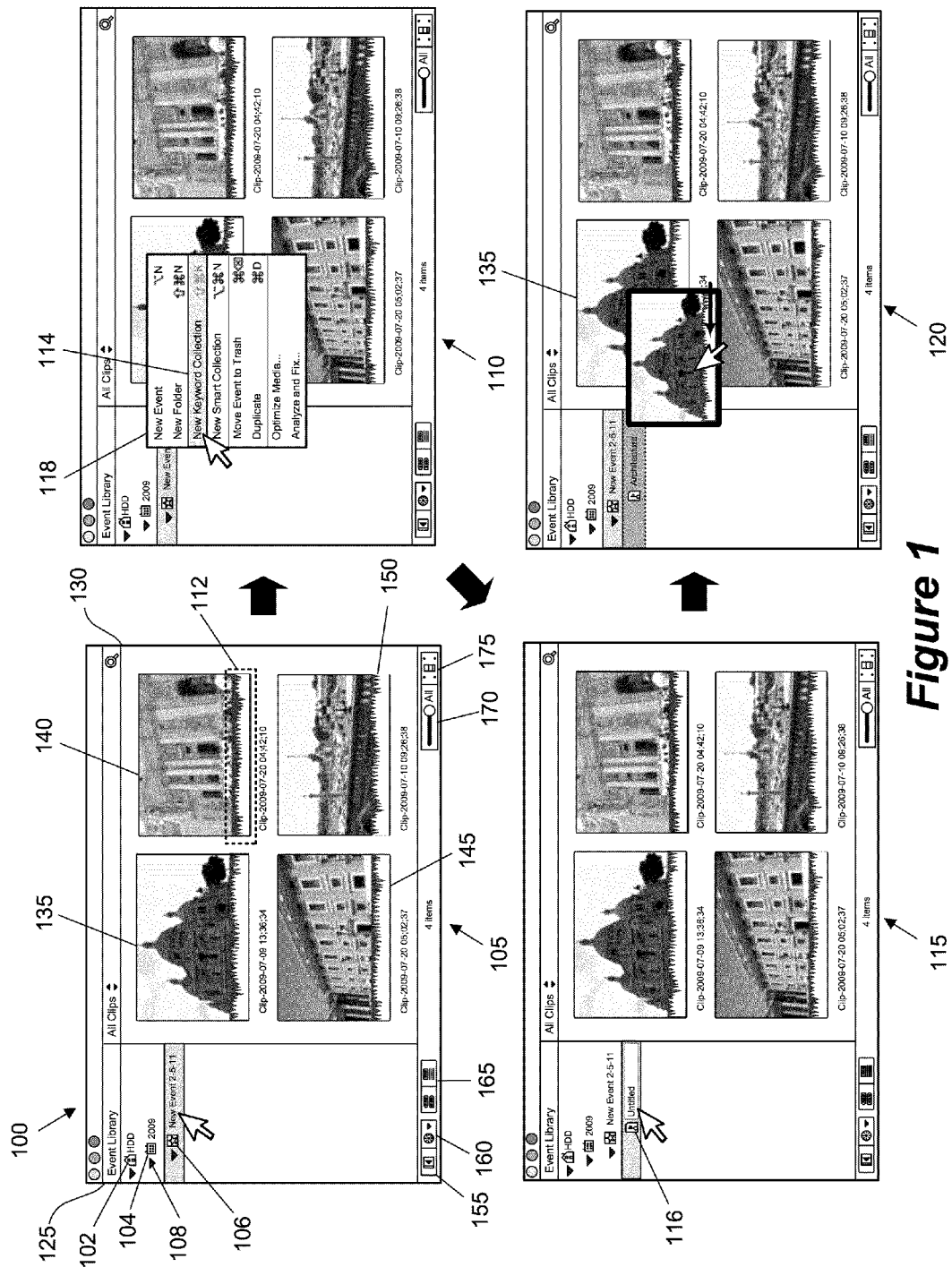
FIG. 1 illustrates a graphical user interface ("GUI") of a media editing application with a keyword association tool.

For some embodiments of the invention, FIG. 1 illustrates a graphical user interface ("GUI") 100 of a media editing application with such a keyword association tool. This figure illustrates the GUI 100 at four different stages 105, 110, 115, and 120. In particular, these stages show how an event library 125 and an event browser 130 can be used to associate a video clip with a keyword. Each of these stages will be described in detail below after an introduction of the elements of GUI 100. As shown in FIG. 1, the GUI 100 includes the event library 125, the event browser 130, and a set of controls 155-175.

In some embodiments, the event library 125 is a sidebar area of the GUI 100 that displays several selectable items representing different collections. In the example illustrated in FIG. 1, the collections are listed hierarchically starting with a storage collection 102, followed by a "year" collection 104, and an event collection 106. Each particular collection may have multiple other child collections. Also, each particular collection includes a corresponding UI item for collapsing or expanding the particular collection in the event library 125. For instance, a user of the GUI 100 can select a UI item 108 to hide or reveal each event collection that is associated with the "year" collection 104.

In some embodiments, when media content is imported into the application's library, the application automatically organizes the content into one or more collections. For example, a selectable item representing a new event may be listed in the event library 125 when a set of video clips is imported from a camcorder, digital camera, or hard drive. The application may also automatically specify a name for each collection. For example, in FIG. 1, the names of collections 104 and 106 are specified by the application based on the dates associated with the imported clips and the import date. As will be described in detail by reference to FIG. 27 below, some embodiments automatically create different keyword collections for imported content.

The event browser 130 is an area in the GUI 100 through which the application's user can organize media content into different collections. To allow the user to easily find content, the event browser 130 may be sorted (e.g., by creation date, reel, scene, clip duration, media type, etc.). In the example illustrated in FIG. 1, video clips are represented as thumbnail images. However, depending on the user's preference, the clips may be represented differently. For instance, a video clip may be represented as a filmstrip with several images of the clip displayed as a sequence of thumbnail images.

In some embodiments, audio clips are represented differently from video clips in the event browser 130. For instance, an audio clip may be represented as a waveform. That is, a representation of the audio clip may indicate the clip's signal strength at one or more instances in time. In some embodiments, a video clip representation may include a representation of its associated audio. For instance, in FIG. 1, the representation 140 includes a waveform 112. This waveform 112 spans horizontally across the representation 140 to graphically indicate signal strength of the video clip's audio.

The set of controls 155-175 includes selectable UI items for modifying the display or view of the event library 125 and event browser 130. For instance, a user of the GUI 100 can select the control 155 to hide or reveal the event library 125. The user can also select the control 160 to show a drop down list of different sorting or grouping options for collections in the event library 125 and representations in the event browser 130. In addition, a user's selection of the control 175 reveals UI items for (1) adjusting the size of clip representations and (2) adding/removing waveforms to/from representations of video clips. Also, a selection of the control 165 causes the event browser 130 to switch to a list view from the displayed thumbnails view (e.g., clips view, filmstrip view). Several examples of such a list view are described below in Section VIII.

The control 170 includes a duration slider that controls how many clips are displayed or how much detail appears in the event browser 130. The duration control includes a slider bar that represents different amounts of time. The knob can be moved to expand or contract the amount of detail (e.g., the number of thumbnails representing different frames) shown in each clip's filmstrip representation. Showing more thumbnails for each clip decreases the overall number of clips shown in the event browser 130. In some embodiments, a shorter time duration displays more detail or more thumbnails, thereby lengthening each clip's filmstrip representation.

Having described the elements of the GUI 100, the operations of associating a video clip with a keyword will now be described by reference to the state of this GUI during the four stages 105, 110, 115, and 120 that are illustrated in FIG. 1. In the first stage 105, the event library 125 lists several different collections. The user selects the event collection 106 to display representations 135-150 in the event browser 130. As mentioned above, the representations 135-150 represent different video clips imported into the application's library.

The second stage 110 shows the GUI 100 after the user selects an area of the event library 125. The selection causes a context menu 118 to appear. The context menu 118 displays several menu items related to the event browser 130. For example, the context menu 118 displays menu items for creating and deleting an event, and a menu item 114 for creating a new keyword collection. The context menu 118 includes an option to create folders. In some embodiments, these folders are for storing one or more keyword collections or keyword folders. When the user selects the menu item 114 in the context menu 118, the user is presented with a keyword collection 116, as illustrated in the third stage 115.

As shown in the third stage 115, the keyword collection 116 is displayed in the event library 125. Specifically, the keyword collection 116 is integrated into the sidebar area and categorically listed under the event collection 106. The keyword collection 116 includes graphical and textual elements. In the example illustrated in FIG. 1, the graphical element indicates to the user (e.g., through a key symbol) that the collection 116 represents a keyword. Also, to distinguish the keyword collection 116 from other collections, the graphical element displays color differently from graphical elements of those other collections.

The textual element of the keyword collection 116 represents the keyword. In other words, the textual element represents a word, term (several words), phrase, or characters (e.g., string, alphanumeric symbols) that the user can use to associate with any media content represented in the event browser 130. As shown in the third stage 115, the application has specified a default keyword name for the collection. Also, the textual element is highlighted to indicate that a more meaningful keyword can be inputted for the collection 116.

The fourth stage 120 shows one way of associating a piece of media content with a keyword. Here, the user selects the thumbnail representation 135 of a video clip. The selection causes the representation 135 to be highlighted in the event browser 130. The user then drags and drops the representation 135 onto the keyword collection 116 to associate the video clip with the keyword.

In the example described above, the keyword collection 116 is integrated in a side bar area that has been traditionally reserved for listing bins or folders. A user of the GUI does not have to search for a separate keyboard tool to use the application's keyword functionality. Moreover, the keyword collection operates in a manner similar to what many computer users have come to believe as a bin or a folder. In other words, the keyword collection acts a virtual bin or virtual folder that the user can drag and drop items onto in order to create keyword associations.

Figure 2:
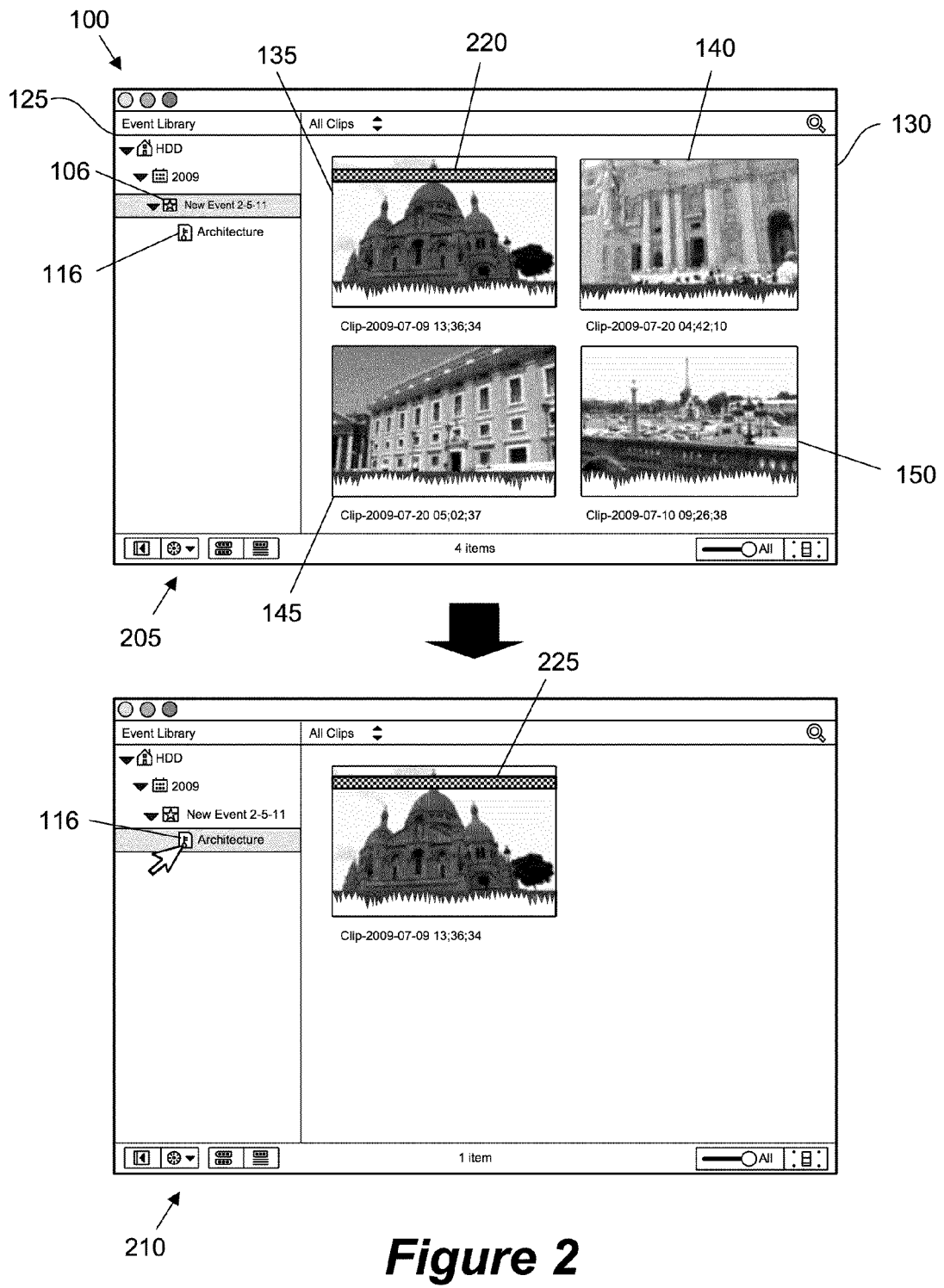
FIG. 2 illustrates the GUI after associating a video clip with a keyword.

FIG. 2 illustrates the GUI 100 after associating a video clip with a keyword. Specifically, in two operational stages 205 and 210, this figure illustrates how the event library 125 can be used to filter the event browser 130 to only display content of the keyword collection 116. The event library 125 and the event browser 130 are the same GUI elements as those described in FIG. 1.

The first stage 205 illustrates the contents of the event collection 106. Specifically, it illustrates that the representation 135 is not removed from the event browser 130 after the drag and drop operation as illustrated in FIG. 1. As shown in the first stage 205, the representation 135 remains in the event collection 106. The second stage 210 shows a user's selection of the keyword collection 116. The selection causes the event browser 130 to displays the content of the keyword collection 116. Specifically, the selection causes the event browser to be filtered down to the video clip associated with the keyword.

In some embodiments, the media editing application displays content differently based on their association with one or more keywords. This allows users to quickly assess a large group of media clips and see which ones are associated or not associated with any keywords. For example, in FIG. 2, a bar 220 is displayed across each of the representations 135 and 225. The color of the bar (i.e., blue) corresponds to the color of the keyword collection in the event library 125. Also, the representations 140-150 are displayed without any bars. This indicates to a user that the video clips associated with these representations are not marked with any keywords.

In some embodiments, the media editing application allows a user to mark a range of a clip or the entire clip. In other words, a user may specify a time duration or several different time durations in which one or more keywords are applicable. For example, a user may specify that an audio clip includes crowd noise starting at one point in time and ending at another point, and then tag that range as "crowd noise". In the example illustrated in FIG. 2, the entire range of the video clip associated with the representation 135 is marked with the keyword. This is indicated by the bar 220, as it spans horizontally across the representation 135 in the event browser 130.

Figure 3:
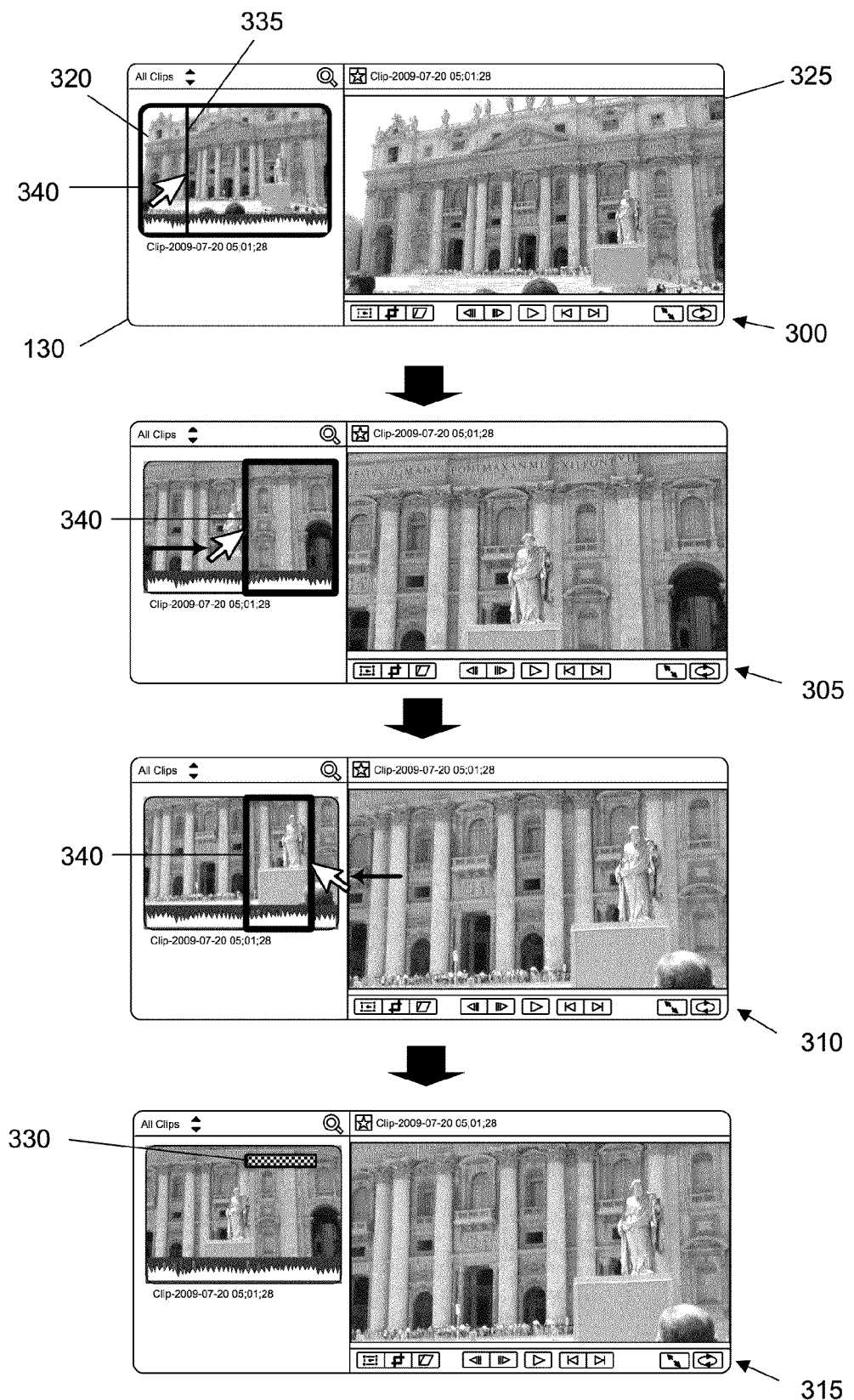
FIG. 3 illustrates specifying a range of a video clip to associate with a keyword.

FIG. 3 illustrates specifying a range of a video clip to associate with a keyword. Specifically, this figure shows how a representation 320 of the video clip can be used to specify the range. Four operational stages 300-315 are shown in FIG. 3. This figure includes the event browser 130, the representation 320, and a preview display area 325. The event browser 130 is the same as the one described above by reference to FIG. 1.

As mentioned above, a video clip representation displays a thumbnail of an image in the video clip. In some embodiments, a media clip's representation is an interactive UI item that dynamically displays different images. Also, the representation, in some embodiments, can be used to preview audio of a media clip. One example of such representation is shown in FIG. 3 with the representation 320. As shown, the representation includes a playhead 335 and a range selector 340.

In the example illustrated in FIG. 3, the representation 320 can be selected to display different thumbnails and play different audio samples. In particular, the width of the representation 320 represents a virtual timeline. The user can select an interior location within the representation. The interior location corresponds to a particular time on the virtual timeline. The selection causes the representation to display a thumbnail image of the video clip at that particular time instance. Similarly, an audio sample that corresponds to the particular time instance is played when the user selects the interior location.

The playhead 335 moves along the representation's virtual timeline. When a user selects an interior location, the playhead 335 moves along the virtual timeline to the selected interior location. The user can use this playhead 335 as a reference point to display different images and play different audio samples associated with the video clip.

The range selector 340 allows the user to define a range of a clip to be marked with a keyword. In some embodiments, the range selector 340 allows the user to specify a range to add to a timeline. The user can activate the range selector 340 by selecting a representation. The selection causes the range selector 340 to appear. The user can then move the selector's edges along the representation's virtual timeline to specify a range.

In some embodiments, the preview display area 325 displays a preview of a composite presentation that the media editing application creates by compositing several media clips (e.g., audio clips, video clips, etc.). As shown in FIG. 3, the preview display area 325 displays a preview of a clip selected from the event browser 130. For example, when a user selects a representation's interior location that corresponds to a particular time instance, the preview display area presents a preview of the representation's associated video clip at that particular instance in time.

The first stage 300 of FIG. 3 shows the event browser 130 and the preview display area 325. The user has selected an interior location within the representation 320. The selection causes the playhead 335 to be moved along the representation's virtual timeline to the location about the interior location. The selection also causes the preview display area 325 to displays a preview of the representation's associated video clip at a time instance corresponding to the playhead 335.

The second stage 305 illustrates selection and movement of an edge of the range selector 340. Specifically, in this example, the left edge of the range selector 340 is moved along the virtual timeline to about mid-point. This left edge represents a starting point of a range of the video clip. Similarly, the third stage 310 shows selection and movement of the opposite edge of the range selector 340. In particular, the right edge of the range selector 340 is moved towards the left edge. The right edge represents an ending point of the range of the video clip.

The fourth stage 315 shows the event browser 130 after a keyword is associated with the range of the video clip. Here, a bar 330 is displayed across only a portion of the representation. This portion represents the range of the video clip that is marked or associated with the keyword.

In the example described above, a keyword range is specified using the range selector 340. In some embodiments, the media editing application allows a user to modify a defined keyword range. For example, when a keyword is applied to a particular range of a clip, the media application may provide UI items and/or shortcut keys to modify the particular range. In this way, the user of the media editing application can define a keyword collection to include specific ranges of one or more clips.

In some embodiments, when a range of a clip is marked with multiple keywords, only one keyword representation (e.g., keyword bar) is displayed. For example, a filmstrip representation in an event browser may only display one keyword bar over a range that is associated with multiple keywords. In some embodiments, when the user selects the keyword representation (e.g., keyword bar), a keyword list (e.g., a popup list) appears showing all the keywords represented by the bar. In some such embodiments, by default the keyword with the shortest range is selected, but the user can select a different range by selecting its corresponding keyword in the keyword list.

Several more example operations of the media editing application and the keyword association tool are described below. However, before describing these examples, an exemplary media editing application that implements the keyword association features of some embodiments will be described below in Section I. To differentiate keyword tagging from bin-type or folder-type collections, an example keyword data structure will be described in Section II. Section III describes example keyword operations performed with the media editing application. Section IV describes several example operations performed with a keyword tagging tool. Section V describes several operations performed by the media editing application to automatically create different keyword collections. Section VI describes creating smart collections using keywords. Section VII describes marking media content with different ratings. Second VIII describes a list view showing keywords associated with media content. Section IX describes markers. Section X describes a timeline search and index tool for searching and navigating a timeline. Section XI describes a software architecture of a media editing application of some embodiments. Finally, Section XII describes a computer system which implements some embodiments of the invention.

I. Example Media Editing Application

Figure 4:
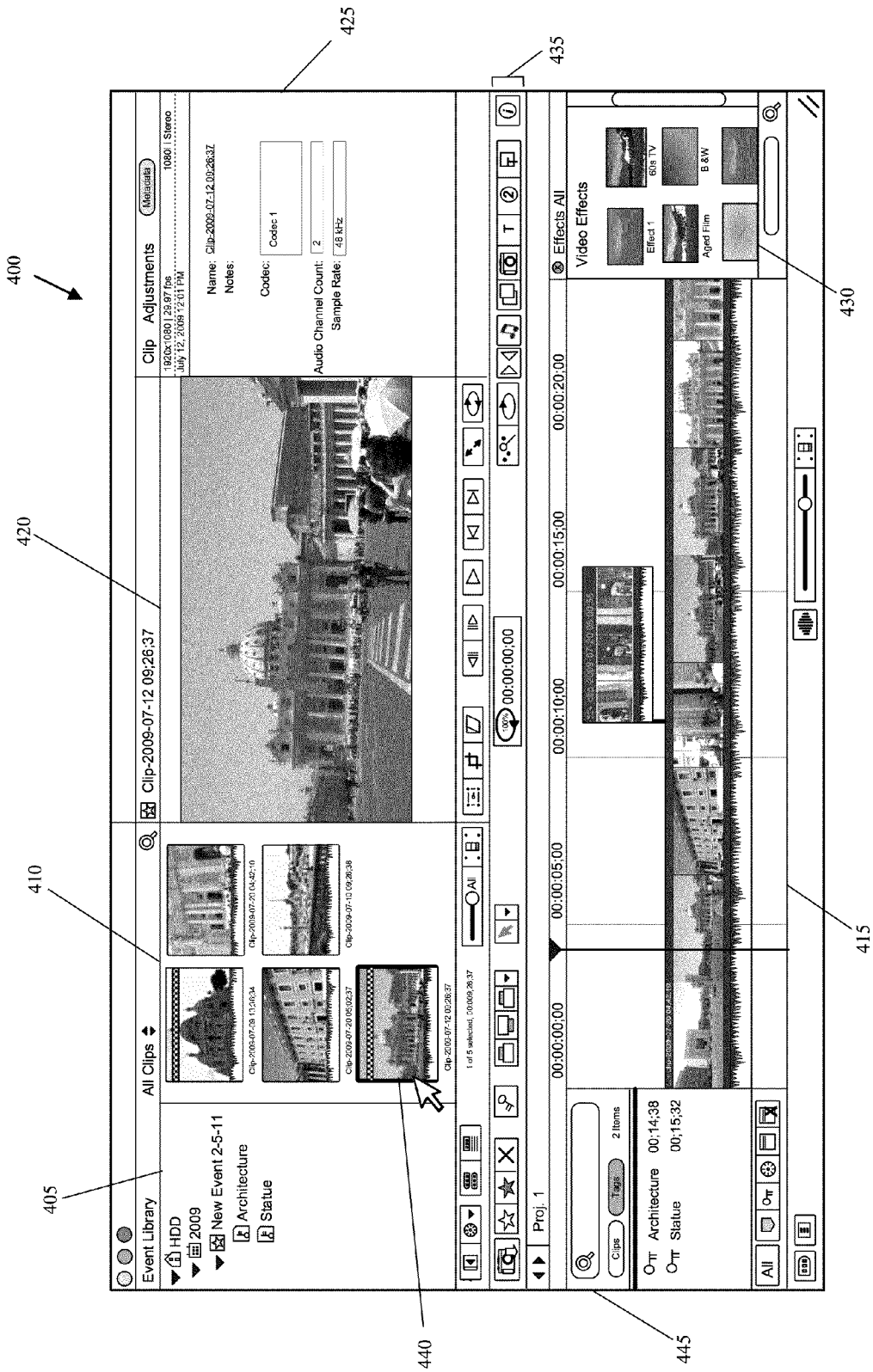
FIG. 4 illustrates an example GUI of a media-editing application of some embodiments.

FIG. 4 illustrates a graphical user interface (GUI) 400 of a media-editing application of some embodiments. One of ordinary skill will recognize that the graphical user interface 400 is only one of many possible GUIs for such a media-editing application. In fact, the GUI 400 includes several display areas which may be adjusted in size, opened or closed, replaced with other display areas, etc. The GUI 400 includes a clip library 405 (also referred to as an event library), a clip browser 410 (also referred to as an event browser), a timeline 415, a preview display area 420, the timeline search tool 445, an inspector display area 425, an additional media display area 430, and a toolbar 435.

The event library 405 includes a set of folder-like or bin-like representations through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera).

Within a storage device and/or date, users may group the media clips into "events", or organized folders of media clips. For instance, a user might give the events descriptive names that indicate what kind of media is stored in the event (e.g., the "New Event 2-5-11" event shown in clip library 405 might be renamed "European Vacation" as a descriptor of the content). In some embodiments, the media files corresponding to these clips are stored in a file storage structure that mirrors the folders shown in the clip library.

As will be described in detail in Sections III-IV below, some embodiments enable users to organize media clips into different keyword collections. In some such embodiments, each keyword collection is represented as a type of bin or folder that can be selected to reveal each media clip associated with a keyword of the particular keyword collection.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders or sub-collections of an event. These sub-folders may include media clips filtered based on tags (e.g., keyword tags). For instance, in the "New Event 2-5-11" event, all media clips showing children might be tagged by the user with a "kids" keyword. Then these particular media clips could be displayed in a sub-folder or keyword collection of the event that filters clips in the event to only display media clips tagged with the "kids" keyword.

The clip browser 410 allows the user to view clips from a selected folder or collection (e.g., an event, a sub-folder, etc.) of the clip library 405. As shown in this example, the collection "New Event 2-5-11" is selected in the clip library 405, and the clips belonging to that folder are displayed in the clip browser 410. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well. Many of the features of the clip browser are user-modifiable. For instance, in some embodiments, the user can modify one or more of the thumbnail size, the percentage of the thumbnail occupied by the audio waveform, whether audio plays back when the user skims through the media files, etc.

In addition, some embodiments enable the user to view the clips in the clip browser 410 in a list view. In this view, the clips are presented as a list (e.g., with clip name, duration, etc.). Some embodiments also display a selected clip from the list in a filmstrip view at the top of the clip browser 410 so that the user can skim through or playback the selected clip. As will be described in detail in the Section VIII below, the list view displays different ranges of media associated with keywords. The list view in some embodiments allows users to select different ranges of a media clip and/or navigate to different sections of the media clip.

The timeline 415 provides a visual representation of a composite presentation (or project) being created by the user of the media-editing application. Specifically, it displays one or more geometric shapes that represent one or more media clips that are part of the composite presentation. The timeline 415 of some embodiments includes a primary lane (also called a "spine", "primary compositing lane", or "central compositing lane") as well as one or more secondary lanes (also called "anchor lanes"). The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The user can select media clips from the clip browser 410 into the timeline 415 in order to add the clips to a presentation represented in the timeline. Within the timeline, the user can perform further edits to the media clips (e.g., move the clips around, split the clips, trim the clips, apply effects to the clips, etc.). The length (i.e., horizontal expanse) of a clip in the timeline is a function of the length of the media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 420.

The preview display area 420 (also referred to as a "viewer") displays images from media files which the user is skimming through, playing back, or editing. These images may be from a composite presentation in the timeline 415 or from a media clip in the clip browser 410. In this example, the user has been skimming through the beginning of clip 440, and therefore an image from the start of this media file is displayed in the preview display area 420. As shown, some embodiments will display the images as large as possible within the display area while maintaining the aspect ratio of the image.

The inspector display area 425 displays detailed properties about a selected item and allows a user to modify some or all of these properties. The selected item might be a clip, a composite presentation, an effect, etc. In this case, the clip that is shown in the preview display area 420 is also selected, and thus the inspector displays information about media clip 440. This information about the selected media clip that includes duration, file format, file location, frame rate, date created, audio information, etc. In some embodiments, different information is displayed depending on the type of item selected.

The additional media display area 430 displays various types of additional media, such as video effects, transitions, still images, titles, audio effects, standard audio clips, etc. In some embodiments, the set of effects is represented by a set of selectable UI items, in which each selectable UI item represents a particular effect. In some embodiments, each selectable UI item also includes a thumbnail image with the particular effect applied. The display area 430 is currently displaying a set of effects for the user to apply to a clip.

The toolbar 435 includes various selectable items for editing, modifying items that are displayed in one or more display areas, etc. The toolbar 435 includes various selectable items for modifying the type of media that is displayed in the additional media display area 430. The illustrated toolbar 435 includes items for video effects, visual transitions between media clips, photos, titles, generators and backgrounds, etc. In addition, the toolbar 435 includes an selectable inspector item that causes the display of the inspector display area 425 as well as items for applying a retiming operation to a portion of the timeline, adjusting color, and other functions. The toolbar 435 also includes selectable items for media management and editing. Selectable items are provided for adding clips from the clip browser 410 to the timeline 415. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

The timeline search tool 445 allows a user to search and navigate a timeline. The timeline search tool 445 of some embodiments includes a search field for searching for clips in the timeline 415 based on their names or associated keywords. The timeline search tool 445 includes a display area for displaying search results. In some such embodiments, each result is user-selectable such that a selection of the result causes the timeline to navigate to the position of the clip in the timeline. Accordingly, the timeline search tool 445 allows a content editor to navigate the timeline to identify clips. Several examples of the timeline search tool will be described in Section X below.

One or ordinary skill will also recognize that the set of display areas shown in the GUI 400 is one of many possible configurations for the GUI of some embodiments. For instance, in some embodiments, the presence or absence of many of the display areas can be toggled through the GUI (e.g., the inspector display area 425, additional media display area 430, and clip library 405). In addition, some embodiments allow the user to modify the size of the various display areas within the UI. For instance, when the display area 430 is removed, the timeline 415 can increase in size to include that area. Similarly, the preview display area 420 increases in size when the inspector display area 425 is removed.

II. Example Data Structures

Figure 5:
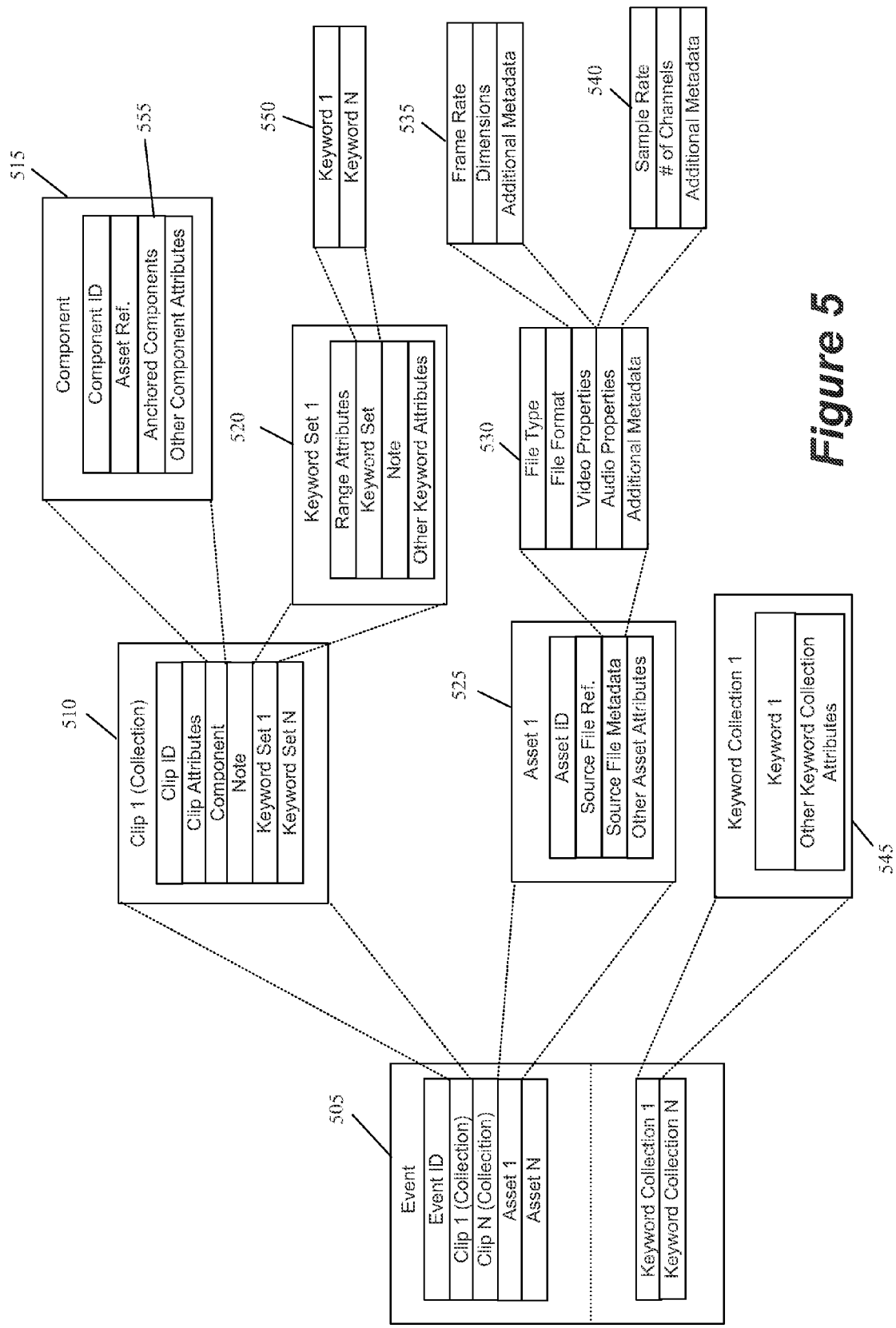
FIG. 5 conceptually illustrates several example data structures of several objects of the media editing application.

FIG. 5 conceptually illustrates example data structures for several objects associated with a media editing application. Specifically, the figure illustrates relationships between the objects that facilitate the organization of media clips into different keyword collections. As shown, the figure illustrates (1) an event object 505, (2) a clip object 510, (3) a component object 515, (4) an asset object 525, (5) a keyword collection object 545, and (6) a keyword set object 520. In some embodiments, one or more of the objects in this figure are subclasses of other objects. For example, in some embodiments, the clip object 510 (i.e., collection object), component object 515, and keyword set object 520 are all subclasses of a general clip object.

In the example illustrated in FIG. 5, the event object 505 includes an event ID and a number of different clip collections (including the clip object 510). The event object 505 is also associated with a number of keyword collection objects (including the keyword collection object 545). The event ID is a unique identifier for the event object 505. The data structure of the event object 505 may include additional fields in some embodiments, such as the event name, event date (which may be derived from an imported clip), etc. The event data structure may be a Core Data (SQLite) database file that includes the assets and clips as objects defined with the file, an XML file that includes the assets and clips as objects defined with the file, etc.

The clip object 510 or collection object, in some embodiments, is an ordered array of clip objects. The clip object stores one or more component clips (e.g., the component object 515) in the array. In addition, the clip object 510 stores a clip ID that is a unique identifier for the clip object. In some embodiments, the clip object 510 is a collection object that can include component clip objects as well as additional collection objects. In some embodiments, the clip object 510 or collection object only stores the video component clip in the array, and any additional components (generally one or more audio components) are then anchored to that video component.

The component object 515 includes a component ID, a set of clip attributes, and an asset reference. The component ID identifies the component. The asset reference of some embodiments stores an event ID and an asset ID, and uniquely identifies a particular asset object (e.g., the asset object 525). In some embodiments, the asset reference is not a direct reference to the asset but rather is used to locate the asset when needed. For example, when the media-editing application needs to identify a particular asset, the application uses the event ID to locate the event that contains the asset, and then the asset ID to locate the particular desired asset. As mentioned, the clip object 510 only stores the video component clip in its array, and any additional components (generally one or more audio components) are then anchored to that video component. This is illustrated in FIG. 5 as the component object 515 includes a set of one or more anchored components 555 (e.g., audio components). In some embodiments, each component that is anchored to another clip or collection stores an anchor offset that indicates a particular instance in time along the range of the other clip or collection. That is, the anchor offset may indicate that the component is anchored x number of seconds and/or frames into the other clip or collection. These times refer to the trimmed ranges of the clips in some embodiments.

The asset object 525, as shown, includes an asset ID, reference to a source file, and a set of source file metadata. The asset ID identifies the asset, while the source file reference is a pointer to the original media file. As shown, the source file metadata 530 includes the file type (e.g., audio, video, movie, still image, etc.), the file format (e.g., ".mov", ".avi", etc), a set of video properties 535, a set of audio properties 540, and additional metadata. The set of audio properties 540 includes a sample rate, a number of channels, and additional metadata. Some embodiments include additional properties, such as the file creation date (i.e., the date and/or time at which the media was captured (e.g., filmed, photographed, recorded, etc.)).

In some embodiments, a set of metadata from the source file metadata 530 is displayed in the event browser (e.g., as part of a list view as will be described in detail below in Section VIII). The data structure of the asset object 525, as well as several other objects, may be populated when the source file is imported into the media editing application. In some embodiments, the asset object 525 additionally store override data that modifies one or more of the video or audio properties. For instance, a user might enter that a media file is actually 1080p, even though the file's metadata, stored in the asset object, indicates that the video is 1080i. When presented to the user, or used within the application, the override will be used and the media file will be treated as 1080p.

Different from a folder or bin-like object that stores direct or indirect reference to each file that it contains, the keyword collection object 545 includes a reference to a keyword. As such, a keyword collection references a keyword to identity or filter a group of files (e.g., media clips) to display only those that have been tagged with the keyword. In comparison, a folder or bin-like object references (e.g., directly or indirectly) a file that it contains. This difference between a keyword collection and a folder-type or bin-type collection will be further illustrated in several of the examples described below. For example, in FIG. 14, when two media clips tagged with a keyword are moved from one event collection to another event collection, the media clips' keyword associations are carried over to the other event collection. This keyword association causes a keyword collection for the keyword to be created in the other event collection.

In the example illustrated in FIG. 5, the keyword collection object 545 includes a reference to a keyword of the keyword set object 520. However, the relationship between the keyword collection and the keyword set object may be expressed differently, in some embodiments. Here, the keyword collection object 545 is associated or is a part of the event object 505. This is because the keyword collections are hierarchically organized under an event collection in the media editing application. However, the keyword collections may exist in their own hierarchy or as a part of different hierarchy.

As shown in FIG. 5, the keyword collection object 545 includes other attributes. In some embodiments, these attributes include attributes similar to a folder or bin, such as a creation date. These attributes may include other collection objects (e.g., filter or smart collection objects). Several examples of keyword collections that are associated with or contain other collections are described below by reference to FIGS. 25 and 26.

As shown in FIG. 5, the keyword set object 520 includes a keyword set 550, range attributes, note, and other keyword attributes. In some embodiments, the keyword set 550 is a set of one or more keywords that are associated with a range of the clip object 510. The keyword set may be specified by a user of the media editing application. As will be described below, the keyword set may be automatically specified by the media editing application. Several examples of automatically assigning one or more keywords by analyzing media clips will be described below by reference to FIGS. 24-27.

In some embodiments, the keyword set object 520 is a type of anchored object. For example, in the example illustrated in FIG. 5, the keyword set object may include an anchor offset that indicates that it is anchored to the clip object 510 at x number of seconds and/or frames into the range of the clip (e.g., the trimmed range of the clip).

In some embodiments, the keyword object's range attribute indicates a starting point and an ending point of the range of a clip that is associated with the keyword set. This may include the actual start time and end time. In some embodiments, the range attributes may be expressed differently. For example, instead of a start time and an end time, the range may be expressed as a start time and duration (from which the end time can be derived). As mentioned above, in some embodiments, a keyword set object 520 is a type of anchored object. In some such embodiments, the anchor offset is associated with or indicates a starting point of the range of a clip associated with the keyword. Accordingly, the keyword set object 520 may only store the starting point or the anchor offset, in some embodiments.

The note attribute, in some embodiments, is a field that the user can enter for the range of the media clip associated with the keyword set. A similar note attribute is also shown for the clip object 510. This allows a clip object or a collection object to be associated with a note. Several examples of specifying a note for a clip or a keyword range will be described below by reference to FIG. 37.

One of ordinary skill will also recognize that the objects and data structures shown in FIG. 5 are just a few of the many different possible configurations for implementing the keyword organization features of some embodiments. For instance, in some embodiments, instead of the clip object indirectly referencing a source file, the clip object may directly reference the source file. Also, the keyword collection may not be a part of an event object but may be part of a different dynamic collection structure (e.g., folder structure, bin structure) or hierarchical structure. In addition, a keyword set object, in some embodiments, is a keyword object representing only one keyword instead of a set of one or more keywords. In some such embodiments, each keyword object includes its own range attribute, note attribute, etc. Also, additional information regarding data structures are described in U.S. patent application Ser. 13/111,912, now published as U.S. Publication 2012/0209889, entitled "Data Structures for a Media-Editing Application". This Application is incorporated in the present application by reference.

III. Example Keyword Operations

Figure 6:
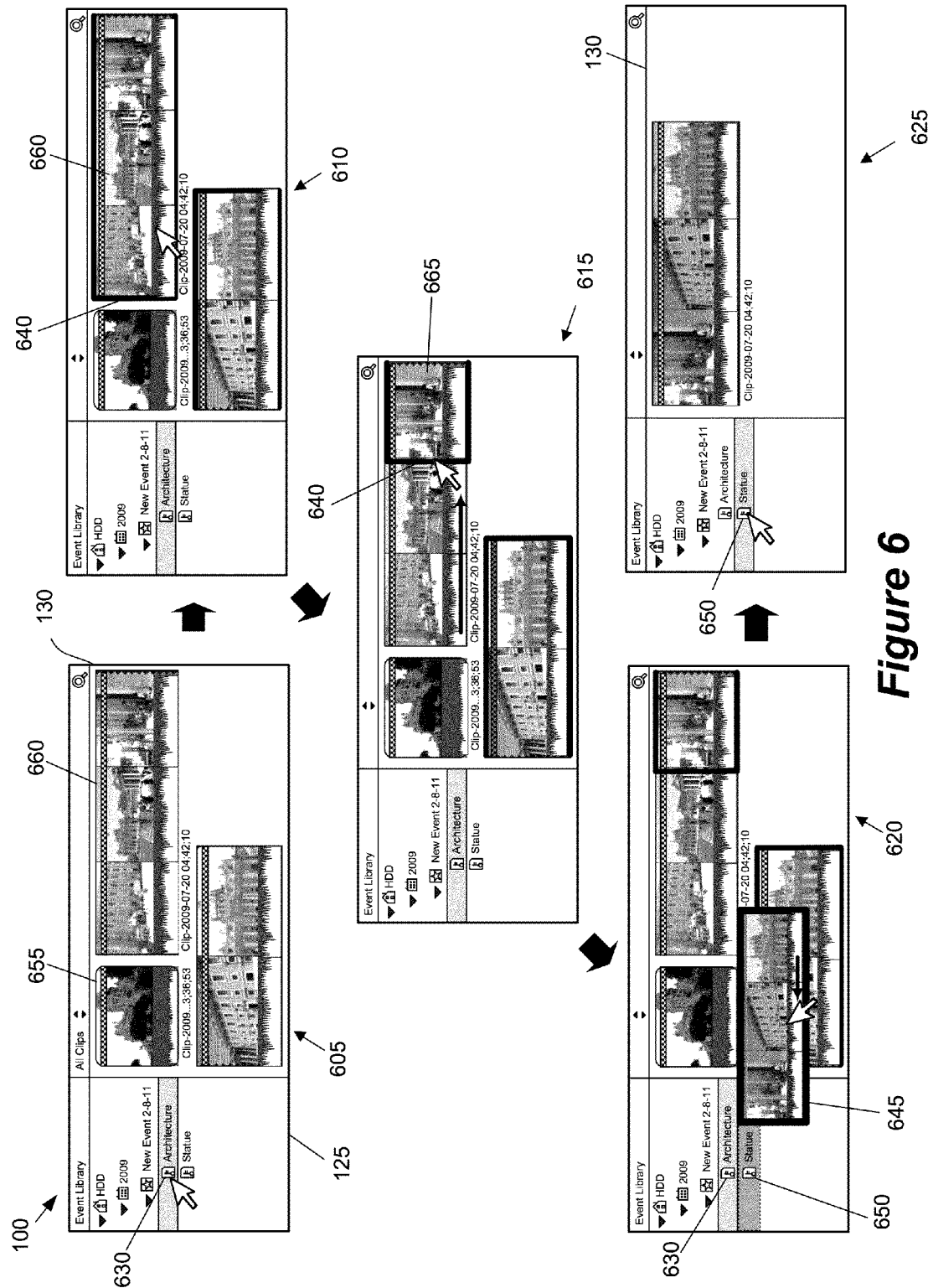
FIG. 6 illustrates creating a keyword association by dragging and dropping a range of a clip from one keyword collection to another.

FIG. 6 illustrates creating a keyword association by dragging and dropping a range of a clip from one keyword collection to another. Five operational stages 605-625 are shown in this figure. The event library 125 and the event browser 130 are the same as those illustrated in FIG. 1.

The first stage 605 shows the event library 125 and the event browser 130. The user has selected a keyword collection 630 that is displayed in the event library 125. The selection causes the event browser 130 to display contents of the keyword collection 630. As shown in this first stage 605, two video clip representations 655 and 660 are displayed in the event browser 130. The representations are similar to the ones described above by reference to FIG. 3. However, in the example illustrated in FIG. 6, the representation 660 shows multiple thumbnail images. These thumbnail images represent a sequence of different images of the video clip at different instances in time.

The second stage 610 shows a selection of the representation 660. The selection causes a range selector 640 to appear. The third stage 615 shows the user interacting with the range selector to select a range of the video clip. Specifically, the left edge of the range selector 640 is moved along the virtual timeline to a third thumbnail image 665.

The fourth stage 620 shows a drag and drop operation to associate the range of the video clip with a keyword. As shown, the user drags and drops the range from the keyword collection 630 to a keyword collection 650. This in turn causes the range of the video clip to be marked with a keyword associated with the keyword collection 650.

The fifth stage 625 shows the GUI 100 after the drag and drop operation. Here, the user selects the keyword collection 650 from the event library 125. The selection causes the event browser 130 to display only the range of the video clip marked with the keyword of the keyword collection 650.

In the previous example, a range of a clip is associated with a keyword through a drag and drop operation. Some embodiments allow a user to (1) create a compound clip from multiple different clips and (2) tag a range that spans one or more of the multiple clips in the compound clip. In some embodiments, a compound clip is any combination of clips (e.g., in a timeline, in an event browser) and nests clips within other clips. Compound clips, in some embodiments, can contain video and audio clip components, clips, and other compound clips. As such, each compound clip can be considered a mini project or a mini composite presentation, with its own distinct project settings. In some embodiments, compound clips function just like other clips; a user can add them to a project or timeline, trim them, retime them, and add effects and transitions. In some embodiments, each compound clip is defined by data structures of the clip object or the collection object similar to those described above by reference to FIG. 5.

In some embodiments, compound clips can be opened (e.g., in the timeline, in the event browser) to view or edit their contents. In some such embodiments, a visual indication or an icon appears on each compound clip representation. This visual indication indicates to the user that the contents of the compound clip can be viewed or edited.

Figure 7:
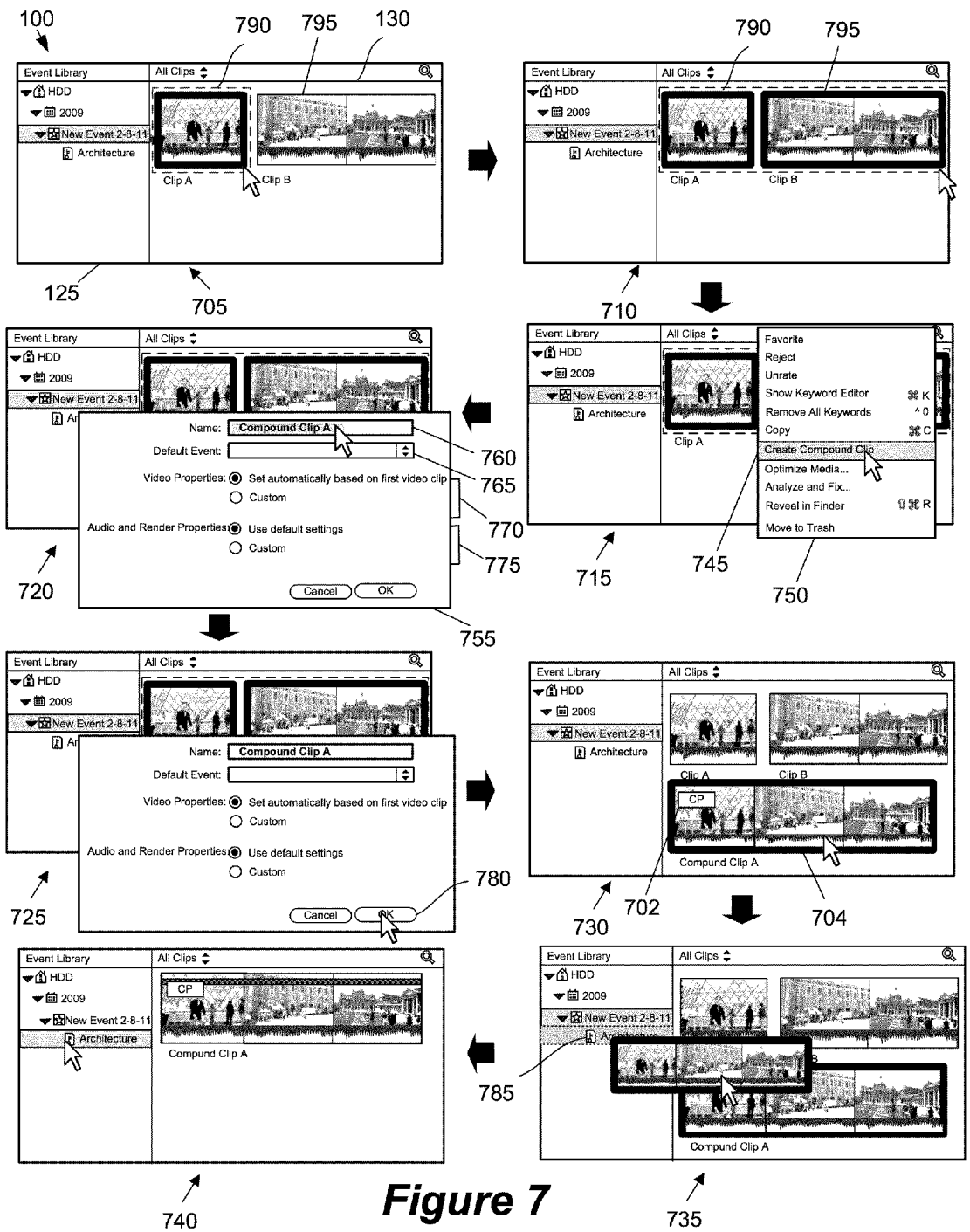
FIG. 7 illustrates creating a compound clip and associating the compound clip with a keyword.

FIG. 7 illustrates creating a compound clip and associating the compound clip with a keyword. Eight operational stages 705-740 of the GUI 100 are shown in this figure. The first stage 705 shows two video clips (790 and 795) in an event browser 130. Here, the user selects the video clip 790. The second stage 710 shows the selection of the video clip 795 along with the video clip 790. The user might have selected an area of the event browser covering both of the clips (790 and 795) in order to select them. Alternatively, the user might have first selected the video clip 790 and then selected the video clip 795 while holding down a hotkey that facilitates multiple selections.

The third stage 715 shows the activation of a context menu 750. This menu includes an option 745 to create a compound clip from the selected clips 790 and 795. As shown in the fourth stage 720, the selection of the option 745 causes a compound clip options window 755 to appear. The window 755 includes (1) a text field 760 for inputting a name for the compound clip, (2) a selection box 765 for selecting a default event collection for the compound clip, (3) a set of radio buttons 770 for specifying video properties (e.g., automatically based on the properties of the first video clip, custom), and (4) a set of radio buttons 775 for specifying audio properties (e.g., default settings, custom).

In the fourth stage 720, the user inputs a name for the compound clip. The fifth stage 725 shows selection of the button 780 to create the compound clips based on the settings specified through the compound clip options window 755. As shown in the sixth stage 730, the selection causes a compound clip 704 to appear. The compound clip 704 includes a marking 702, which provides an indication to a user that it is a compound clip. In some embodiments, the marking 702 is a user-selectable item that, when selected, reveals both clips and/or provides an option to view or edit the individual clips in the compound clip 704. As shown in the sixth stage 730, the user selects the compound clip 704. In the seventh stage 735, the compound clip is dragged and dropped onto a keyword collection 785. The drag and drop operation causes the compound clip to be associated with a keyword of the keyword collection 785. As the entire clip was dragged and dropped onto the keyword collection 785, the association spans all of the entire ranges of the clips that define the compound clip 704.

Lastly, the eighth stage 740 shows selection of the keyword collection 785. The selection causes the event browser 130 to be filtered down to the compound clip 704 associated with the keyword of the keyword collection 785.

Figure 8:
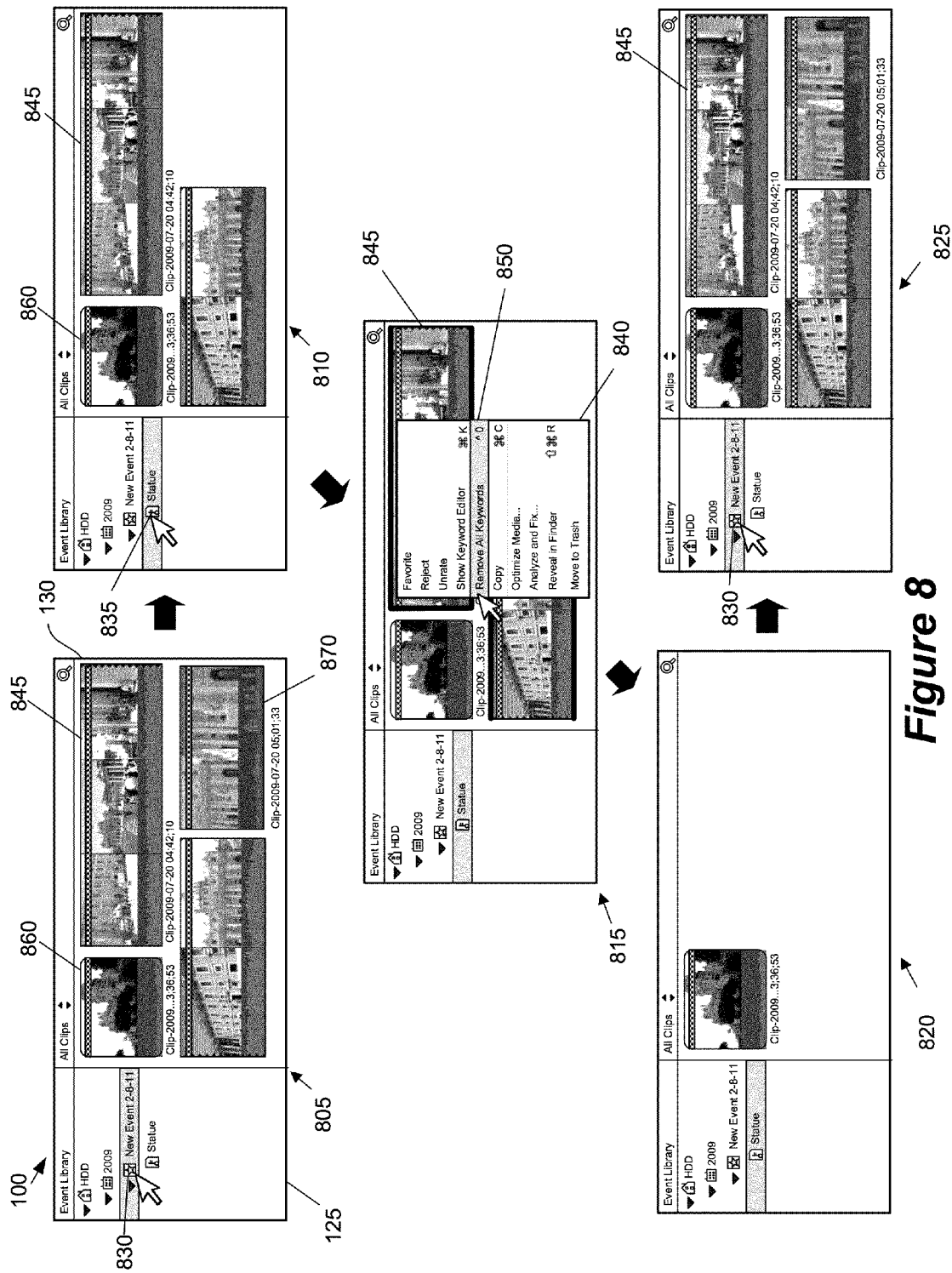
FIG. 8 illustrates deleting a clip range from a keyword collection.

In the previous two examples, one or more media clips are associated with a particular keyword. FIG. 8 illustrates deleting a clip range from a keyword collection. Five operational stages 805-825 of the GUI 100 are shown in this figure. Specifically, the first stage 805 shows three representations of video clips (860, 845, and 870) in an event collection 830. The second stage 810 shows a selection of a keyword collection 835 from the event library 125. The selection causes the event browser 130 to display contents of the keyword collection 835. The keyword collection 835 includes two video clip representations 860 and 845. These representations represent ranges of video clips marked with a keyword that is associated with the keyword collection 835.

The third stage 815 shows the selection of the representation 845 (e.g., through a control click operation). The selection causes a context menu 840 to appear. The context menu 840 displays several selectable menu items related to the representation's video clip. In the third stage 815, the context menu 840 displays a menu item for copying the video clip (e.g., the clip range) and a menu item 850 for removing all keywords associated with the range of video clip, among other menu items. The user can select any of these menu items. When the user selects menu item 850 in the context menu 840, the media editing application disassociates the keyword from the range of the video clip. As a result, the representation 845 is removed from the event browser 130, as shown in the fourth stage 820.

The fifth stage 825 illustrates the contents of the event collection 830. Specifically, it illustrates that deleting the range of video clip from keyword collection 835 did not remove the video clip from the event collection 830.

Figure 9:
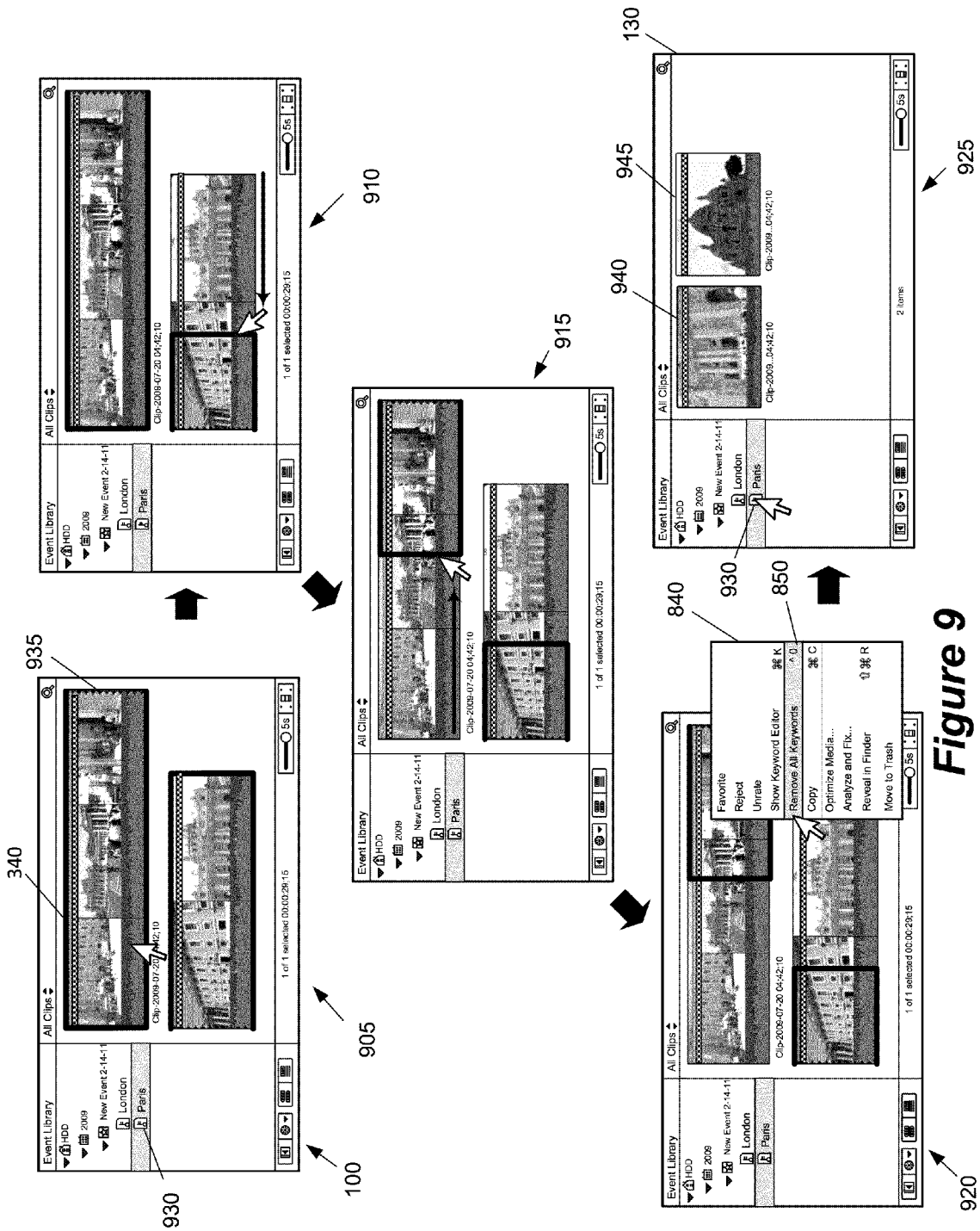
FIG. 9 illustrates removing a keyword from a portion of a clip range.

FIG. 9 illustrates removing a keyword from a portion of a clip range. Five operational stages 905-925 of the GUI 100 are shown in this figure. This figure is similar to the previous example. However, instead of selecting an entire range of a clip from a keyword collection, the user selects a portion of the range. As shown in the first stage 905, a keyword collection 930 includes one video clip representation 935. In stages two and three (910 and 915), the user selects a portion of the clip range using the range selector 340. The fourth stage 920 shows the selection of the representation 935 (e.g., through a control click operation). The selection causes the context menu 840 to appear. When the user selects the menu item 850 in the context menu 840, the media editing application disassociates the keyword from the portion of the range of the video clip.

The fifth stage 925 illustrates the contents of the keyword collection 930 after disassociating the keyword from the portion of the range. Here, two separate representations 940 and 945 are displayed in the event browser 130. As the middle range of the video clip is disassociated with the keyword, the representations 940 and 945 represent the outer ranges that remain associated with the keyword.

Figure 10:
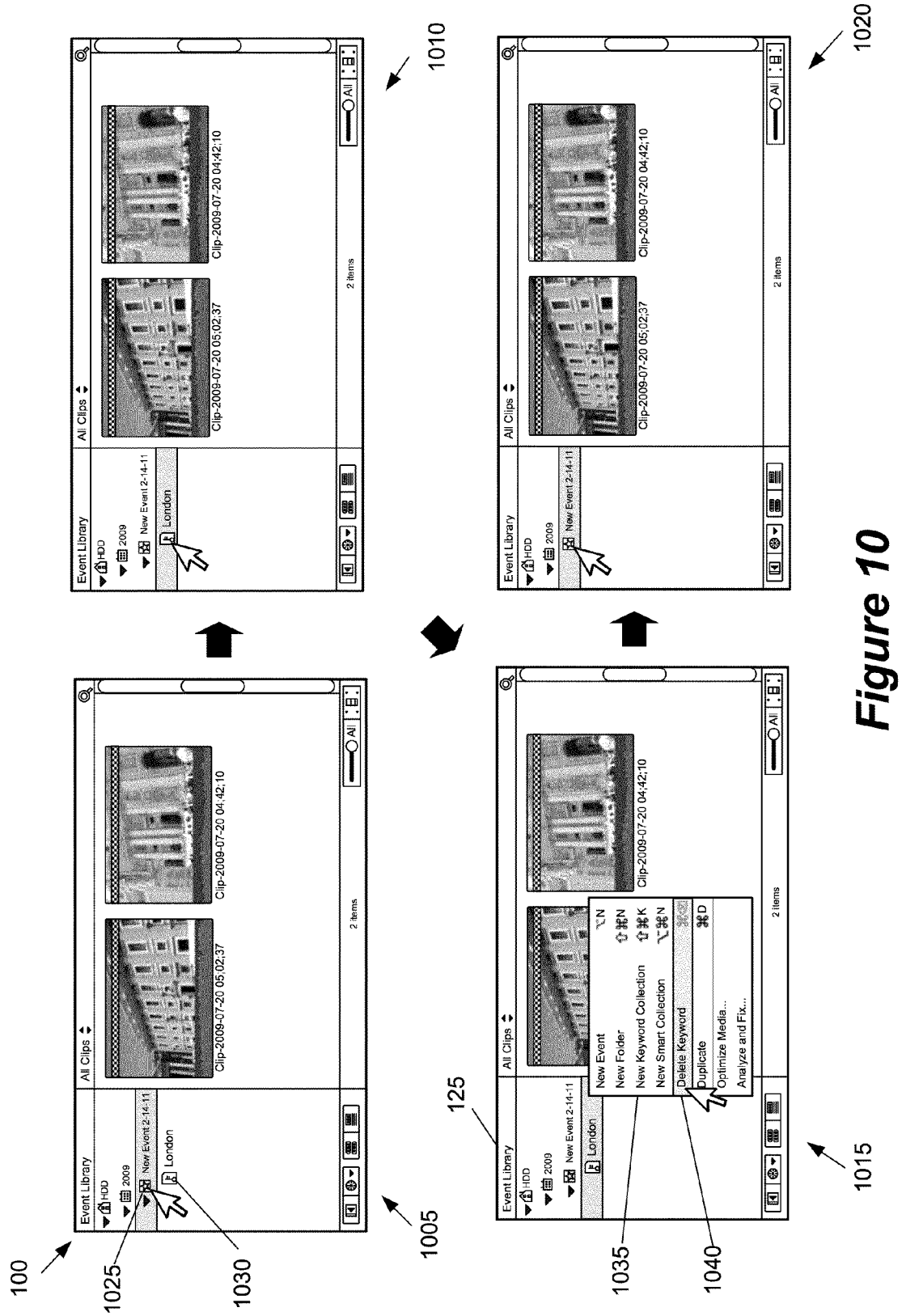
FIG. 10 provides an illustrative example of disassociating multiple ranges of video clips by deleting a keyword collection.

In the previous two examples, a user navigates to a keyword collection to disassociate a keyword from a range of a video clip. FIG. 10 provides an illustrative example disassociating multiple ranges of video clips by deleting a keyword collection. Four operational stages 1005-1020 are illustrated in this figure. Specifically, the first stage 1005 shows the contents of the event collection 1025. As shown, the event collection 1025 includes two video clips that are associated with a keyword. The second stage 1010 shows the contents of the keyword collection 1030 that includes ranges of the two video clips in the event collection 1025.

The third stage 1015 shows the GUI 100 after the user selects the keyword collection 1030 in the event library 125. The selection causes a context menu 1035 to appear. The context menu 1035 includes a selectable menu item 1040 for deleting the keyword collection. When the user selects the menu item 1040, the user is presented with the GUI 100 as illustrated in the fourth stage 1020. In particular, this fourth stage 1020 illustrates that the video clips in the event collection 1025 are not associated with any keywords. In other words, by deleting the keyword collection 1030, the multiple ranges of the different video clips are disassociated with the keyword of the keyword collection. This allows a user to quickly remove keyword associations from a large group of tagged items.

Figure 11:
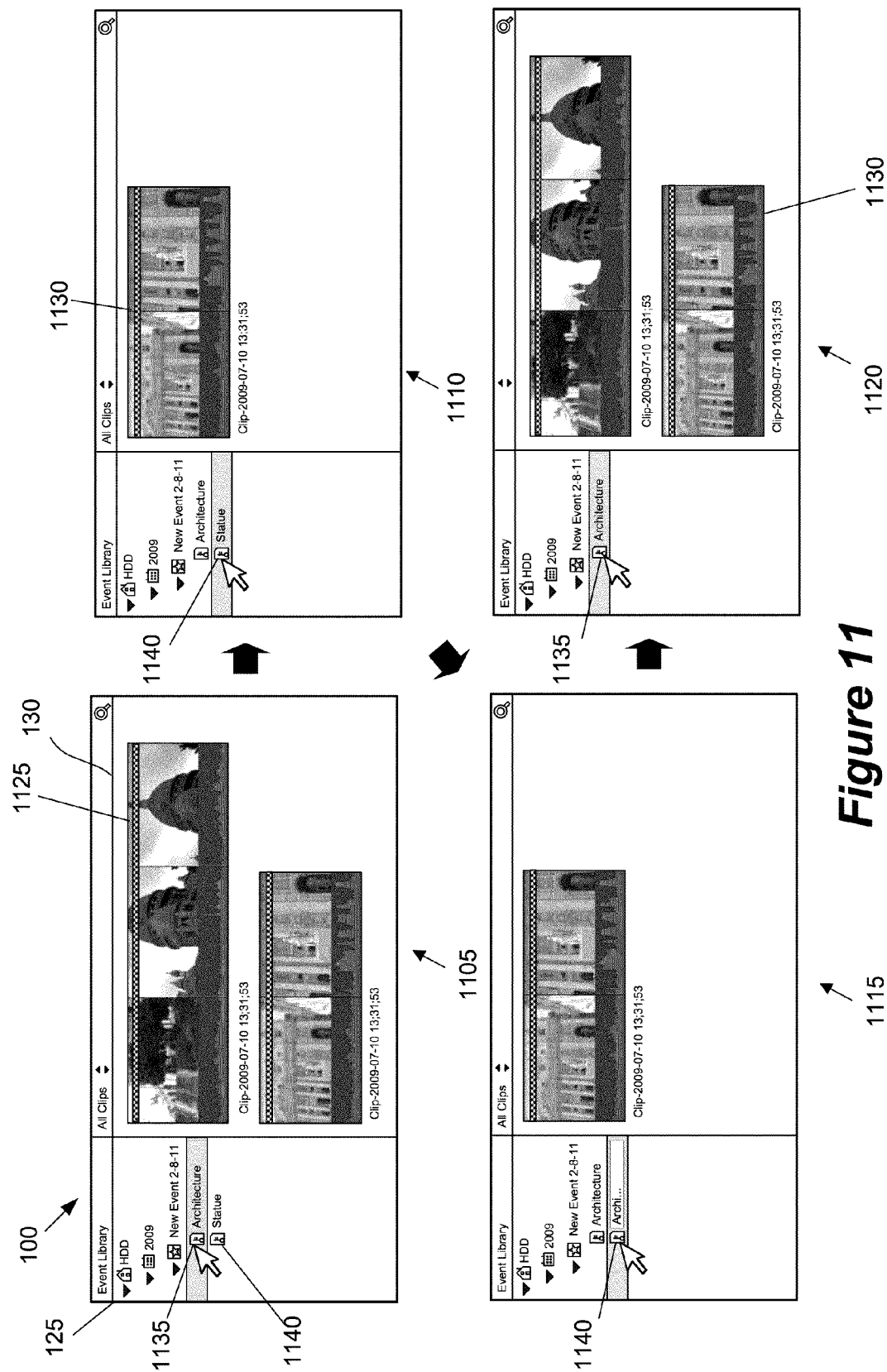
FIG. 11 illustrates combining two keyword collections.

FIG. 11 illustrates combining two keyword collections. Specifically, it illustrates how two keyword collections 1135 and 1140 are combined when one of the collections is renamed to have the same name as the other collection. This renaming operation allows a group of items tagged with a particular keyword to be quickly tagged with another keyword. Four operational stages 1105-1120 of the GUI 100 are shown in this figure.

The first stage 1105 shows that two different keyword collections 1135 and 1140 are listed in event library 125. As a keyword collection 1135 is selected, the event browser 130 displays only each range of the media clip in the collection. Here, the event browser 130 displays a video clip representation 1125. The second stage 1110 shows selection of a keyword collection 1140. The selection causes the event browser 130 to display a video clip representation 1130.

The third stage 1115 shows renaming of the collection 1140. To rename the keyword collection 1140, the user selects the collection 1140 (e.g., through a double click operation). Alternatively, the user can rename the collection through a menu item (e.g., in a context menu). Here, the selection of the collection 1140 causes the collection's name field be highlighted. This indicates to the user that a new collection name can be inputted in this name field.

The fourth stage 1120 shows the event browser 130 after renaming the keyword collection 1140 to a same name as the keyword collection 1135. Specifically, the renaming causes the media editing application to associate the range of the video clip with the keyword of the keyword collection 1135. As a result, the user's selection of keyword collection causes the event browser 130 to display a representation 1130. This representation 1130 represents the range of the video clip that was previously associated with the keyword of the keyword collection 1140.

Figure 12:
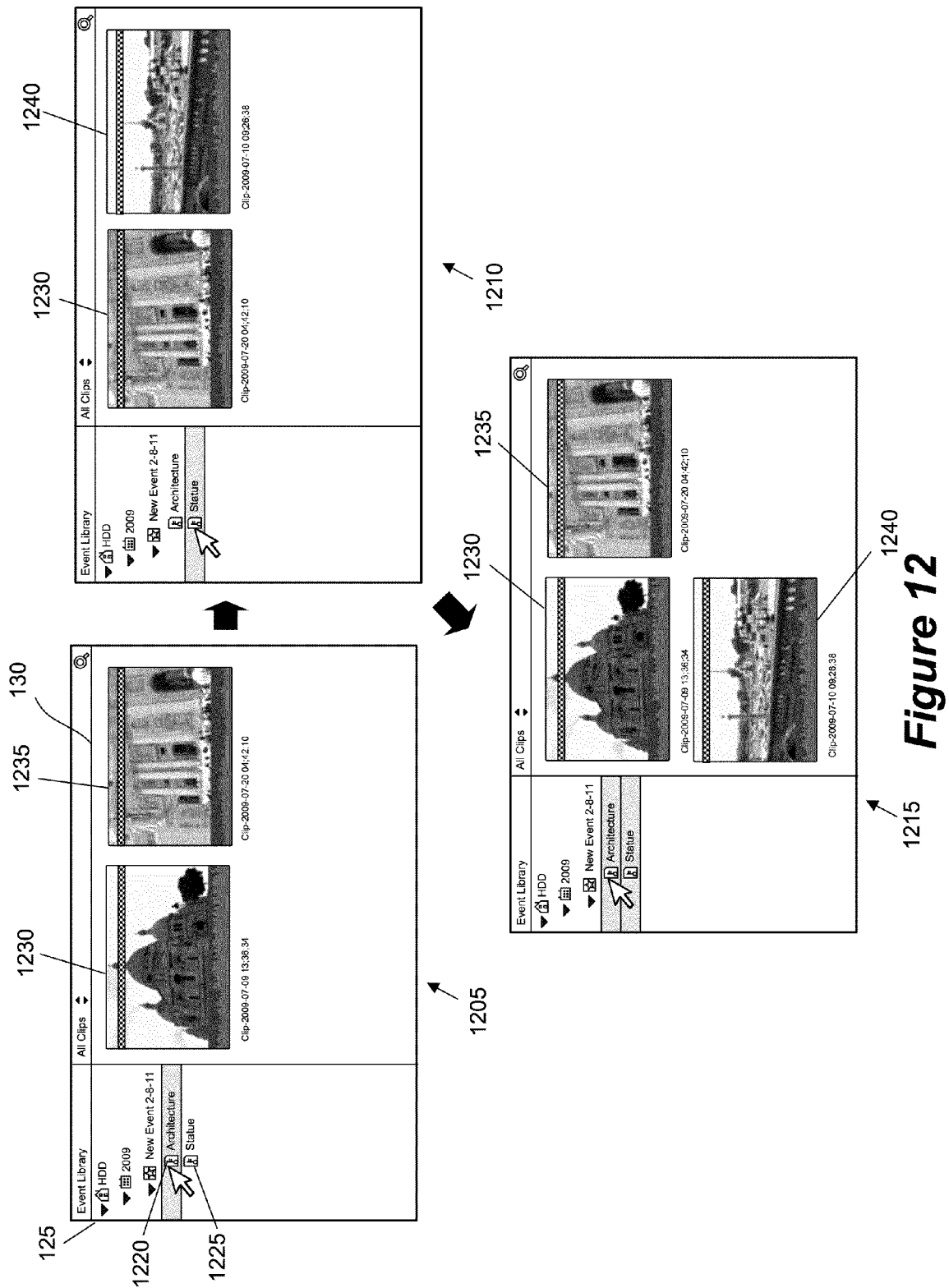
FIG. 12 provides an illustrative example of selecting multiple keyword collections from the event library.

FIG. 12 provides an illustrative example of selecting multiple keyword collections 1220 and 1225 from the event library 125. The first stage 1205 shows contents of the keyword collection 1220. As shown, the keyword collection 1220 includes two video clip ranges 1230 and 1235. The second stage 1210 shows contents of the keyword collection 1225. The keyword collection 1225 includes two video clip ranges 1230 and 1240. The video clip range 1230 is the same as the video clip range in the keyword collection 1220.

The third stage 1215 shows the selections of multiple collections. Specifically, when the collections 1220 and 1225 are both selected, the event browser 130 displays the union of these collections. This is illustrated in the third stage 1215 as the video clip range 1230 shared between the two collections is displayed only once in the event browser 130.

Figure 13:
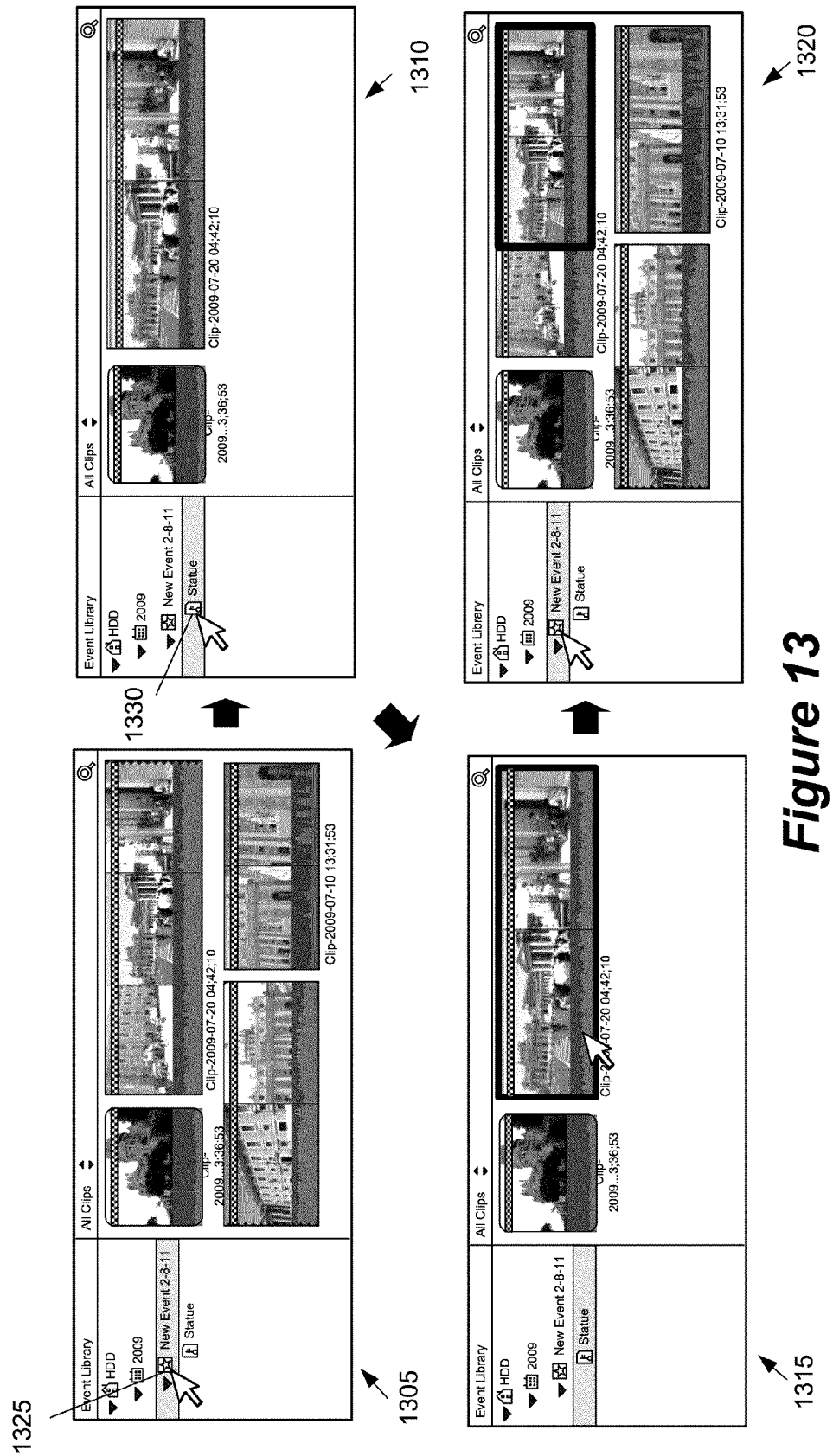
FIG. 13 provides an illustrative example of selecting a video clip range.

FIG. 13 provides an illustrative example of selecting a video clip range. Four operational stages 1305-1320 are shown in this figure. Specifically, this figure illustrates that selecting a range of a clip from a keyword collection selects that range in a corresponding event collection.

The first stage 1305 shows the contents of the event collection 1325. Here, the event collection 1325 includes three video clips. The second stage 1310 shows the contents of the keyword collection 1330. The keyword collection 1330 includes two video clip ranges. The video clip ranges of keyword collection 1330 are different ranges of the video clips from those of the event collection 1325.

The third stage 1315 shows a selection of a video clip range in the keyword collection 1330. The selection causes the range of the video clip to be highlighted in the keyword collection 1330. In the fourth stage 1320, the user navigates to the event collection 1325 after selecting the range in the keyword collection 1330. As shown, the range or portion of the video clip that corresponds to the range in the keyword collection 1330 is also selected in the event collection 1325.

In the example described above, a range of a video clip is selected from a keyword collection. In some embodiments, when a user selects multiple ranges of different clips and then navigates to another collection (e.g., an event collection) with those same clips, the ranges remain selected in the other collection.

Figure 14:
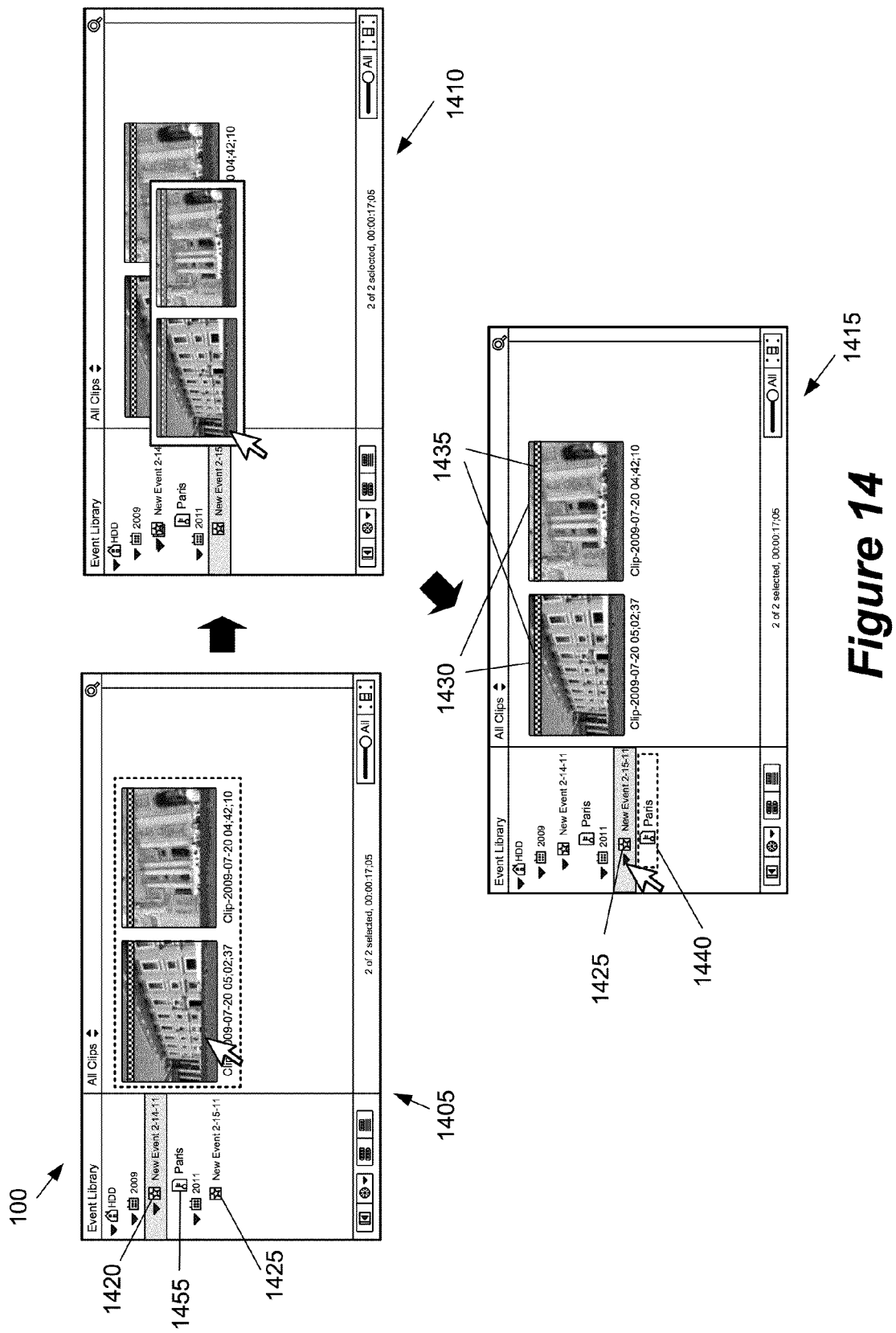
FIG. 14 provides an illustrative example of dragging and dropping clips from one event collection to another event collection.

FIG. 14 provides an illustrative example of dragging and dropping clips from one event collection to another event collection. Specifically, this figure illustrates keyword collections that are automatically created by the media editing application when several clips that are associated with a keyword are dragged and dropped from an event collection 1420 to an event collection 1425. Three operational stages 1405-1415 of the GUI 100 are shown in this figure.

The first stage 1405 shows selection of multiple clips from the event collection 1420. These clips are associated with a keyword of a keyword collection 1455. In the second stage 1410, the user drags the selected clips to the event collection 1425. When the user drops the selected clips into the event collection 1425, the event collection 1425 is associated with the selected clips.

The third stage 1415 shows that the keyword associations of the clips are carried over from one collection to another. In the example illustrated in the third stage 1415, the video clips are associated with the same keyword as they were in the event collection 1420. The event browser indicates this by displaying a bar 1435 over each of the two representations 1430 of the video clips. In addition, the keyword associations of these clips are shown by a keyword collection 1440 that is listed in the event collection 1425.

Figure 15:
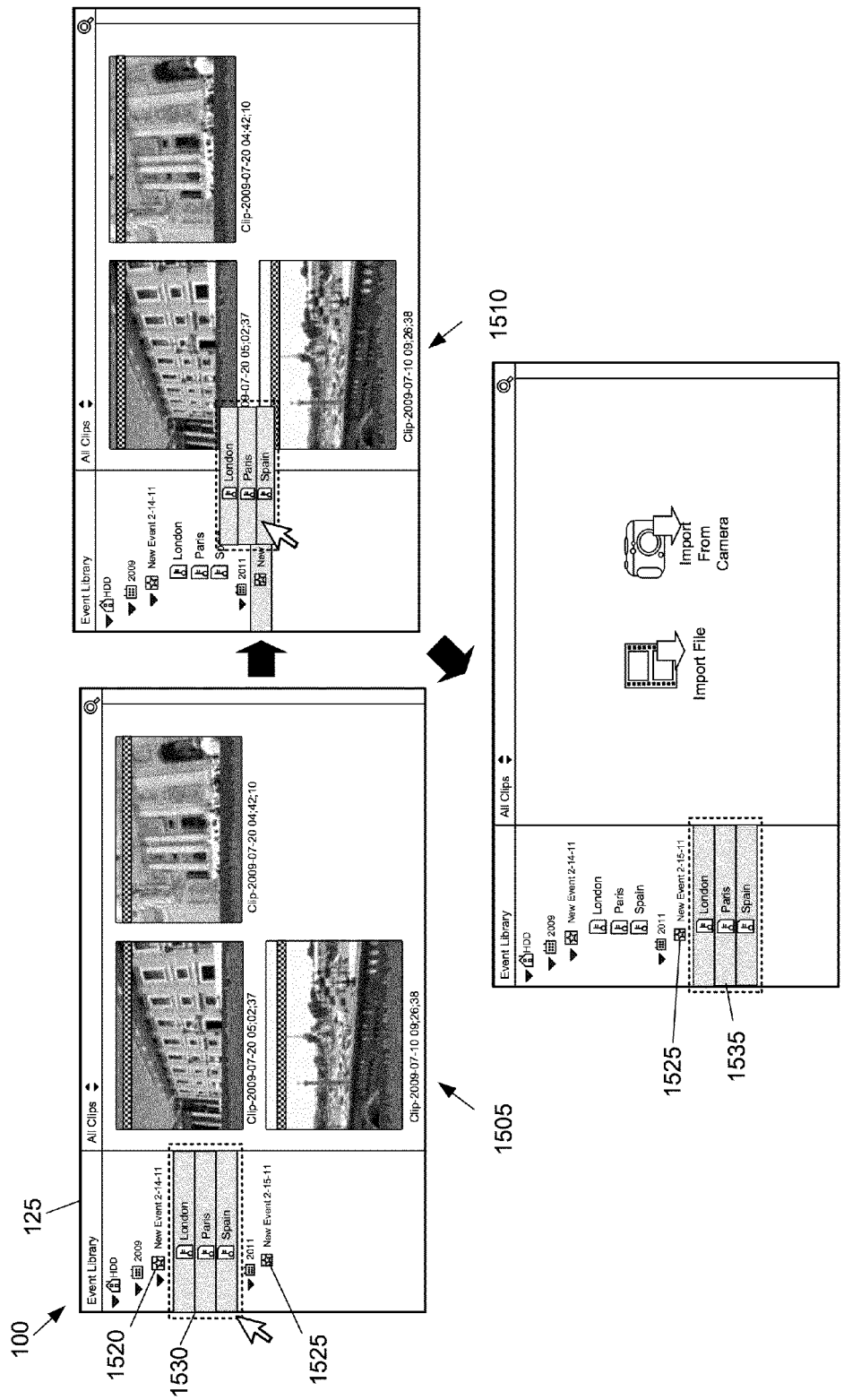
FIG. 15 provides an illustrative example of dragging and dropping keyword collections from one event collection to another event collection.

In the previous example, several clips are dragged and dropped from one event collection to another event collection. FIG. 15 provides an illustrative example of dragging and dropping keyword collections from one event collection to another event collection. Specifically, this figure illustrates how keyword collections are reusable between different collections. Three operational stages 1505-1515 of the GUI 100 are shown in FIG. 15.

As shown in the first stage 1505, the user selects multiple keyword collections 1530 from the event library 125. In the second stage 1510, the keyword collections are dragged and dropped onto the event collection 1525. The third stage 1515 shows the GUI 100 after the drag and drop operation. As shown, the same keyword collections 1535 are listed under the event collection 1525. However, the contents of the keyword collections 1530 are not copied to the event collection 1525. That is, the structure of the event collection 1520 is copied without its contents. This allows a user to easily reuse the structure of one collection without having to rebuild it in another. For example, a photographer may create multiple event collections for different weddings. To recreate a structure of a first wedding collection in a second wedding collection, the photographer can simply copy keyword collections from the first collection to the second collection.

Figure 16:
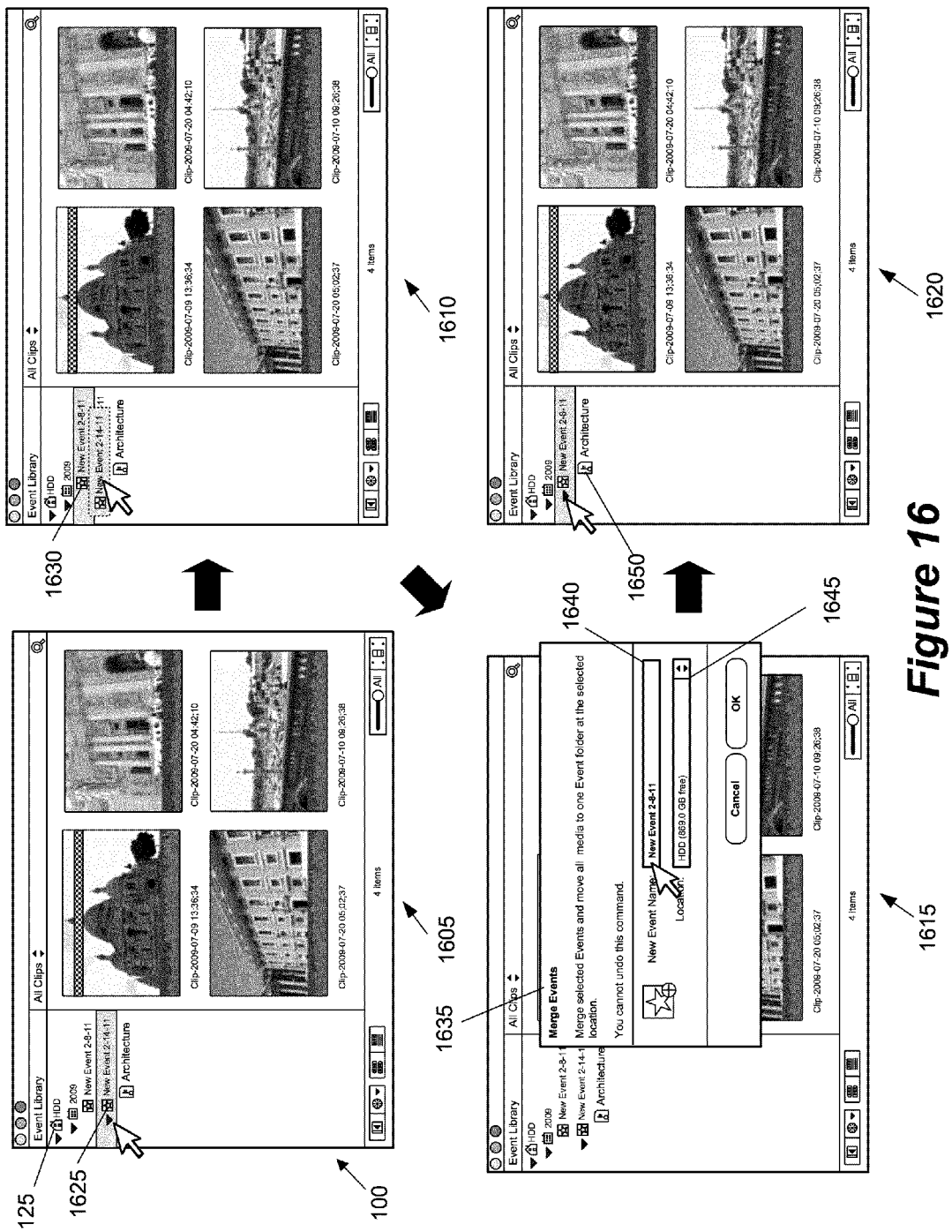
FIG. 16 provides an illustrative example of merging two event collections.

FIG. 16 provides an illustrative example of merging two event collections. Four operational stages 1605-1620 of the GUI 100 are shown in this figure. As shown in the first stage 1605, the user selects an event collection 1625 from the event library 125. In the second stage 1610, the event collection 1625 is dragged and dropped onto the event collection 1630. When the event collection 1625 is dropped onto the event collection 1630, the user is presented with a "merge events" window 1635 as illustrated in the third stage 1615.

As shown in the third stage 1615, the "merge events" window 1635 includes a text field 1640 and a pull-down list 1645. The text field 1640 allows the user to specify a name for the merged event. The pull-down list 1645 allows the user to select a location for the merged event. In the example illustrated in FIG. 16, a hard disk is selected as the location. The "merge events" window 1635 also displays a notification indicating that when two events are merged all media will be merged into one event. The fourth stage 1620 shows the GUI 100 after the merge operations. Here, the contents of the event collection 1625 including a keyword collection 1650 are merged with the event collection 1630.

Figure 17:
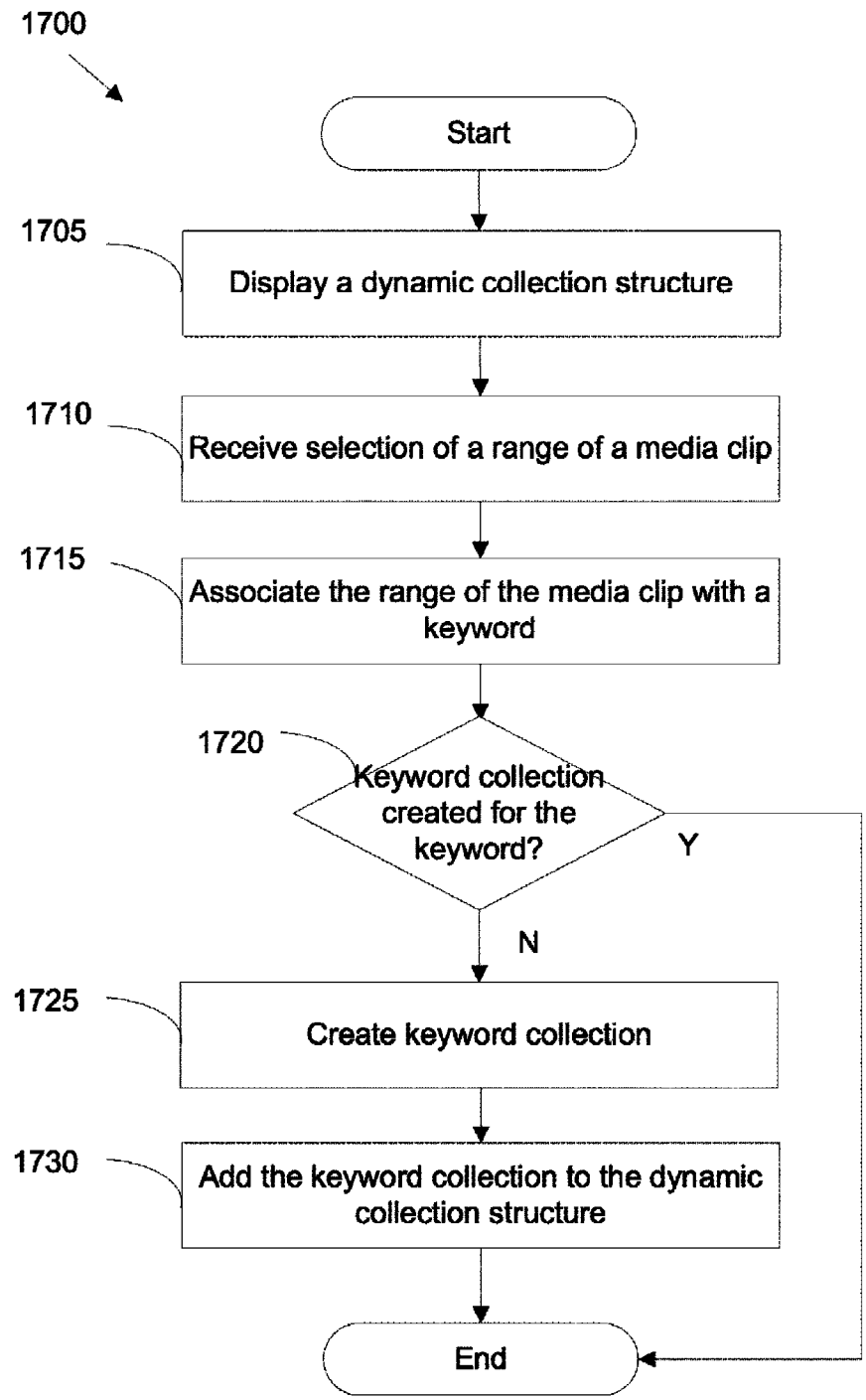
FIG. 17 conceptually illustrates a process for associating a range of a media clip with a keyword.

FIG. 17 conceptually illustrates a process 1700 for associating a range of a media clip with a keyword. In some embodiments, the process 1700 is performed by a media editing application. The process 1700 starts when it displays (at 1705) a dynamic collection structure. An example of a dynamic collection structure is the event library described above by reference to FIG. 1.

The process 1700 then receives (at 1710) a selection of a range of a media clip. For example, a user of the media editing application might select an entire range of a clip or a portion of a media clip. The process 1700 associates (at 1715) the range of the media clip with a keyword.

The process 1700 then determines (at 1720) whether a keyword collection exists for the keyword. When the keyword collection exists, the process ends. Otherwise, the process 1700 creates (at 1725) a keyword collection for the keyword. The process 1700 then adds (at 1730) the keyword collection to the dynamic collection structure. The process 1700 then ends. Here, the new keyword collection is added to a display area or dynamic collection structure without a user having to manually create the new keyword collection. That is, upon association of a new keyword with one or more portion of one or more media clips, a new keyword collection is automatically created and added to the dynamic collection structure.

In some embodiments, when there are multiple collections or folders in a hierarchy, a new keyword represents a keyword that is used at a particular level of the hierarchy and that does not collide with a same keyword that exists at the particular level. For example, different folder or collections may include their own set of media clips associated with one particular keyword (e.g., "architecture"). In this instance, the new keyword represents one keyword that is unique to a particular collection or folder and not necessarily to the overall dynamic collection structure or sub-collection.

IV. Keyword Tagging Tool

Figure 18:
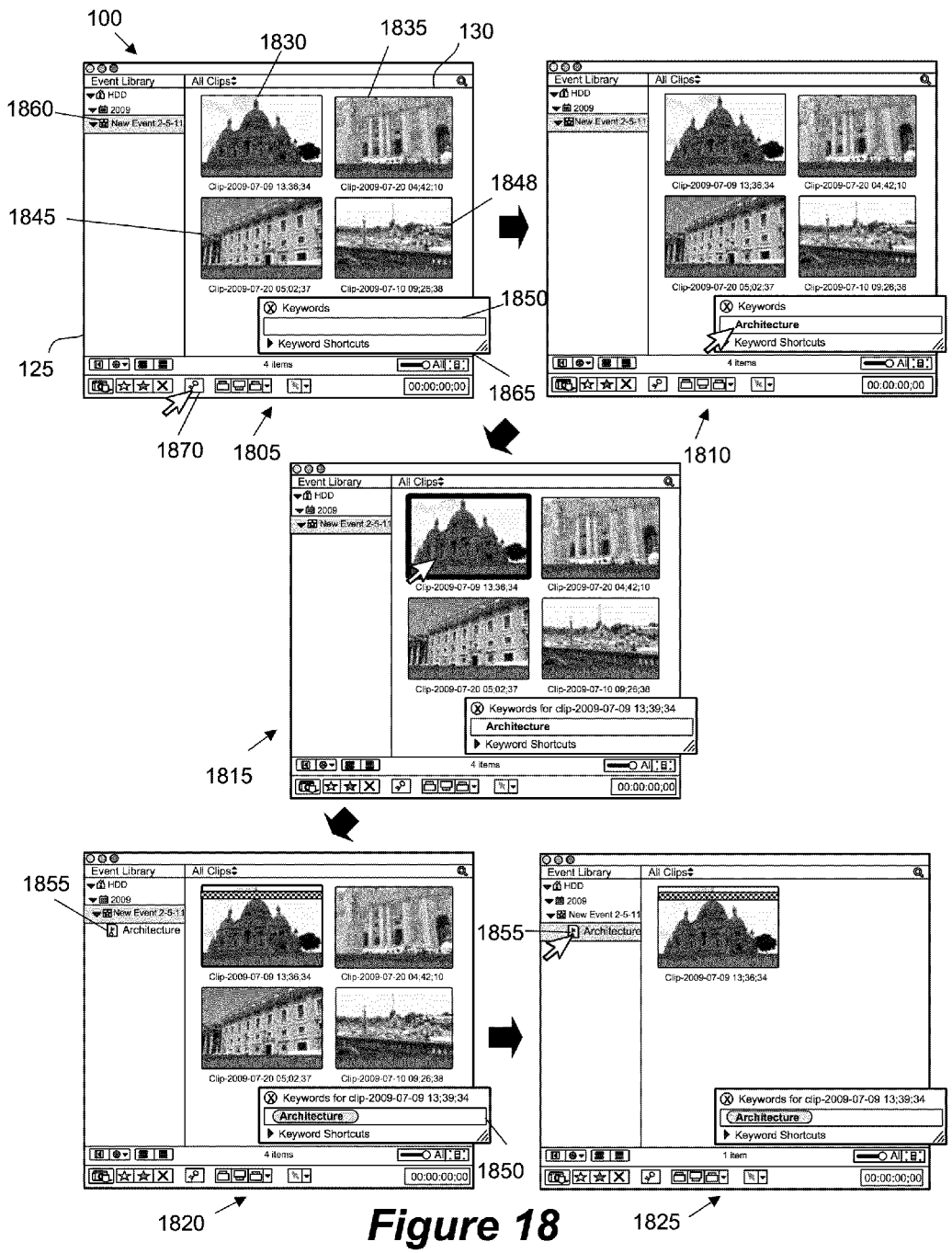
FIG. 18 illustrates an example of a tagging tool according to some embodiments.

In some embodiments, the media editing application provides a tagging tool for associating media content with keywords. FIG. 18 illustrates an example of a tagging tool 1865 according to some embodiments. Specifically, this figure illustrates using the tagging tool 1865 to associate a keyword with a media clip. Five operational stages 1805-1825 of the GUI 100 are shown in FIG. 18. The event library 125 and the event browser 130 are the same as those described above by reference to FIG. 1.

The first stage 1805 shows the tagging tool 1865 that is displayed over the GUI 100. A user might have activated the tagging tool 1865 by selecting a shortcut key, a menu item, or a toolbar item. In the example illustrated in FIG. 18, a user selection of a control 1870 causes the tagging tool to appear and hover over the GUI 100. In the first stage 1805, the event collection 1860 is selected, which causes the event browser 130 to display representations of clips. In the second stage 1810, to input text, the user selects a text field 1850 of the tagging tool 1865. The user then inputs a keyword into this text field 1850.

The third stage 1815 shows a selection of the representation 1830. The selection causes the representation to be highlighted. This provides an indication to the user that entire range of the representation's video clip is selected. The fourth stage 1820 illustrates how a keyword association is created using the tagging tool 1865. Specifically, to associate the keyword with the video clip, the user selects the video clip's representation and selects a key (e.g., an enter key). The selections cause the keyword in the text field 1850 to be associated with the video clip. This in turn causes a keyword collection 1855 to be displayed in the event library 125. In the fifth stage 1825, the user filters the event browser 130 to display only the associated video clip by selecting the keyword collection 1855.

In some embodiments, the media editing application provides keyboard access when the tagging tool 1865 is displayed. In other words, the user can select different hotkeys to perform operations such as playing/pausing a media clip, selecting a range of a clip, inserting a clip into timeline, etc. This allows the user to play and preview different pieces of content while keyword tagging, without having to activate and de-activate the tagging tool. Also, when the tagging tool 1865 is activated, the media editing application does not place any restriction on accessing other parts of the GUI 100, such as the event library 125 and event browser 130. For example, in FIG. 18, the user can select the representation or the keyword collection while the tagging tool 1865 is activated.

Figure 19:
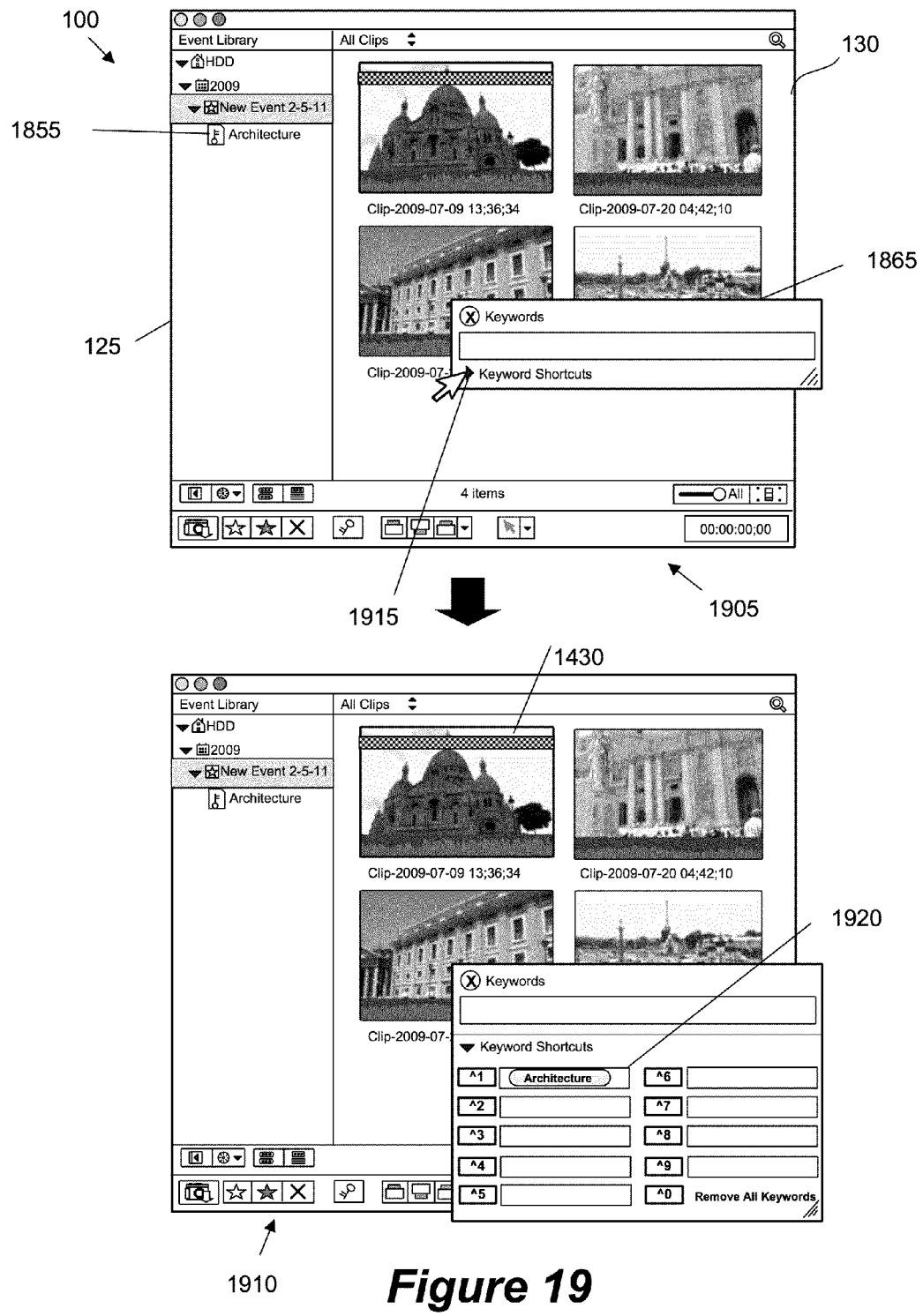
FIG. 19 illustrates the media editing application automatically assigning a shortcut key for a previously used keyword.

FIG. 19 illustrates the media editing application automatically assigning a shortcut key for a previously used keyword. Two operational stages 1905 and 1910 of the GUI 100 are shown in FIG. 19. The event library 125 and the event browser 130 are the same as those described above by reference to FIG. 1.

The first stage 1905 shows the tagging tool 1865 of the GUI 100. Also, the user has created the keyword collection 1855 using this tagging tool 1865. As shown, the tagging tool 1865 includes a selectable item 1915. When the user selects the selectable item 1915, the tagging tool 1865 expands to reveal several input fields, as illustrated in the second stage 1910.

The second stage 1910 shows that the tagging tool 1865 includes a number of input fields. Each input field is associated with a particular key combination. A user of the GUI 100 can input keywords in these fields to create different keyword shortcuts.

As shown in the second stage 1910, the text field 1920 of the tagging tool 1865 includes a keyword. Here, the media editing application populated this field after the user used the keyword to tag a video clip. When the user uses another keyword, a subsequent input field may be populated with the other keyword. The user can also input text into any one of the text fields to create custom keyword shortcuts or reassign a previously assigned keyword shortcut. In the example illustrated in FIG. 19, the tagging tool 1865 includes nine different shortcut slots. However, the media editing application may provide more or fewer shortcuts in some embodiments.

In the example described above, the media editing application automatically populates a shortcut key slot with a keyword when the keyword is used to mark one or more clips. Instead of having the application populate the tagging tool, a user can fill up the keyword slots with keywords in order to quickly tag clips using the tool's shortcut feature.

Figure 20:
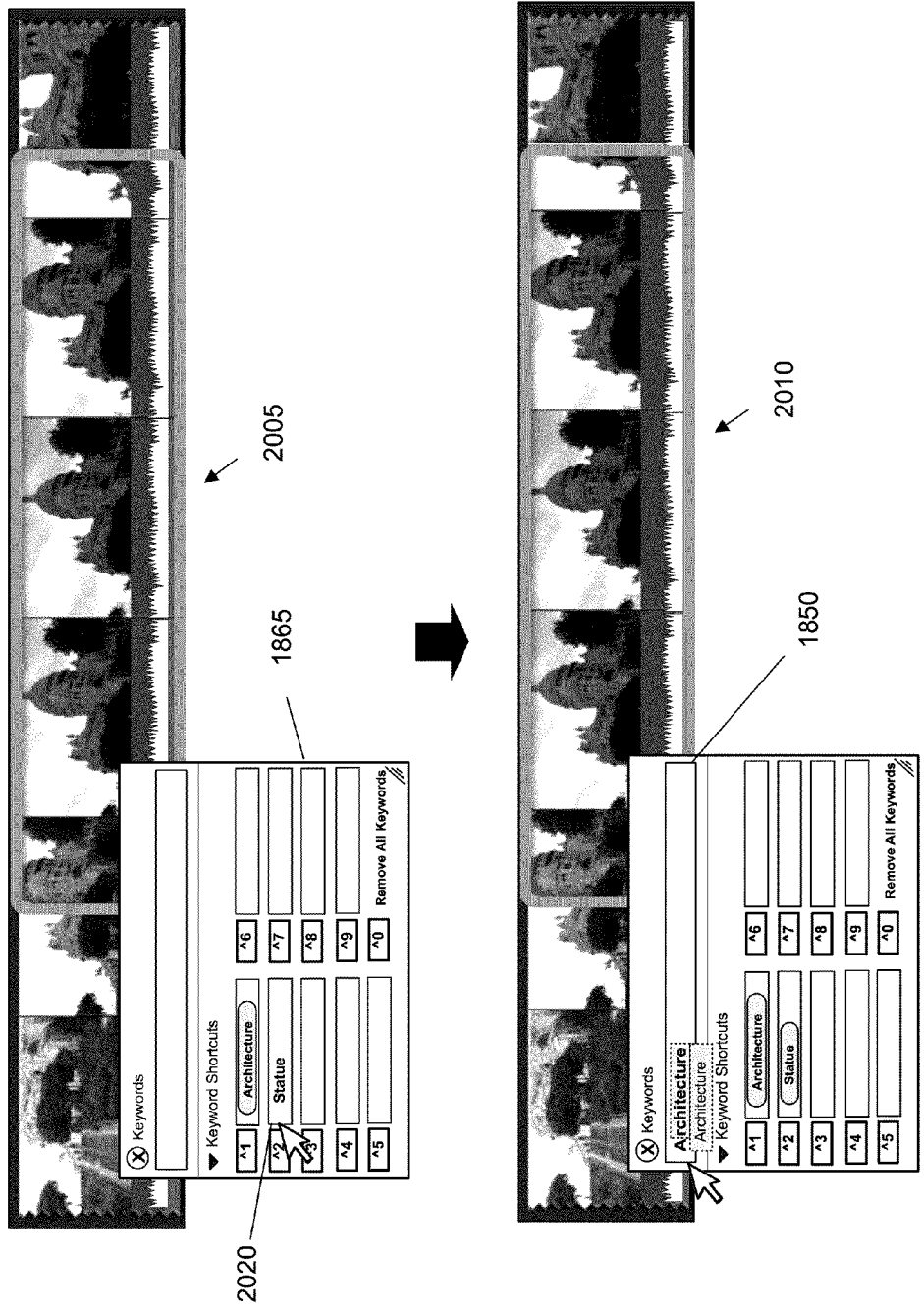
FIG. 20 illustrates an example of using the auto-complete feature of the tagging tool.

FIG. 20 illustrates an example of using the auto-complete feature of the tagging tool 1865. Specifically, the first stage 2005 illustrates a user typing a keyword into a shortcut field of the tagging tool. The second stage 2010 shows the tagging tool 1865 displaying suggested keywords based on user input. Here, as the user types, a previously used keyword, which the user can choose to auto-complete a phrase, is displayed below the text field 1850.

In some embodiments, the media editing application builds a custom dictionary of potential keywords. For instance, the media editing application may store terms or phrases that one or more users have entered, e.g., for more than a certain number of times. In the example illustrated in FIG. 20, the suggested keyword is based on a previously used keyword. However, the tagging bar may provide other suggestions based on the user's interaction with the media editing application. For example, the user may replace the keyword in the input field 2020 without marking any clips with the keyword. However, when the user types a keyword in the text field 1850, the media editing application might suggest the keyword that has been replaced in the field 2020. In conjunction with this learning capability, or instead of it, some embodiments provide a built-in dictionary of common production and editing terms from which the user can choose when tagging an item.

Figure 21:
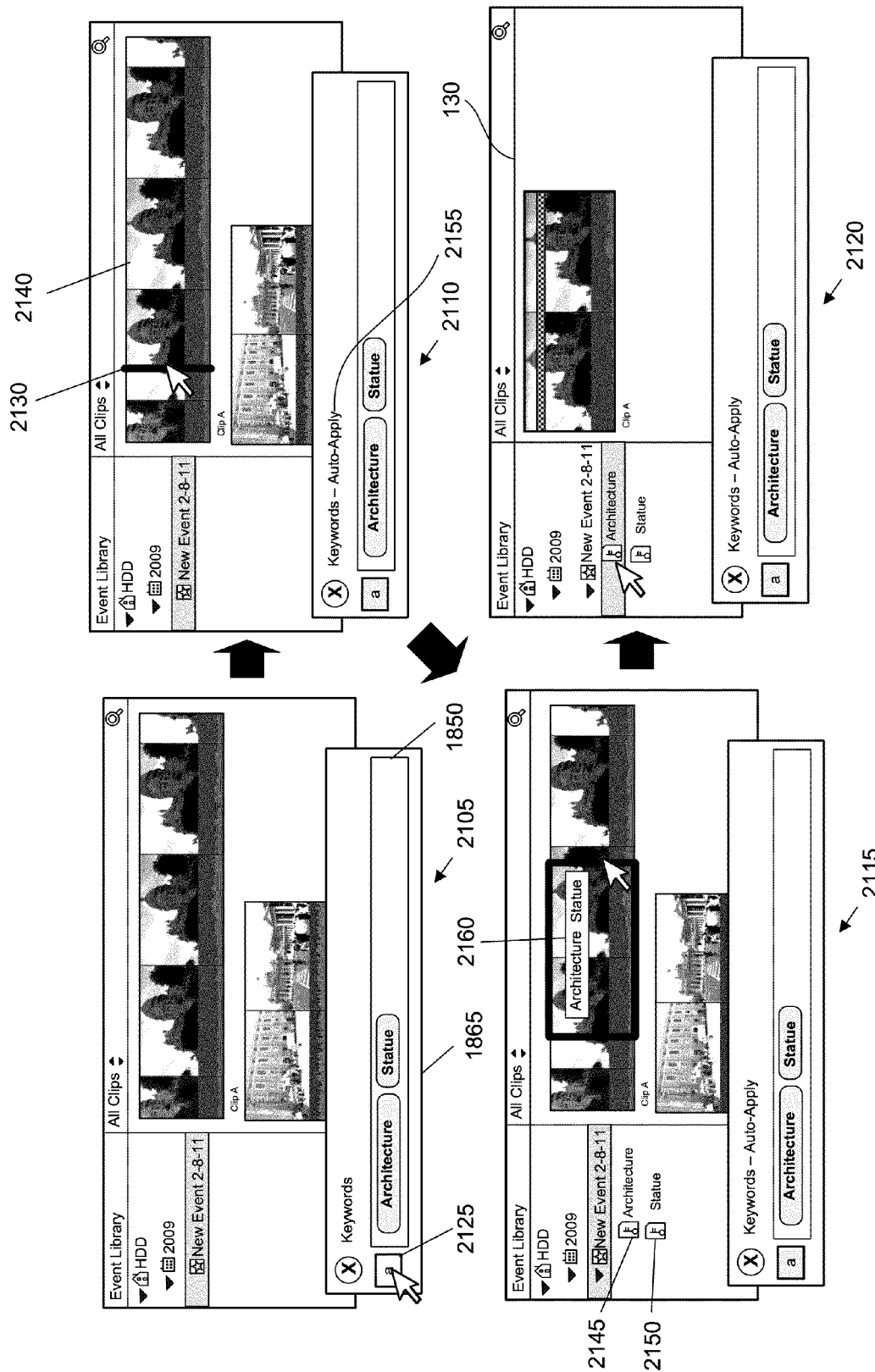
FIG. 21 illustrates an example of using the keyword association tool to perform an auto-apply operation.

In the previous example, the media editing application provides a set of suggested keywords for an auto-fill operation. FIG. 21 illustrates an example of using the keyword tagging tool 1865 to perform an auto-apply operation. Specifically, this figure illustrates how a user can paint over or select a range of a clip, and automatically apply the selected range with one or more keywords. One benefit of the auto-apply feature is that it allows the user to quickly paint over or select many different ranges of different clips to quickly tag them.

In the first stage 2105, the keyword tagging tool 1865 displays two input keywords in the text field 1850. Here, the user activates the auto-apply mode by selecting a user interface item 2125. The selection causes the keyword tagging tool 1865 to display an indication 2155 that the media editing is in an auto-apply mode, as illustrated in the second stage 2110.

In the second stage 2110, the user selects an interior location of a clip representation 2140. The selection causes a range selector 2130 to appear. The third stage 2115 illustrates a selection of a range of the clip represented by the clip representation 2140. In particular, the user uses the range selector 2130 to paint over an area of the clip representation 2140. This causes a corresponding range to be associated with the two keywords in the text field 1850.

As shown in the third stage 2115, the selection of the range causes the media editing application to display an indication 2160 that the range is associated with the two keywords. Specifically, the two associated keywords are displayed over the clip representation 2140 for a set period of time. As the range of the clip is associated with the two keywords, two corresponding keyword collections 2145 and 2150 are also created by the media editing application.

The fourth stage 2120 illustrates the selection of the keyword collection 2145. Specifically, the selection causes the event browser 130 to be filtered down to the range of the clip associated with the keyword of the keyword collection 2145.

Figure 22:
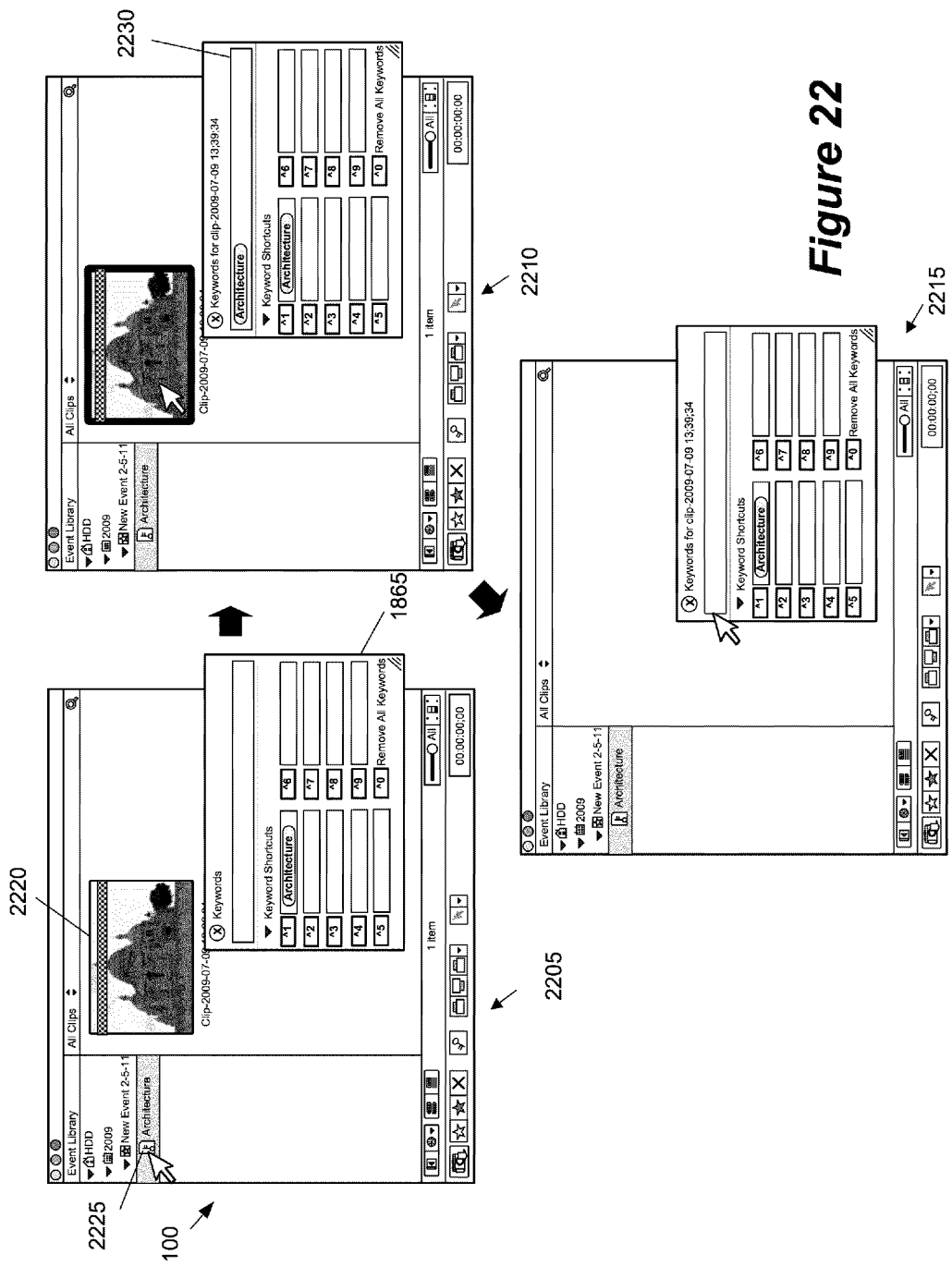
FIG. 22 illustrates removing a keyword from a video clip using the tagging tool.

FIG. 22 illustrates removing a keyword from a video clip using the tagging tool 1865. Three operational stages 2205-2215 of the GUI 100 are shown in this figure. In the first stage 2205, the event browser displays the contents of keyword collection 2225. Specifically, the user selects the keyword collection 2225 from the event library to display a representation 2220 of a clip range.

In the second stage 2210, the user selects the representation 2220. The selection causes the text field to display each keyword associated with the clip. Here, as the range of the video clip is associated with only one keyword, the text field 2230 displays only that keyword. The third stage 2215 illustrates removing the keyword from the text field 2230. Specifically, the user removes the keyword from the text field 2230. This causes the range of the video clip to be disassociated with the keyword. This is illustrated in this third stage 2215 as the representation of the range of the video clip is removed from the keyword collection 2225. Alternatively, the user can select a remove button or a shortcut key to remove all keywords that are associated with the range of the video clip.

Figure 23:
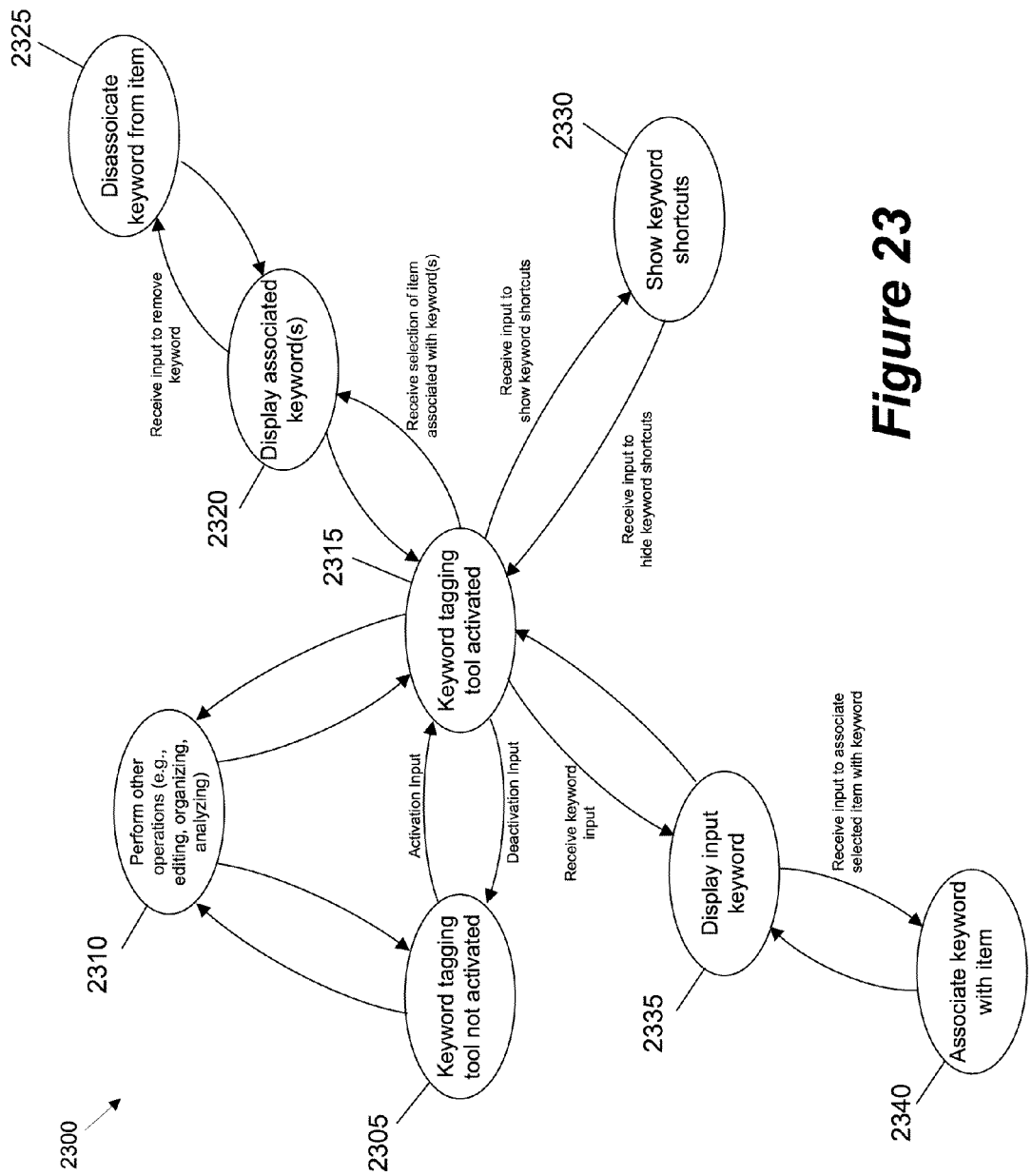
FIG. 23 conceptually illustrates a state diagram of a media-editing application of some embodiments.

FIG. 23 conceptually illustrates a state diagram 2300 of a media-editing application of some embodiments. One of ordinary skill will recognize that the state diagram 2300 does not describe all states of the media-editing application, but instead specifically pertains to several example operations that can be performed with the keyword tagging tool 1865 that is described above by reference to FIGS. 18-22. As shown, the keyword tagging tool (at state 2305) is in a deactivated state. At this state 2305, the media-editing application may be performing (at state 2310) other tasks including import- or editing-related tasks, organizing, playback operations, etc. In addition, at many of the other states, the application could be performing a wide variety of background tasks (e.g., transcoding, analysis, etc.).

At state 2315, the keyword tagging tool 1865 is in an active state based on an input to activate the tool. For example, a user might have selected a toolbar item, selected a hotkey, etc. Similar to the state 2305, the application may be (at state 2310) performing other tasks. As mentioned above, the media editing application, in some embodiments, provides keyboard access when the keyword tagging tool 1865 is activated or displayed. In other words, the user can select different hotkeys to perform operations such as playing/pausing a media clip, selecting a range of a clip, inserting a clip into timeline, etc. This allows the user to play and preview different pieces of content while keyword tagging, and without having to activate and de-activate the keyword tagging tool. Also, when the keyword tagging tool is activated, the media editing application, in some embodiments, does not place any restriction on accessing other parts of the application's GUI, such as the event library and event browser.

In response to receiving a user's selection of an item associated with a set of one or more keywords, the keyword tagging tool 1865 (at state 2320) displays the set of keywords. In the example described above by reference to FIG. 22, the keyword associated with a clip is displayed in an input text field. However, in some embodiments, the keyword may be displayed elsewhere in application's GUI.

In some embodiments, a keyword that is associated with an entire range is displayed differently from a keyword that is applied to a portion of a range. For example, keywords or comments that apply only to a range within the clip may be colored differently (e.g., dimmed) unless the playhead is within the range.

When the displayed keyword is removed from the keyword tagging tool 1865, the application transitions to state 2325. At this state, the media editing application disassociates the keyword from the tagged item. Instead of removing the displayed keyword, some embodiments allow a user to add additional keywords to further mark the selected item. For example, in some embodiments, a new keyword may be inputted in a same field in which the associated keyword is displayed by separating the keywords (e.g., by using a semi-colon).

When the media editing application receives input to show keyword shortcuts, the media editing application transitions to state 2330. Here, if there are any keyword shortcuts, the keyword tagging tool 1865 displays one or more of them. Alternatively, the media editing application may display a group of slots for a user to input keyword shortcuts. An example of such keyword slots or fields is described above by reference to FIG. 20.

As mentioned above, some embodiments automatically populate the keyword shortcuts based on a user's previous interaction with the media editing application. When one or more shortcut keys are specified, each shortcut key, in some embodiments, can be used to associate a selected item with a corresponding keyword regardless of whether the keyword tagging tool 1865 is deactivated or activated. For example, a user of the media editing application may play through a list of clips (e.g., a group of clips displayed in the event browser) and quickly tag one or more the clips that are being played. Several examples of playing and navigating through clips in the event browser are described below by reference to FIG. 41.

When the media editing application receives a keyword input, the keyword tagging tool 1865 (at state 2335) displays the keyword input (e.g., in the tool's input field). In receiving the input, the keyword tagging tool 1865 may provide suggestions for an auto-complete operation. To provide the suggestion, the media editing application, in some embodiments, maintains a database of previous user inputs or interactions. For example, as a user adds comments, the media editing application builds a dictionary of potential keywords (e.g., any term or phrase that the user has entered more than X number of times). When the user types a commonly-used phrase, the media editing application may highlight the phrase (e.g., in the keyword tagging tool 1865). In some embodiments, hovering over the highlighted text reveals a pop-up offering to create a new keyword with the string. In some embodiments, the media editing application comes with a built-in dictionary of common production and editing terms, which the user can choose from when tagging an item. In some embodiments, the media editing application may provide a command or option to add a last typed string as a keyword.

At state 2340, the media application associates the input keyword with an item based on a user's input. For example, a user might have selected a video clip from the event browser and selected a key (e.g., an enter key). Alternatively, the user can tag one more clips in an auto-apply mode. An example of automatically applying keywords to a range of a clip is described above by reference to FIG. 21.

V. Automatic Keyword Organization

Figure 24:
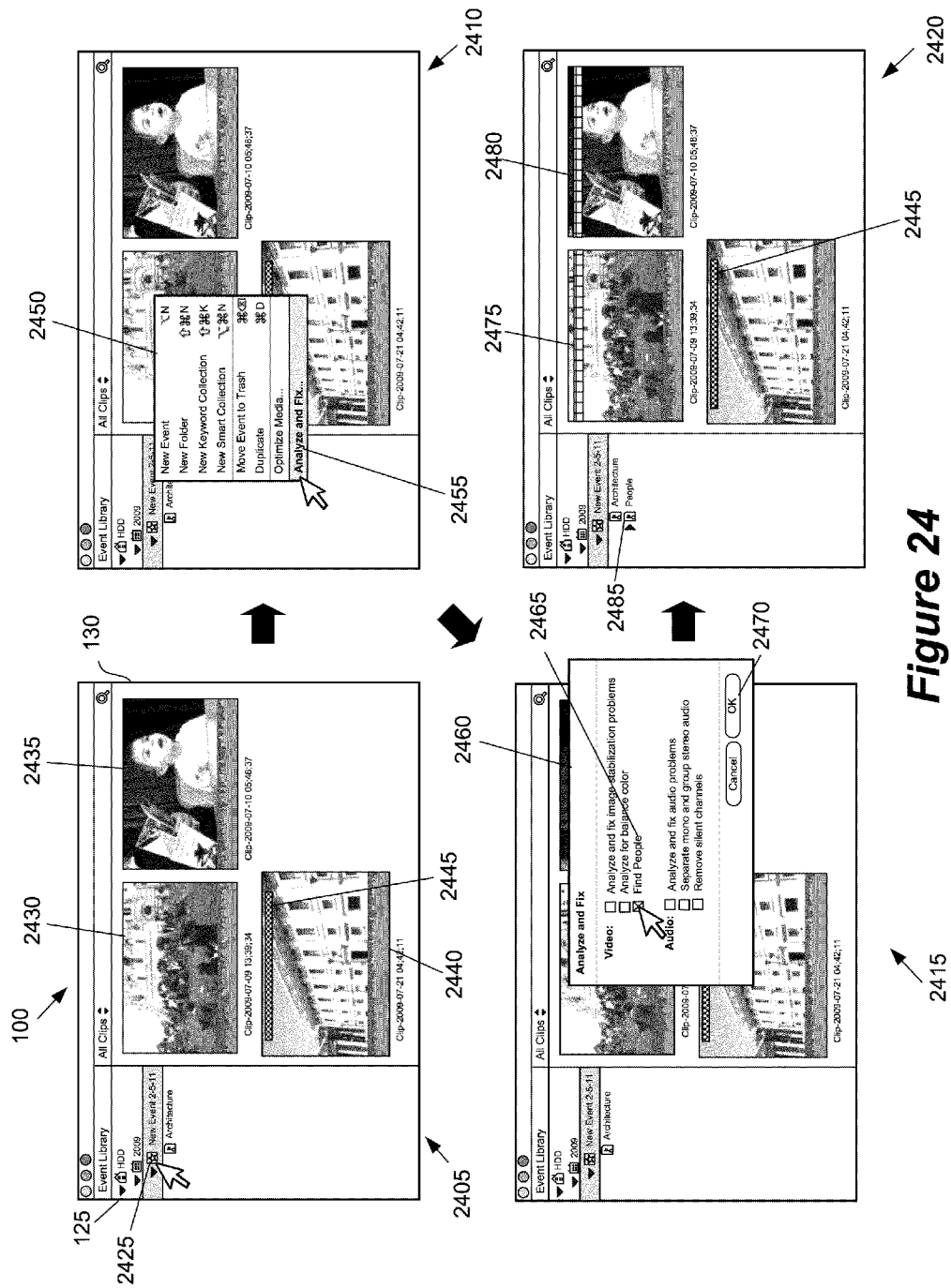
FIG. 24 provides an illustrative example of creating a keyword collection by analyzing content.

Some embodiments of the invention automatically organize content into different keyword collections. In some such embodiments, the media editing application analyzes content, creates one or more keyword collections, and associates the content with the keyword collections. FIG. 24 provides an illustrative example of creating a keyword collection by analyzing content. Four operational stages 2405-2420 of the GUI 100 are shown in FIG. 24. The event library 125 and the event browser 130 are the same as those described above by reference to FIG. 1.

The first stage 2405 shows a user selection of an event collection 2425 from the event library 125. The selection causes the event browser 130 to display representations 2430, 2435, and 2440 for three different video clips. A bar 2445 is displayed over a portion of the representation 2440. This indicates to a user that a range of the representation's video clip is marked with a keyword.

The second stage 2410 shows the GUI 100 after the user selects an area of the event library 125. The selection causes a context menu 2450 to appear. The context menu 2450 includes a selectable menu item 2455 for analyzing and fixing content. When the user selects the menu item 2455, the user is presented with a dialog box 2460 as illustrated in the third stage 2415.

As shown in the third stage 2415, the dialog box 2460 lists several different analysis options. In the example illustrated in FIG. 24, the different analysis options are categorized into either video or audio. The list of video options includes options for (1) analyzing and fixing image stabilization problems, (2) analyzing for balance color, and (3) finding people. The list of audio options includes options for (1) analyzing and fixing audio problems, (2) separating mono and group stereo audio, and (3) removing silent channels.

The image stabilization operation of some embodiments identifies portions of the video in a media file in which the camera appears to be shaking, and tags the media file (or a portion of the media file with the shaky video) with a keyword. The color balancing of some embodiments automatically balances the color of each image in a media file and saves the color balancing information in a color balance file for each media file analyzed.

The color balancing operation adjusts the colors of an image to give the image a more realistic appearance (e.g., reducing tint due to indoor lighting). Different embodiments may use different color balancing algorithms.

The person detection algorithm identifies locations of people in the images of a media file and saves the person identification information in a person detection file for each media file analyzed. The person detection operation of some embodiments identifies faces using a face detection algorithm (e.g., an algorithm that searches for particular groups of pixels that are identified as faces, and extrapolates the rest of a person from the faces). Some embodiments provide the ability to differentiate between a single person (e.g., in an interview shot), pairs of people, groups of people, etc. Other embodiments use different person detection algorithms.

In addition to the video operations, some embodiments include audio analysis operations at the point of import as well. As shown, these operations may include analysis for audio problems, separation of mono audio channels and identification of stereo pairs, and removal of latent audio channels (i.e., channels of audio that are encoded in the imported file or set of files but do not include any actual recorded audio). Other embodiments may make available at import additional or different audio or video analysis operations, as well as additional transcode options.

Returning to FIG. 24, in the third stage 2415, the user selects the find people option 2465 to perform a people analysis operation on the video clips. In some embodiments, the people analysis operation entails detecting a number of persons in a range of a clip shot and the type of shot. For example, the analysis operation may determine that there are x number of person or people (e.g., one person, two persons, group) in a range of a video clip. The analysis operation may determine whether the identified range of the video clip is a close-up, medium, or wide shot of the person or people. In some embodiments, the people detection operations entails identifying a face or faces and determining how much space each identified face takes up in frames of the video clip. For example, if a face takes up 80% of the frame, the shot may be classified as a close-up shot. In some embodiments, the people analysis operation entails identifying faces, shoulders, and torsos.

In the example illustrated in the third stage 2415, the user selects the find people option 2465 and a button 2470. The selections initiate an automatic analysis of the video clips. In some embodiments, the analysis is done as a background task. This allows users to continue interacting with the application's GUI 100 to perform other tasks while the application performs the analysis.

The fourth stage 2420 illustrates the GUI after the application has performed the analysis operations on the video clips. Specifically, this stage shows that the application analyzed each of the three video clips and found people in two of the three video clips. Similar to a piece of media content marked with a keyword, each video clip with people is marked with a bar (2475 or 2480) over a range of the video clip's representation. The range indicates the portion of the video clip with people, as determined by the application based on the people analysis operation.

In some embodiments, the media application displays two different representations for a user-specified keyword and analysis keyword. For example, in the example illustrated in FIG. 24, the media editing application displays each analysis keyword representation (2475 or 2480) in a color that is different from a color of a keyword representation 2445 for a user-specified keyword. Specifically, in the fourth stage 2420, the user-specified keyword is represented as a blue bar and the analysis keyword is represented as a purple bar. However, different types of keywords may be represented differently in some embodiments.

In addition to associating an analysis keyword to the ranges of the video clips, the fourth stage 2420 shows the automatic organization of these ranges into a keyword collection 2485. In some embodiments, these keyword collections are dynamically generated. For example, when the media editing application does not find any people in a video clip, the event browser may not list a keyword collection for people.

Figure 25:
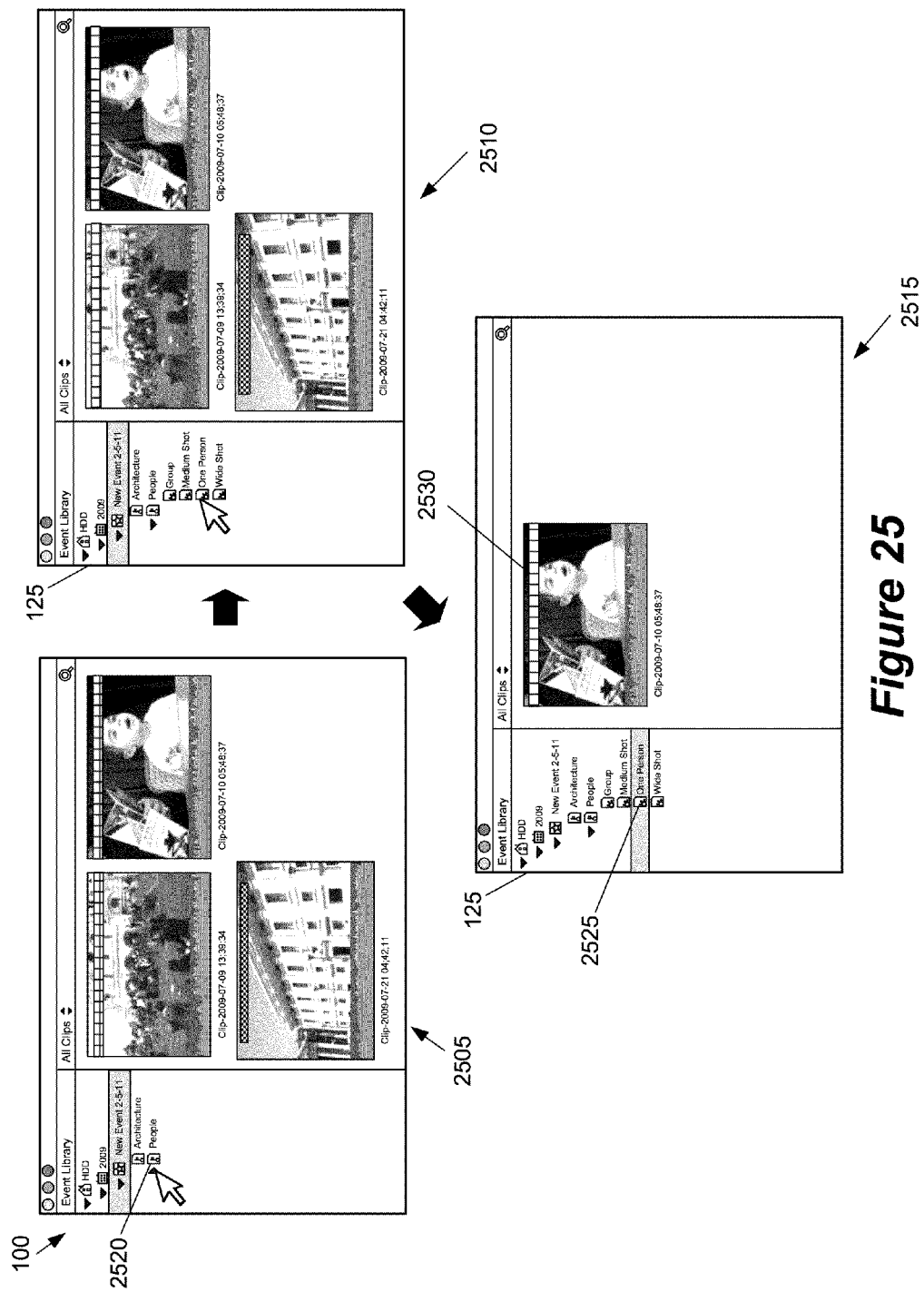
FIG. 25 illustrates an example of different groupings that are created based on an analysis of video clips.

In some embodiments, the media editing application performs additional groupings based on the analysis. FIG. 25 illustrates an example of different groupings that were created based on an analysis of video clips. Three operational stages 2505-2515 of the GUI 100 are shown in FIG. 25. Specifically, the first stage 2505 shows a user selection of the keyword collection 2520. The selection causes the keyword collection 2520 to be expanded to reveal other sub-collections.

The second stages 2510 shows different groupings that are created based on the analysis of the video clip. Here, the media editing application grouped the ranges into different sub-collections. For example, the event library 125 lists a sub-collection for group, medium shot, one person, and wide shot. However, depending on the analysis, the media editing application may group the ranges of clips into other sub-collections. In some embodiments, the media editing application provides options for defining different sub-collections. For example, instead of having separate sub-collections for one person and close-up shots, the media editing application may provide one or more selectable items for creating a sub-collection that contains the one person and close-up shots.

As shown in FIG. 25, when the user selects the sub-collection 2525, the user is presented with the event browser as illustrated in the third stage 2515. As shown in this stage, the event browser is filtered to display only a representation 2530. This representation represents a range of the video clip that includes a one-person shot based on the analysis of the video clips.

In the example described above, the analyzed content is grouped into different sub-collections. Specifically, the ranges of clips are grouped into different smart collections. In some embodiments, smart collections are different from keyword collections in that a user cannot drag and drop items into them. Some embodiments allow the user to create and organize content into different smart collections based on filtering operations. Several examples of creating a smart collection will be described in detail by reference to FIGS. 29 and 30 below.

In some embodiments, the analyzed content may be grouped into other collections. For example, instead of creating one keyword collection, the media editing application may create multiple different keyword collections and organize content into these keyword collections.

In the previous example, a people analysis operation is performed to automatically organize content into a keyword collection and a number of different sub-collections. In some embodiments, the media editing application (1) analyzes media clips and (2) performs correction operation on one or more ranges of the media clips, and (3) organizes the corrected ranges in a keyword collection.

Figure 26:
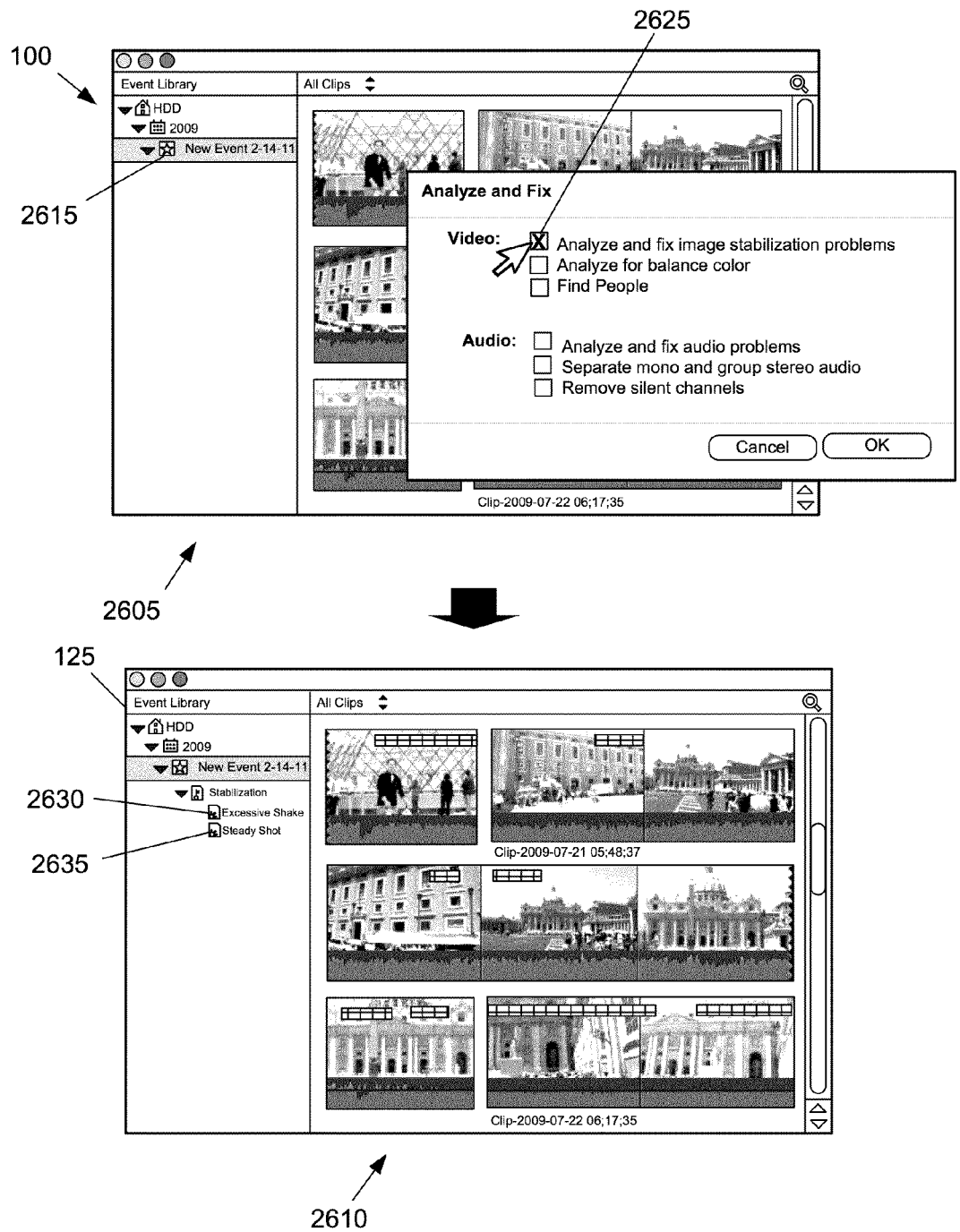
FIG. 26 provides an illustrative example of different groupings that are created after the media editing application has analyzed and fixed image stabilization problems.

FIG. 26 provides an illustrative example of different groupings created after the media editing application has analyzed and fixed image stabilization problems. Two operational stages 2605 and 2610 of the GUI 100 are shown in this figure. This example is similar to the previous examples described above. However, in this example, a user selects an option 2625 for analyzing and fixing image stabilization problems in the first stage 2605. The second stages 2610 shows different groupings that are created based on an analysis of image stabilization. Specifically, the media editing application grouped the clip ranges into different sub-collections. For example, the event library 125 lists a sub-collection 2630 for clip ranges that are corrected (e.g., stabilized). Another sub-collection 2635 is created for other clip ranges that are not corrected or do not need to be corrected. As mentioned above, a sub-collection, in some embodiments, is a filter or smart collection that a user cannot drag and drop items onto.

In some embodiments, a higher level collection or an analysis keyword folder that contains the smart collection is in itself a smart collection. For example, once the media editing application creates different smart collections based on the analysis, a user cannot drag and drop other items onto these smart collections. In some such embodiments, the user can perform an analysis operation to add additional items to these smart collections. For example, a media clip in an event browser and an analysis option may be selected to initiate an analysis operation on the selected media clip in order to add one or more ranges of the media clip to one or more analysis keyword collections.

Figure 27:
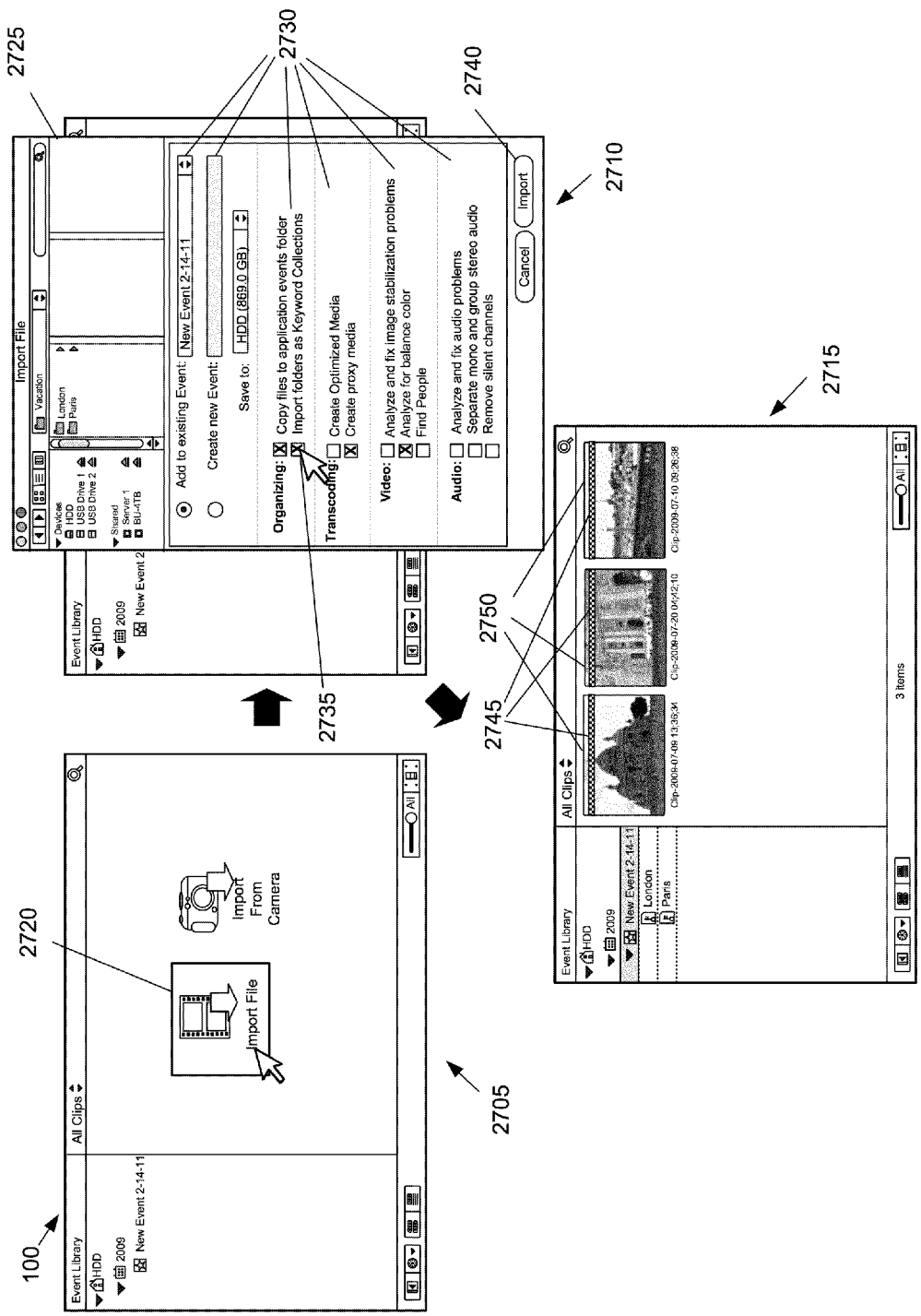
FIG. 27 illustrates automatically importing media clips from different folders of the file system.

FIG. 27 illustrates automatically importing media clips from different folders of the file system. Specifically, this figure illustrates how the media editing application (1) imports media content from different folders, (2) creates keywords based on the names of the folders, (3) associates keywords with the corresponding pieces of media content, and (4) creates keyword collections for the keywords. Three operational stages 2705, 2710, and 2715 of the GUI 100 are illustrated in FIG. 27.

In the first stage 2705, the user selects an import control 2720. The selection causes an import options window 2725 to be displayed. As shown, the import options window includes a set of controls 2730 for specifying different import options. The set of controls 2730 includes an option for adding the imported content to an existing event collection or creating a new event collection. The set of controls 2730 includes options for analyzing audio or video to create keyword collections based on the analysis. The list of analysis options includes options for (1) analyzing and fixing image stabilization problems, (2) analyzing for balance color, and (3) finding people. The list of audio options includes options for (1) analyzing and fixing audio problems, separating mono and group stereo audio, and (3) removing silent channels. These are similar to the ones mentioned above by reference to FIG. 24. However, the import options window 2725 allows a user to specify one or more of these analysis options during the import session.

As shown in the second stage 2710, the import options window 2725 includes a control 2735 for specifying whether to import the clips in the different folders as keyword collections. In this second stage 2710, the user selects the option 2735, selects two folders having different media clips, and selects the import button 2740.

The third stage 2715 shows the GUI 100 after the user selects the import button 2740 in the import options window 2725. Specifically, this stage illustrates that the media editing application associated each imported media clip with a corresponding keyword based on the name of the source folder of the media clip. For each folder, the media editing application also creates keyword collections that contain the associated clips. As shown in the third stage 2715, the imported media clips are represented by representations 2750. Each of these representations 2750 includes a bar 2745 that indicates that the corresponding video clips are associated with a keyword.

Figure 28:
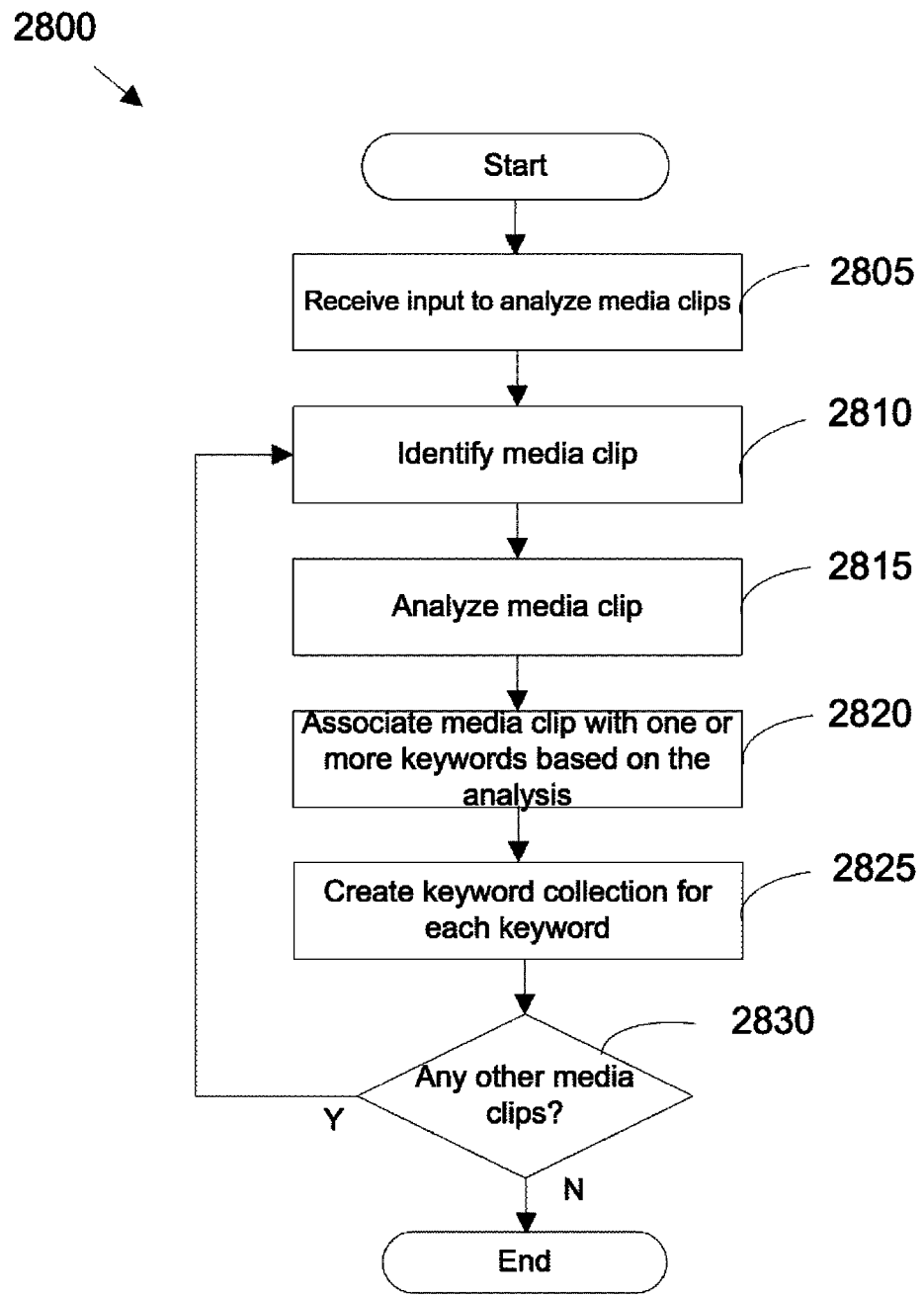
FIG. 28 conceptually illustrates a process for automatically organizing media clips into different keyword collection by analyzing the media clips.

FIG. 28 conceptually illustrates a process for automatically organizing media clips into different keyword collection by analyzing the media clips. In some embodiments, the process 2800 is performed by a media editing application. The process 2800 starts when it receives (at 2805) an input to analyze one or more media clips. An example of receiving input during an import operation is described above by reference to FIG. 27. Several other examples of receiving input to analyze a group of media clips are described above by reference to FIGS. 24 and 26.

The process 2800 then identifies (at 2810) a media clip to analyze. At 2815, the process 2800 analyzes the media clip. Several example video analysis operations include (1) analyzing for image stabilization problems, (2) analyzing for balance color, and (3) finding people. Several example audio analysis operations include (1) analyzing audio problems, (2) analyzing for mono and group stereo audio, and (3) analyzing for silent channels. In addition to the media clip analysis or instead of it, some embodiments perform other types of analysis to tag the media clip. This may entail analyzing the metadata of a clip and/or identifying a source directory or folder from which the clip originates.

The process 2800 then (at 2820) associates the media clip with one or more keywords based on the analysis. At 2825, the process 2800 then creates a keyword collection for each keyword. Several examples of creating such keyword collections are described above by reference to FIGS. 24-26. In addition to keyword collections, some embodiments also create one or more smart collections or filter collections for each keyword collection. For example, based on a people analysis, a keyword collection may include other collections such as group, medium shot, one person, wide shot, etc.

The process 2800 then determines (at 2830) whether there are any other media clips to analyze. When the determination is made that there is another media clip to analyze, the process 2800 returns to 2810. Otherwise, the process 2800 ends.

VI. Smart Collection With Keywords

Figure 29:
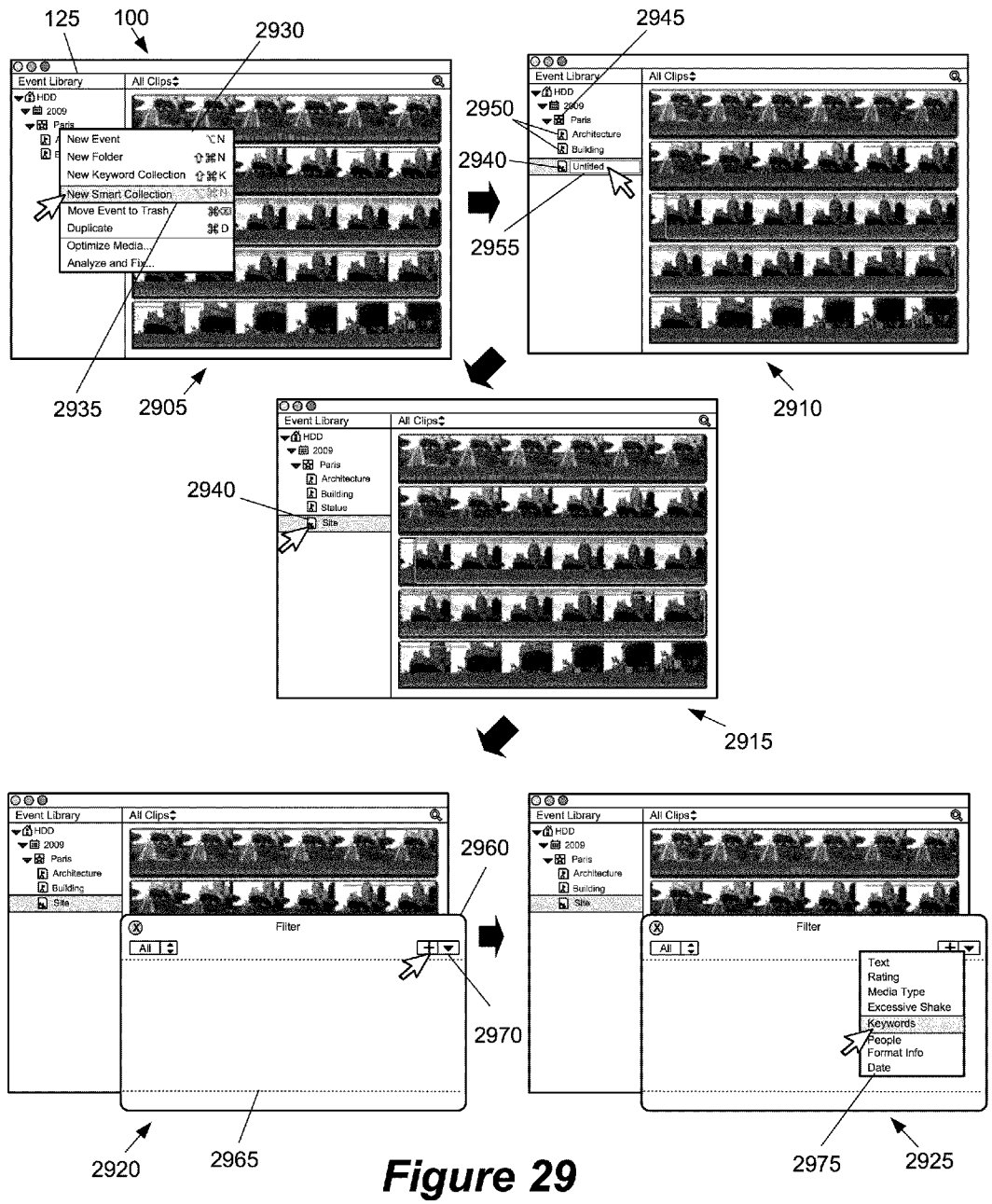
FIG. 29 provides an illustrative example of creating a smart collection.

Some embodiments allow a user to create smart collections using keywords. FIG. 29 provides an illustrative example of creating a smart collection. Five operational stages 2905-2925 are shown in this figure. The first stage 2905 shows the GUI 100 after the user selects an area of the event library 125. The selection causes a context menu 2930 to appear. The context menu 2930 includes a selectable menu item 2935 for creating a new smart collection. When the user selects the menu item 2935, the user is presented with a smart collection 2940 as illustrated in the second stage 2910.

As shown in the second stage 2910, the smart collection 2940 is displayed in the event library 125. In this example, the smart collection 2940 is categorized under an event collection 2945 at a same hierarchical level as keyword collections 2950. The smart collection 2940 includes graphical and textual elements. In the example illustrated in FIG. 29, the graphical element provides a visual indication (e.g., through different color, through symbol) that the collection 2940 is different from the event collection 2945 and the keyword collections 2950.

The textual element 2955 of the smart collection represents a name of the smart collection 2940. In the second stage 2910, the application has specified a default name for the collection 2940. Also, the textual element is highlighted to indicate that a more meaningful name can be inputted for the collection 2940.

The third stage 2915 shows the GUI 100 after the user inputs a name for the smart collection 2940. Specifically, after inputting the name, the user then selects the collection 2940 to define one or more filter operations. When the user selects the collection 2940 (e.g., through a double-click operation), the GUI 100 displays a filter tool 2960 as illustrated in the fourth stage 2920.

The filter tool 2960 includes a filter display area 2965 and a selectable item 2970. Here, the filter display area 2965 is empty which indicates to the user that no filter is applied for the smart collections 2940. The event browser provides the user with the same indication as each of the video clips from the event collection is in the smart collection.

The fifth stage 2925 shows the selection of the selectable item 2970. The selection causes a list 2975 of different filters to be displayed. In this example, the list 2975 includes (1) a text filter for filtering a smart collection based on text associated with the content, (2) a ratings filter for filtering based on ratings (e.g., favorite, reject), (3) an excessive shakes filter for filtering based on shakes (e.g., from camera movements), (4) a people filter for filtering based on people (e.g., one person, two persons, group, close-up shot, medium shot, wide shot, etc.), (5) a media type filter for filtering based on media type (e.g., video with audio, audio only, etc.), (6) a format filter for filtering based on format of the content, and (7) a keyword filter for filtering based on keywords.

Figure 30:
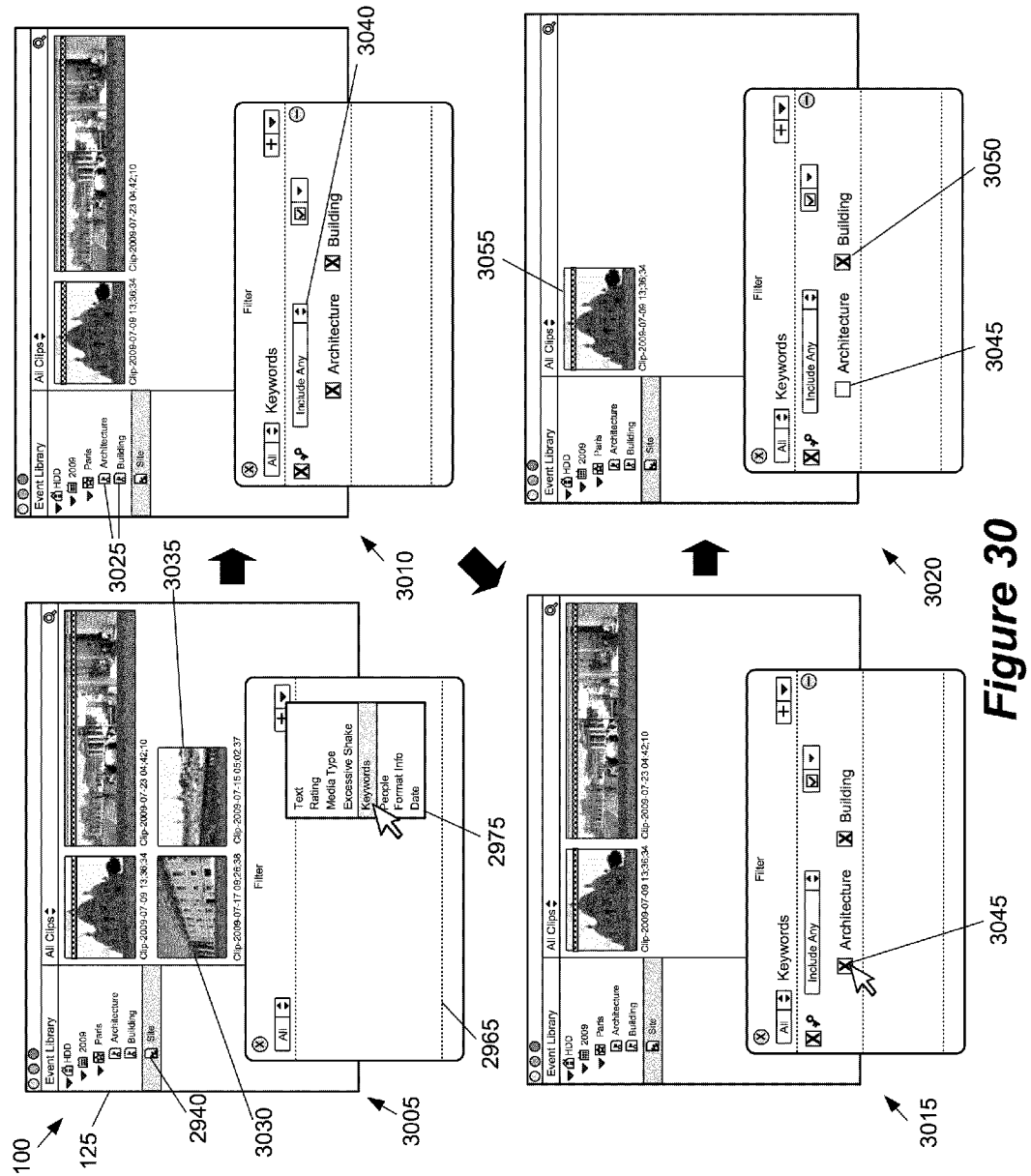
FIG. 30 provides an illustrative example of filtering the smart collection based on keyword.

FIG. 30 provides an illustrative example of filtering the smart collection 2940 based on keyword. Four operational stages are 3005-3020 shown in this figure. The first stage 3005 shows the GUI 100 prior to applying a keyword filter. The filter display area 2965 is empty which indicates to the user that no filter is applied for the smart collections 2940. The event browser provides the user with the same indication as each of the video clips from the event collection is in the smart collection. In the first stage 3005, the filter list is activated to display a list 2975 of different filters.

When the user selects the keyword filter from the list 2975, the keyword filter is added to the filter display area 2965 as illustrated in the second stage 3010. In some embodiments, when a keyword filtering option is activated, the media editing application provides a list of existing keywords from which a user can choose from for the keyword filter. This is illustrated in the second stage 3010 as the filter display area 2965 lists several existing keywords. The keywords in the filter display area 2965 correspond to keyword collections 3025 in the event library 125.

The second stage 3010 shows the contents of the smart collection 2940 after applying the keyword filter operation. In particular, the event browser is filtered such that only ranges of media that are marked with the keywords are shown. For instance, the keyword filter operation removes representations 3030 and 3035 from the event browser, as the video clips associated with these representations are not marked with any keyword.

In the example illustrated in FIG. 30, the user can filter the smart collection 2940 further to include only ranges of media that includes all keywords. For example, by selecting a control 3040, the smart collection 2940 can be filtered to display ranges of media that are associated with both keywords. In some embodiments, when a media clip is marked with different keywords in different ranges, a smart collection includes only one or more ranges of the different ranges that overlap. Alternatively, the smart collection 2940 may include all the different ranges of the media clip, in some embodiments.

As shown in FIG. 30, each keyword in the filter display area 2965 includes a selectable item 3045 for including or excluding the corresponding keyword from the filtering operation. The fourth stage 3020 shows a selection of a selectable item 3045. The selection causes the smart collection 2940 to be filtered to only exclude each media range associated with a keyword of the selectable item 3045. This is illustrated in the fourth stage 3020 as the event browser displays the representation 3055 that is marked with a keyword corresponding to a selectable item 3050 in the filter display area 2965.

In the example described above, only the keywords that are in one event collection are displayed in the filter display area 2965. This is because the smart collection 2940 is created at a same hierarchical level as a keyword collection. In some embodiments, when a smart collection is created at a higher level in a hierarchy (e.g., above multiple different collections at a disk level above or at the event level) all the keywords at the same level or below may be displayed in the filter tool as selectable filtering options.

Figure 31:
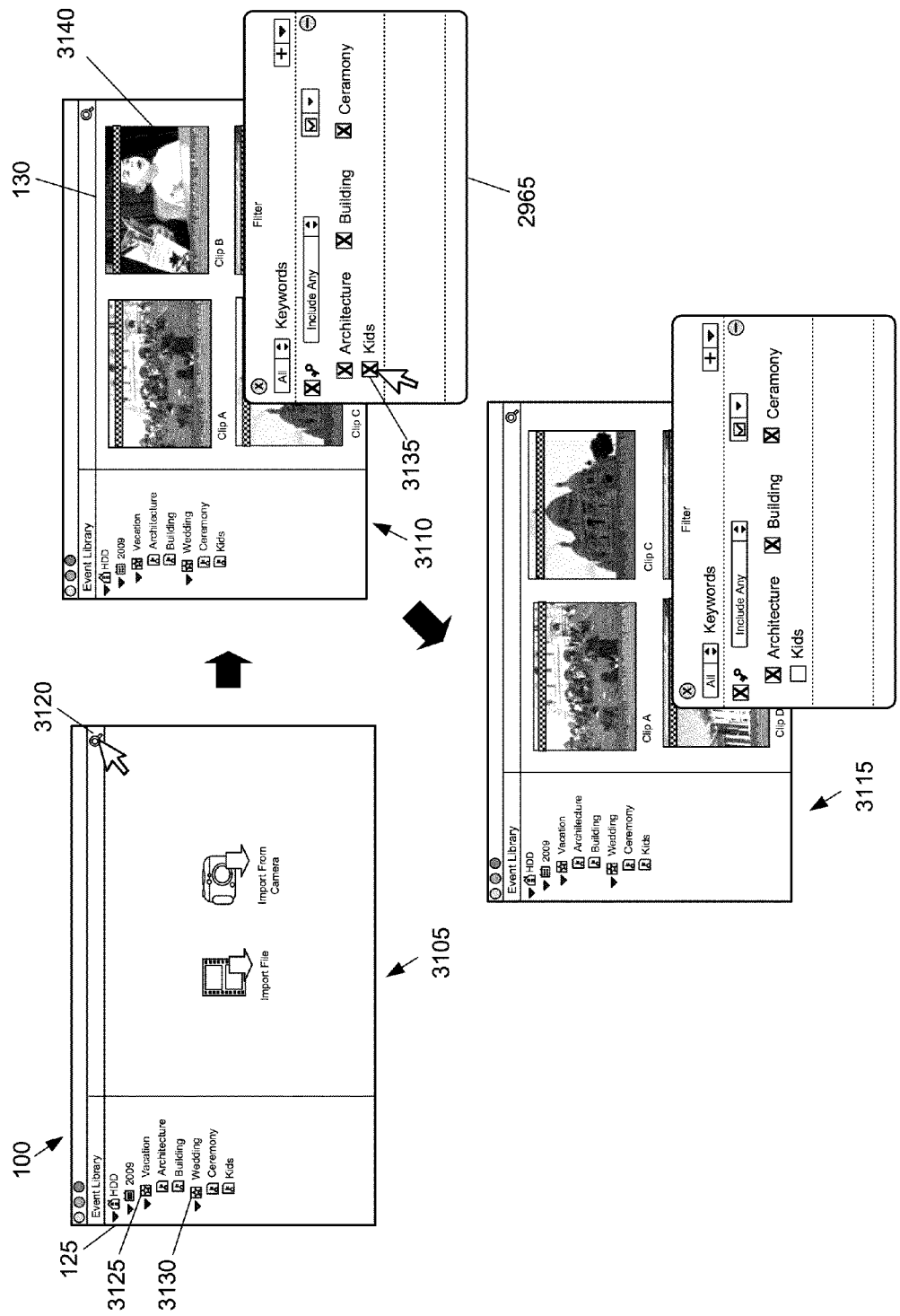
FIG. 31 illustrates filtering the event browser based on keywords.

In some embodiments, the media editing application allows a user to perform filtering operations without having to create a smart collection. FIG. 31 illustrates filtering the event browser based on keywords. Specifically, this figure illustrates searching for different ranges of clips associated with one or more keywords.

Three operational stages 3105-3115 of the GUI 100 are shown in this figure. In the first stage 3105, two event collections 3125 are 3130 are listed in the event library 125. Each event collection includes two keyword collections. Here, the user selects a filter tool 3120 to search for clips at a level above the event collection level (e.g., disk level). Specifically, in this example, the user selects the tool 3120 without selecting any collection. Alternatively, the user might have selected a collection that is at a higher level than the event collection prior to selecting the filter tool 3120.

As illustrated in the second stage 3110, the selection of the filter tool 3120 causes a filter display area 2965 to be displayed. The filter display area 2965 displays several selectable items for different keywords. These keywords correspond to the keyword collections of the event collections 3125 and 3130. The selection also causes the event browser 130 to display each clip range associated with the keywords. The third stage 3115 shows the GUI 100 after selecting the selectable item 3135. As shown, the selection causes the event browser to be filtered to exclude each clip range associated with the keyword that corresponds to the selectable item 3135.

VII. Content Rating

An event collection may contain media clips or ranges of clips that a user likes or dislikes. For example, there might be several frames where the image is blurry or chaotic, or frames where the imagery is not particularly captivating. In some embodiments, the media editing application provides a marking tool to rate clips or ranges of clips.

Figure 32:
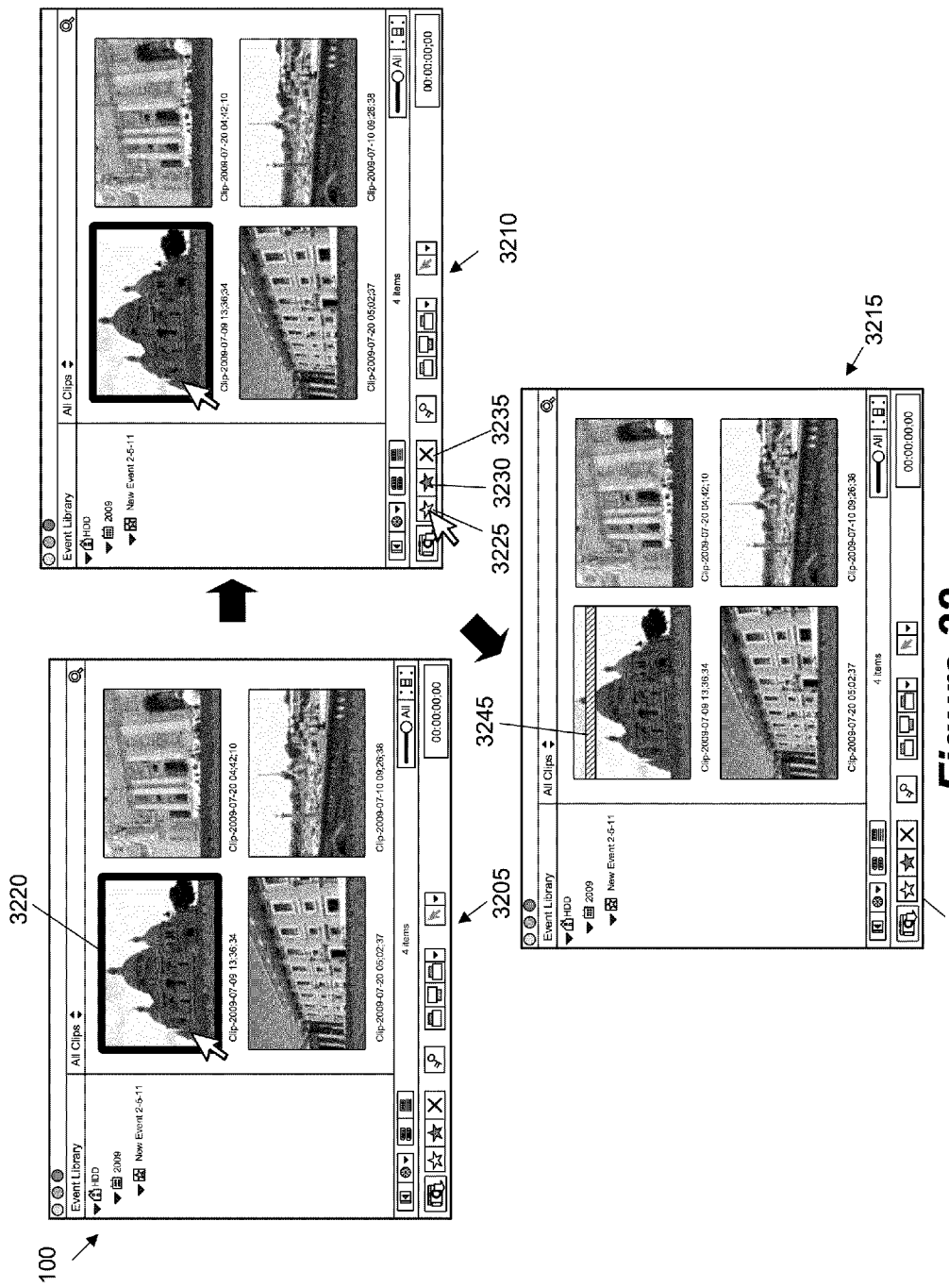
FIG. 32 illustrates an example of rating a media clip.

FIG. 32 illustrates an example of rating a media clip. Three operational stages 3205-3215 of the GUI 100 are shown in this figure. Specifically, in the first stage 3205, the user selects a representation 3220 of a clip. In the second stage 3210, the user selects a UI item 3225 to mark the clip associated with the representation 3220 as a favorite. Alternatively, the user can hit a shortcut key to mark the clip. The user can also select another shortcut key or user interface item 3235 to mark the clip as a reject. Further, when a clip is marked with a rating, the user can select yet another shortcut key or user interface item 3230 to remove the rating.

When a clip range is marked with a rating, some embodiments display an indication of the rating. This is illustrated in the third stage 3215, as a line or bar 3245 is displayed across the representation 3220. Here, the color of the indication corresponds to a color of the user interface item 3225.

Figure 33:
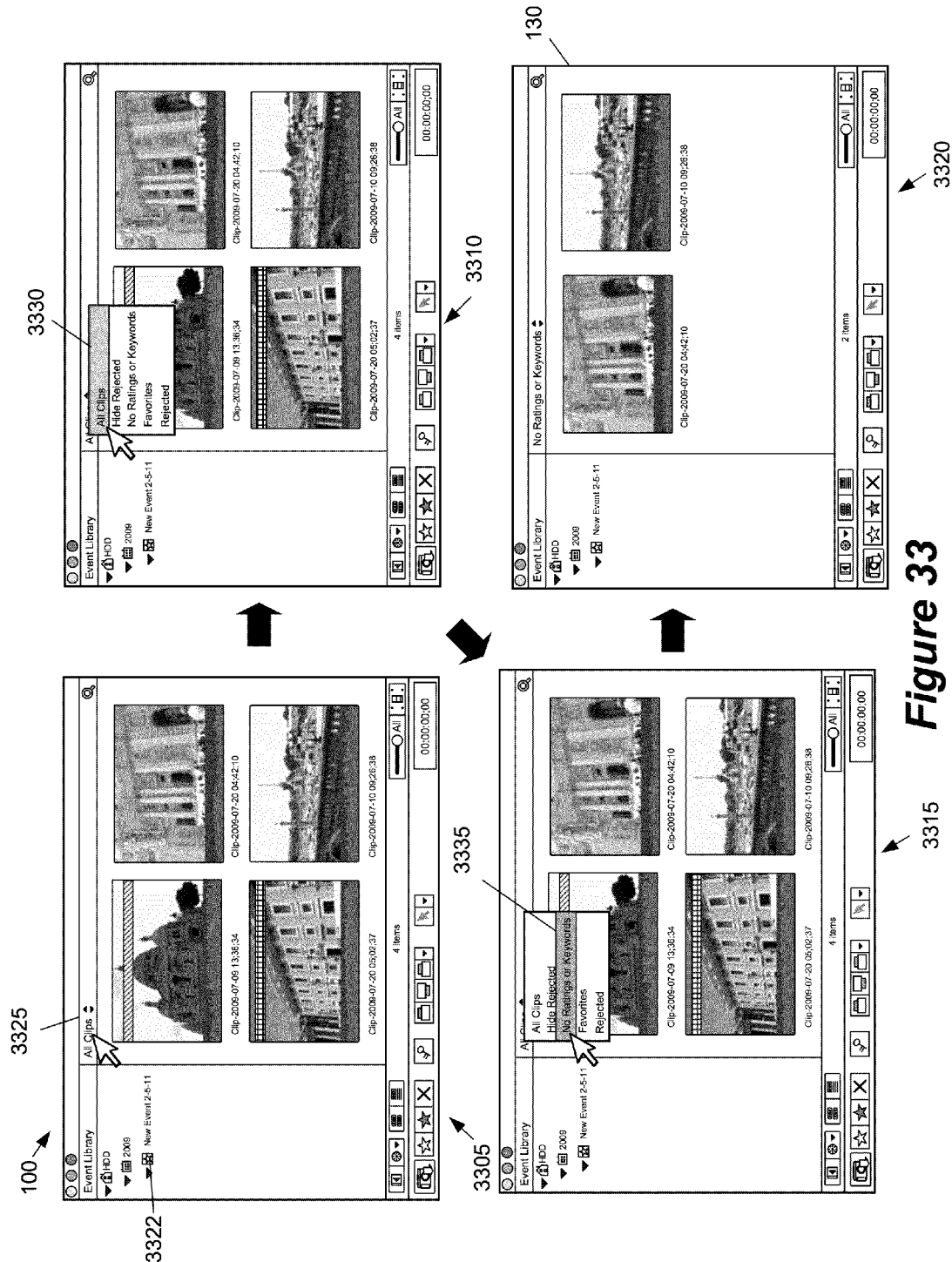
FIG. 33 illustrates an example of filtering an event collection based on ratings or keywords.

FIG. 33 illustrates an example of filtering an event collection 3322 based on ratings or keywords. Such a filtering operation allows a user to quickly identify clips that are tagged, marked, rejected, not rated, or not tagged. Four operational stages 3305-3320 of the GUI 100 are shown in this figure. Specifically, in the first stage 3305, the user selects a UI item 3325. The selection causes a drop down list 3330 to appear, as illustrated in the second stage 3310. The drop down list 3330 displays several selectable options related to filtering the event collection 3322 through ratings or keywords. For example, the drop down list 3330 displays a selectable option for hiding rejected clips, and a selectable option 3335 for only displaying clips that have no ratings or keywords. The user can select any of these selectable options.

When the user selects the selectable option 3335 in the drop down list 3330, the user is presented with an event browser 130 as shown in the fourth stage 3320. Specifically, the selection of the selectable option 3335 causes the event browser 130 to display clips that do not have any associated ratings or keywords.

VIII. List View

Figure 34:
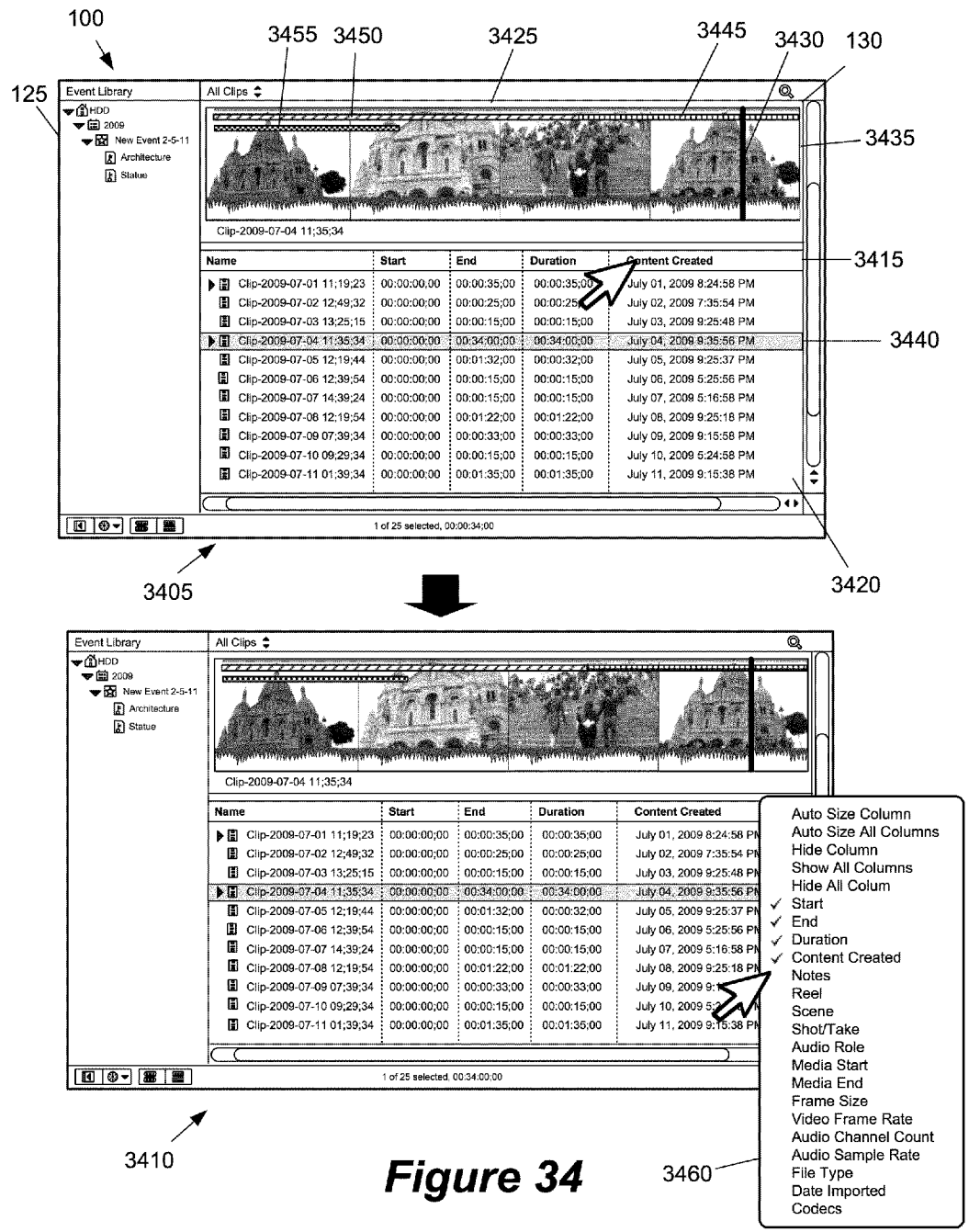
FIG. 34 illustrates the media editing application with a list view according to some embodiments.

In some embodiments, the media editing application provides a novel list view that displays different ranges of media associated with keywords. The list view in some embodiments allows users to select different ranges of a media clip and/or navigate to different sections of the media clip. In some embodiments, the list view is another view of the clip browser or event browser. Accordingly, all of the operations described above in relation to the thumbnails view (e.g., clips view, filmstrip view) can be performed in this list view. These operations include creating different keyword collections, associating a clip or a portion of the clip with a keyword, creating composing clips, disassociating a keyword, performing different operations with the keyword tagging tool, etc. FIG. 34 illustrates the GUI 100 of the media editing application with such a list view. This figure illustrates the GUI 100 at two different stages 3405 and 3410. As shown in FIG. 34, the GUI 100 includes the event library 125 and the event browser 130. The event library 125 and event browser 130 are the same as those described above by reference to FIG. 1.

As shown in FIG. 34, the event browser 130 displays different media content items in the list view 3415. The list view includes a list section 3420 and a preview section 3425. Different from a filmstrip view that displays filmstrip representations of different clips, the list view displays each clip's name and media type along with other information.

In the example illustrated in the FIG. 34, the list section 3420 displays the name of the clip, the start and end times, clip duration, and creation date. The information is displayed in different columns with a corresponding column heading (e.g., name, start, end, duration, date created). The user can sort the clips in the list by selecting any one of the different column headings. Each column can also be resized (e.g., by moving column dividers in between the columns).

In some embodiments, the columns may be rearranged by selecting a column heading and moving it to a new position. In some embodiments, the list view 3415 allows a user to choose what type of information is displayed in list view. For example, when a column heading is selected (e.g., through a control click operation), the list view 3415 may display a list of different types of information that the user can choose from.

The preview section 3425 in some embodiments displays a filmstrip representation of a media clip selected from the list section 3420. Similar to the examples described above, the filmstrip representation is an interactive UI item. For example, the user can select an interior location within the representation to display a preview of the representation's associated clip in a preview display area. In the example illustrated in FIG. 34, when a user selects an interior location of the filmstrip representation 3435, a playhead 3430 moves along a virtual timeline of the filmstrip representation. The user can use playhead line 3430 as a reference point to display different images and play different audio samples associated with the video clip.

Having described the elements of the list view 3415, the operations will now be described by reference to the state of the GUI 100 during the two stages 3405 and 3410. The first stage 3405 shows the event browser in the list view. The user might have changed the view of event browser 130 by selecting a menu item or a toolbar button.

In the first stage 3405, the selection of a media clip 3440 in the list section 3420 causes the preview section 3425 to display a filmstrip representation 3435. Similar to the examples described above, the representation 3435 includes several bars that indicate that representation's associated video clip is marked. Specifically, a bar 3445 having a first visual representation (e.g., red bar) indicates that a first range of the video clip is marked with a reject rating, a bar 3455 having a different second visual representation (e.g., blue bar) indicates that a second range is marked with a keyword, and a bar 3450 having a third visual representation different than the first or second visual representations (e.g., green bar) indicates that a third range is marked with a favorite rating.

In the example illustrated in FIG. 34, the keyword bar 3455 (e.g., blue bar) is displayed below the ratings bar 3450. However, the media editing application may display the ranges differently in other embodiments. For example, instead of different bars, the media editing application may display other indications or other colors to distinguish different ranges associated with keywords and/or ratings markers.

The second stage 3410 shows the selection of a column heading of the list section 3420 (e.g., through a control click operation). The selection causes the GUI 100 to display a list 3460 that allows a user to choose the type of information that is displayed in list section 3420. In the example illustrated in FIG. 34, the type of information or metadata includes stat time, end time, duration, content creation date, notes, reel, scene, shot/take, audio role, media start, media end, frame size, video frame rate, audio channel count, audio same rate, file type, date imported, and codec. However, depending on the type of content (e.g., image, document), the list 3460 may include other types of information.

Figure 35:
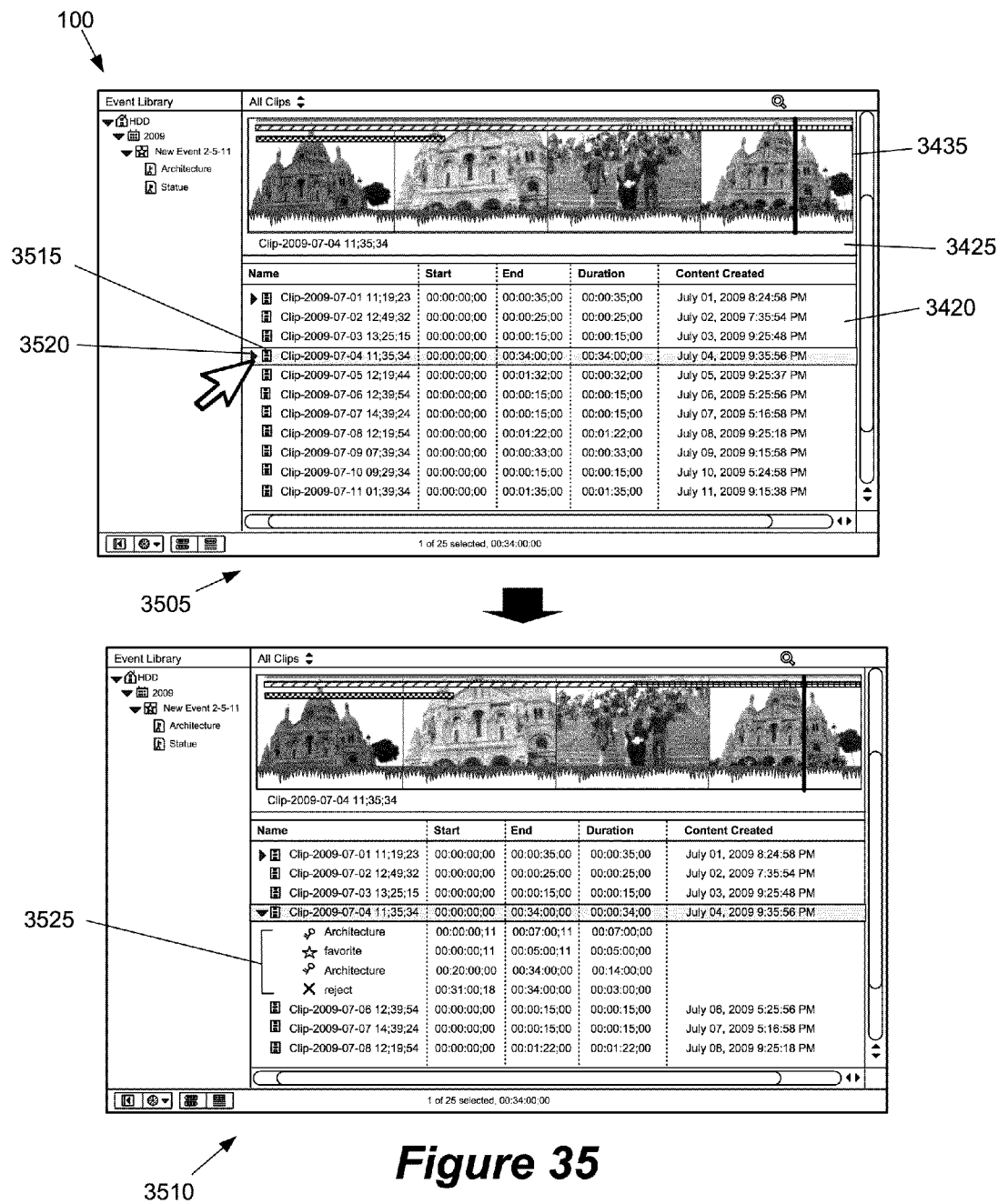
FIG. 35 illustrates expanding a media clip in the list view.

FIG. 35 illustrates expanding a media clip in a list view. Two operational stages of the GUI 100 are shown in this figure. In the first stage 3505, a media clip 3515 is selected from the list section 3420 to display the filmstrip representation 3435 in the preview section 3425. The user then selects the UI item 3520 adjacent to the media clip information 3515 in the list. As shown in the second stage 3510, the selection causes the list view to display additional information related to the media clip in an expanded list 3525. The user can re-select the UI item 3520 to hide the expanded list 3525. In some embodiments, the media editing application allows a user to quickly expand or collapse a selected clip by selecting a hotkey. For instance, in the example illustrated in FIG. 35, the user can expand the selected media clip by selecting a key (e.g., right arrow key) and collapse the clip by selecting another key (e.g., left arrow key).

As shown in FIG. 35, the expanded list 3525 displays information related to marked ranges of the media clip. Specifically, for each range associated with a keyword, the expanded list includes a name of the keyword, the start and end times, and range duration. The expanded list 3525 displays the same information for each ratings marker. In some embodiments, the media editing application may display other information (e.g., creation date, notes on different ranges, etc.). In some embodiments, the media clip information in the list may only be expanded when the corresponding media clip is marked with a keyword or rating. For example, when a media clip is not marked, the media clip information 3515 may not have a corresponding UI item to display an expanded list.

As shown in FIG. 35, the different sections of the list view allows a user to quickly assess a group of media clips and see what ranges are marked with one or more markings (e.g., keywords, markers). In the example illustrated in FIG. 35, the preview section 3435 is displayed above the list section 3420. This example layout of the different sections allows the user view a detailed representation of a media clip (e.g., that includes different visual indications representing different marked rages), and simultaneously view detailed information regarding the media clip (e.g., media clip metadata) and its marked ranges (e.g., marking or range metadata).

As mentioned above, the list view, in some embodiments, can be used to associate one or more portions of one or more media clips with different markings In some embodiments, when users are marking ranges using a representation (e.g., filmstrip representation) in the preview section 3435, the list section 3420 is dynamically updated with the marked ranges. For example, when a user drags a selected range of the media clip to a keyword collection, a keyword entry is dynamically added to the list section 3420. In some embodiments, when the association is created, the entry for the marking is also selected from the list section 3420.

In the previous example, one media clip is expanded in the list view to display a list of associated keywords and ratings. FIG. 36 illustrates an example of simultaneously expanding multiple different clips in the list view 3415. Two operational stages 3605 and 3610 are shown in this figure. Specifically, in the first stage 3605, the user selects all the media clips in the list view 3415. The user might have selected these items in a number of different ways (e.g., by selecting a first item in the list and selecting a last item while holding a modifier, by using a select all shortcut, by selecting an area with these items, etc.).

In the second stage 3610, the user selects a hotkey (e.g., right arrow key) to expand each media clip that can be expanded. As shown, the selection causes (1) a media clip 3615 to expand and reveal a ratings marker and (2) a media clip 3620 to expand and reveal two ratings markers and two keywords. Alternatively, or in conjunction with the hotkey, some embodiments provide one or more selectable user interface items for expanding multiple media clips.

Figure 37:
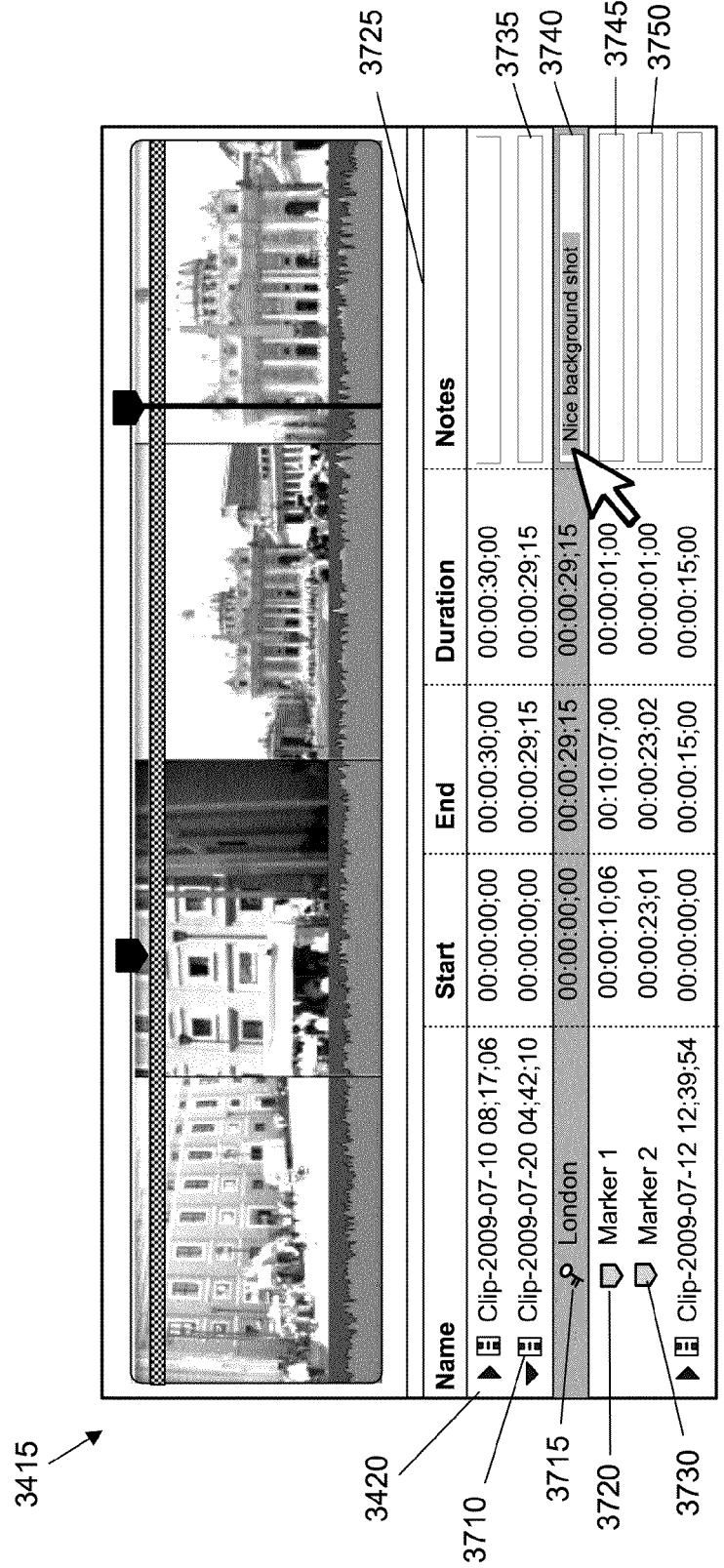
FIG. 37 illustrates the list view with several notes fields for adding notes.

In some embodiments, the list view 3415 allows a user to input notes for (1) media clips and (2) ranges of media clips. For example, a user can add a note to an entire clip or only a portion of the clip associated with a keyword. FIG. 37 illustrates the list view 3415 with several fields for adding notes. In this figure, the list section 3420 of the list view 3415 displays information about several clips. Specifically, the list section 3420 displays additional information regarding a keyword 3715 and two markers (3720 and 3730) related to a media clip 3710 in an expanded list.

In this example, the list section 3420 includes a "Notes" column 3725. As shown, the user can add notes to the entire clip 3710 using the notes field 3735. The user can also add notes to the different ranges using notes field 3740-3750.

Figure 38:
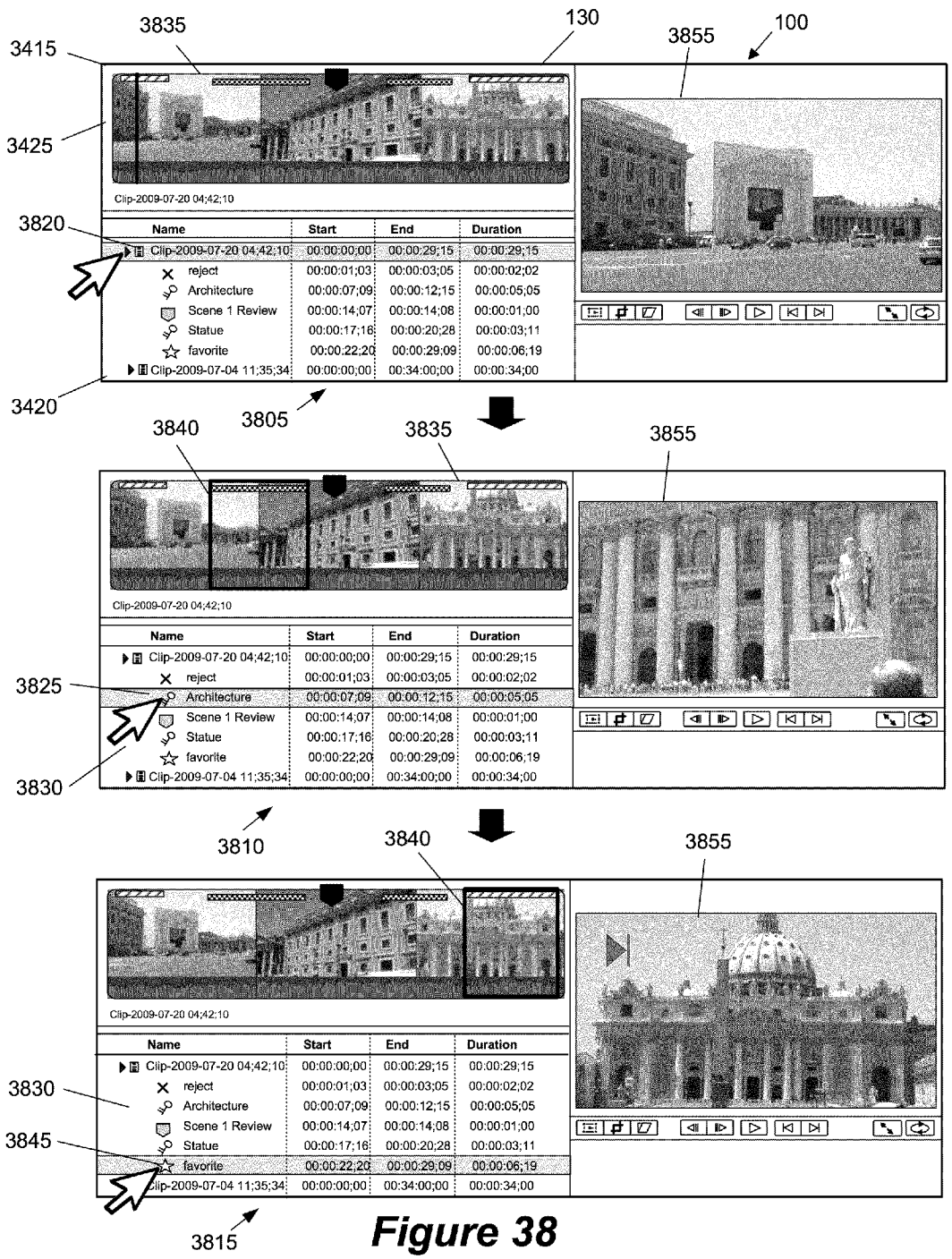
FIG. 38 illustrates selecting different ranges of a media clip using the list view.

FIG. 38 illustrates selecting different ranges of a media clip using the list view 3415. Specifically, this figure illustrates how the list view 3415 can be used to granularly select different ranges of the clip that are marked with a rating or associated with a keyword. In some embodiments, this allows a user to easily select a marked or tagged range, and modify the selected range. For example, the user can trim or expand the range associated with a particular keyword. When one or more ranges are selected, the user can associate the range with a keyword, add the range to a timeline, etc. Three operational stages 3805-3815 of the GUI 100 are shown in this figure. As shown in FIG. 38, the GUI 100 includes the preview display area 3855 and the event browser 130. The preview display area 3855 is described above by reference to FIG. 3.

The first stage 3805 shows the event browser 130 displaying the list view 3415. The video clip information 3820 in the list section 3420 is selected and expanded. The selection of the video clip information 3820 in the list section causes a preview of the video clip to be displayed in the preview display area 3855. The selection also causes a filmstrip representation 3835 of the video clip to be displayed in the preview section 3425.

The second stage 3810 shows a selection of a keyword 3825 from the expanded list 3830. The selection causes the range of the video clip associated with the keyword to be highlighted. Here, the filmstrip representation 3835 is highlighted with a range selector 3840. The user can specify a different range by selecting and moving either edge of the range selector 3840.

As shown in the second stage 3810, the selection of the keyword 3825 causes the preview display area 3855 to display a preview of the range. Specifically, the preview display area 3855 displays an image associated with the starting point of the keyword range. The user can play a preview of the video clip starting from this position.

The third stage 3815 shows selection of a ratings marker 3845 from the expanded list 3830. The selection causes the range of the video clip associated with the marker to be highlighted. Similar to the second stage 3810, the media clip is highlighted with the range selector 3840. Also, the preview display area 3855 displays an image associated with the starting point of the range associated with the ratings marker 3845.

In some embodiments, the media editing application allows a user to navigate during playback. For example, in the list view illustrated in FIG. 38, the user can start playback (e.g., by selecting a space key) and play different clips in the list. In some embodiments, the playback is uninterrupted in that multiple clips are played one after another in the preview display area. For example, the user can start playback for a clip and select another clip or a hotkey to jump to a next clip.

In this case, the preview display area of the media editing application will continue playback starting from the next clip without interruption.

In some embodiments, when media clip information is expanded to reveal range items (e.g., marker, keyword), the user can navigate between the range items. For example, a user might start playback of a clip that corresponds to the clip information 3820. The playback would move past the different ranges. During playback, the user can select any one of the ranges to continue the playback starting from the selected range. Several examples of these playback operations are described by reference to FIG. 41 below.

Figure 39:
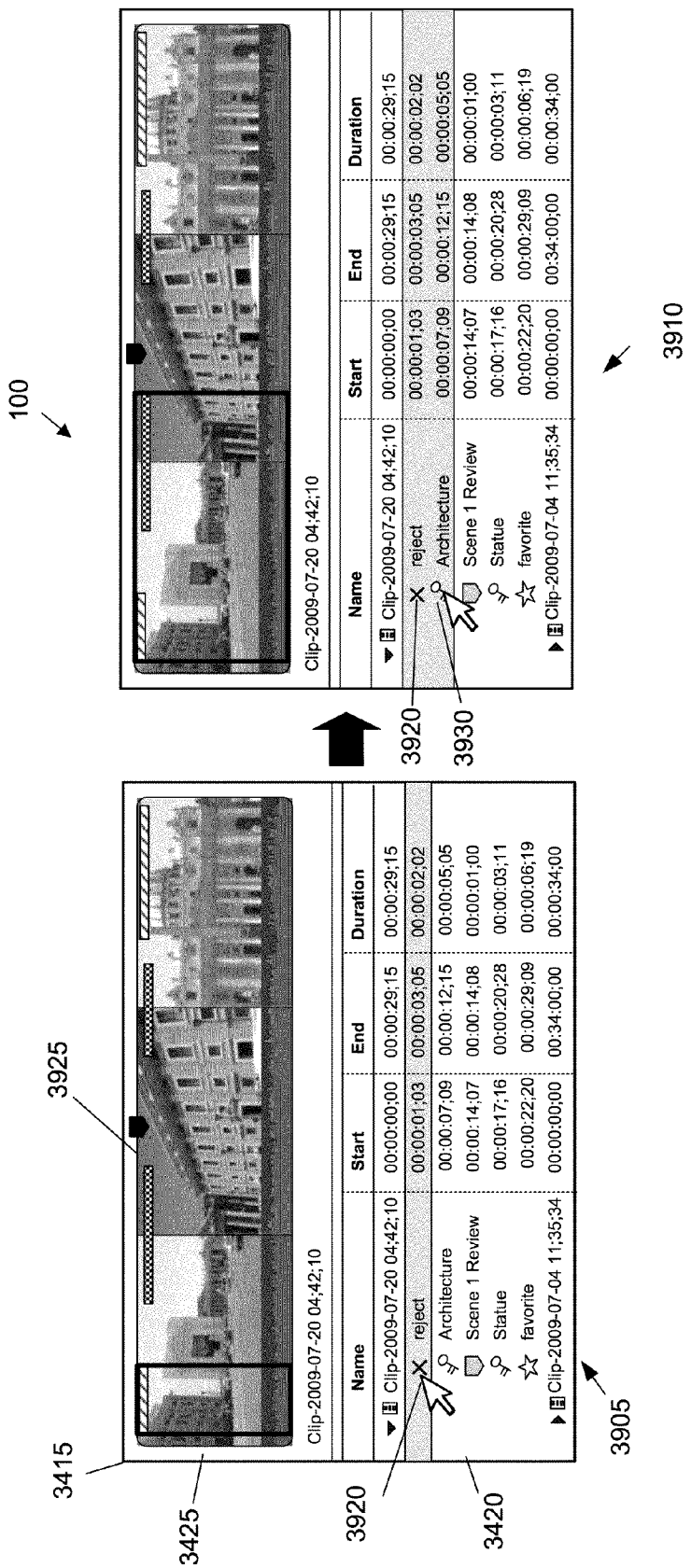
FIG. 39 illustrates selecting multiple ranges of a media clip using the list view.

FIG. 39 illustrates selecting multiple ranges of a media clip using the list view 3415. Two operational stages 3905-3910 of the GUI 100 are shown in this figure. Specifically, the first stage 3905 shows the selection of a ratings marker 3920 from the list section 3420. The selection causes the range of the video clip associated with the marker to be selected. The preview section 3425 provides an indication of the selection as the range corresponding to the ratings marker 3920 is highlighted in a filmstrip representation 3925 of the video clip.

The second stage 3910 shows the selection of the ratings marker 3920 and a keyword 3930 from the list section 3420. The selection causes the range of the video clip associated with the ratings marker 3920 and the keyword 3930 to be selected. In the example illustrated in FIG. 39, the range between the endpoint of the marker 3920 and start point of the keyword 3930 is also selected. The preview section 3425 provides an indication of the selection of this composite range. Specifically, a composite range starting from the marker's range and ending at the keyword's range is highlighted in the preview section 3425. When a composite range is selected, some embodiments allow the user to add the selected composite range to a timeline to create a composite presentation. For example, when a clip range spanning two keywords is selected, the user can add the range to the timeline by selecting a hotkey or by dragging the selected range from the preview section 3425 to the timeline. Several examples of adding clips to the timeline are described below by reference to FIG. 45.

In the examples described above, several different markings (e.g., marker, keyword) are selected from the list view to select corresponding ranges in the preview section. In some embodiments, when a user selects a portion of the representation (e.g., filmstrip representation) that match marked ranges in the list view, the corresponding ranges or items is selected in the list view.

Figure 40:
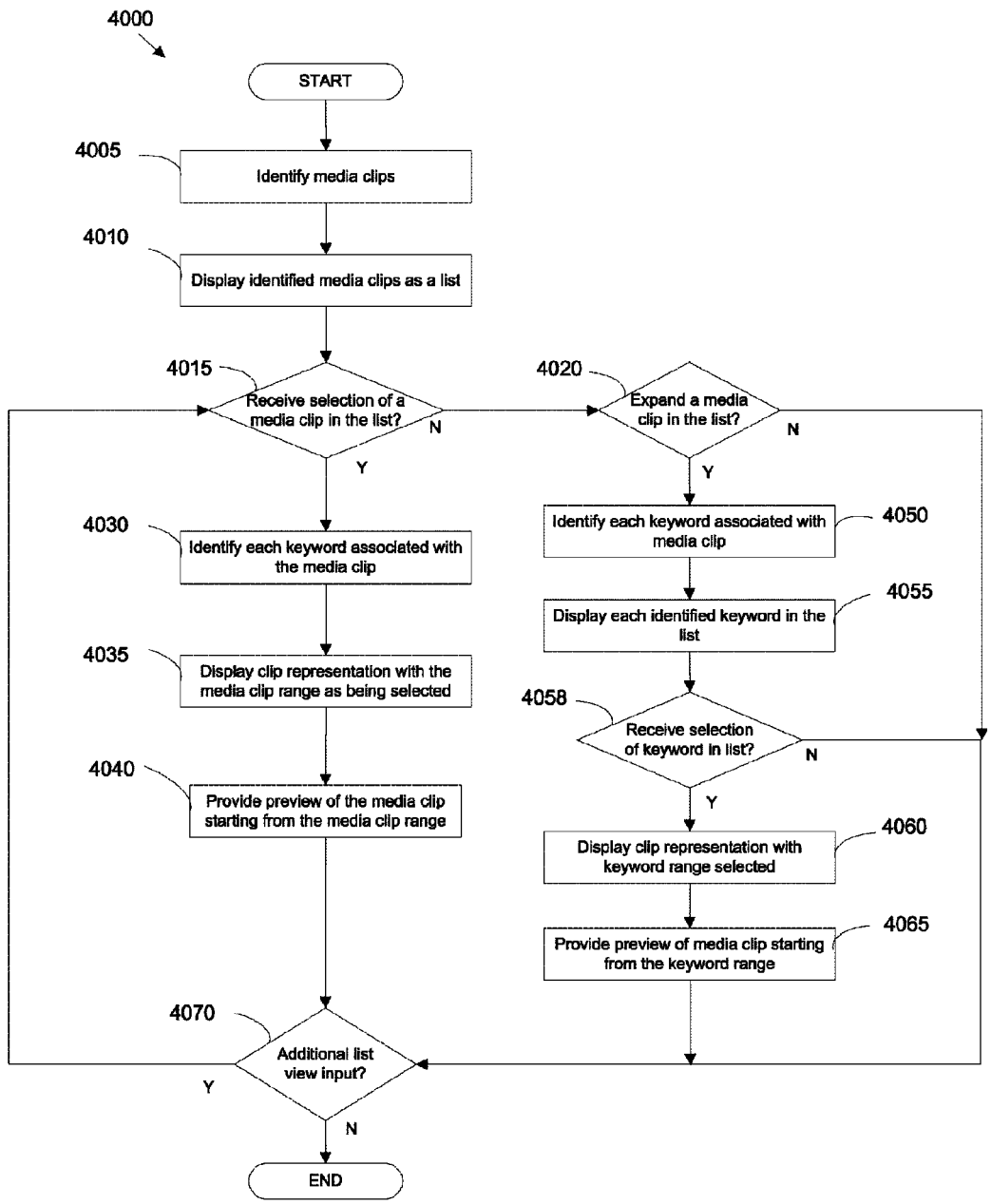
FIG. 40 conceptually illustrates a process for displaying and selecting items in a list view.

FIG. 40 conceptually illustrates a process 4000 for displaying and selecting items (e.g., different ranges of media) in a list view. As mentioned above, the list view in some embodiments allows users to select different ranges of a media clip and/or navigate to different sections of the media clip. The process 4000 is performed by a media editing application in some embodiments. As shown in this figure, the process 4000 begins by identifying (at 4005) media clips to display in the list. Next, the process 4000 displays (at 4010) identified media clips in a list view (e.g., in the event browser as described above).

The process 4000 then determines (at 4015) whether a selection of a media clip in the list has been received. When the determination is made that a selection of a media clip has been received, the process 4000 identifies (at 4030) items (e.g., keywords, markers) associated with the selected media clip. The process 4000 then displays (at 4035) a clip representation based on the identified items with the media clip range as being selected. The process then provides (at 4040) a preview of the media clip. Next, the process 4000 moves on to 4070.

At 4015, when the determination is made that the received input is not a selection of a media clip in the list, the process 4000 proceeds to 4020. The process 4000 determines (at 4020) whether it has received a selection to expand a media clip in the list. If it is determined that the process has received a selection to expand a media clip, the process identifies (at 4050) each keyword associated with the media clip. The process then displays (at 4055) each identified keyword in the list. Afterwards, the process goes on to 4058. If the process 4000 determines (at 4020) that it did not receive a selection to expand any media clip in the list, it moves on to 4070.

At 4058, the process 4000 determines whether it has received a selection of a keyword in the list. When the determination is made that the process has received such a selection, the process displays (at 4060) a corresponding clip representation with keyword range selected. The process then provides (at 4065) a preview of the media clip starting from the selected keyword range.

Next, the process 4000 determines (at 4070) whether there is additional user input for the list view. If it is determined that there is additional user input for the list view, it returns to 4015. Otherwise, the process 4000 terminates.

Figure 41:
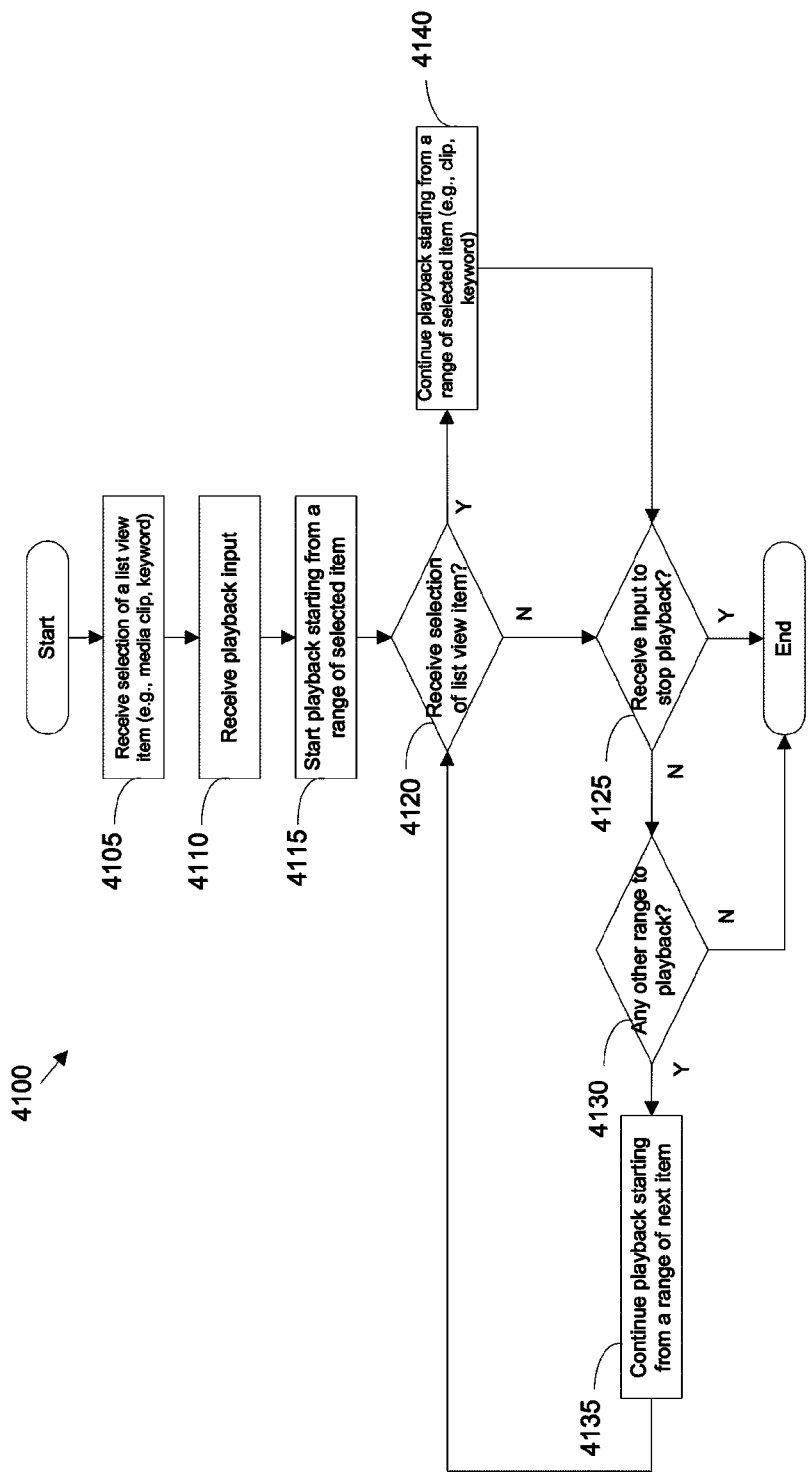
FIG. 41 conceptually illustrates a process for playing items in a list view.

FIG. 41 conceptually illustrates a process 4100 for playing items (e.g., clips, keyword ranges) in a list view. In some embodiments, the process 4100 is performed by a media editing application. The process 4100 starts when it receives (at 4105) a selection of a list view item. Examples of such list view items include media clips, keywords, smart collections, markers, etc.

The process 4100 then receives (at 4110) a playback input. For example, a user of the media editing application might select a play button or a hotkey (e.g., space key). When the process 4100 receives the playback input, the process 4100 starts (at 4115) the playback of the items in the list view starting from a range of a selected item. For example, when the selected item is a marker, the playback may start at a time associated with the marker.

The process 4100 then determines (at 4120) whether an item in the list view has been selected. As mentioned above, examples of such list view items include media clips, keywords, smart collections, markers, etc. In some embodiments, the process 4100 continuously monitors user input during playback to make this determination.

When the determination is made that an item has been selected, the process 4100 jumps (at 4140) to a starting point of a range of the selected item and continues playback from the starting point. For example, during playback, a user might select a keyword. In this case, the playback continues starting from a starting point of a range of a clip associated with the keyword. When a clip is selected, the playback continues from a starting point of the clip.

The user can alternatively select another item in the list view by selecting a hotkey (e.g., directional keys) for a next or previous item in the list. In some embodiments, when an item in the list is not expanded, the selection of a next or previous item skips any inner range items and moves to the next or previous item. For example, when a clip tagged with keywords is not expanded in the list view to reveal the associated keywords, the user selection of the next item causes the playback to continue from the next clip. However, when the clip is expanded in the list view to reveal the associated keywords, the user selection of the next item causes the playback to continue starting from a range of a next keyword.

The process 4100 then determines (at 4125) whether an input to stop playback has been received. In some embodiments, the process 4100 continuously monitors user input during playback to make this determination.

When the determination is made that an input to stop playback has been received, the process 4100 ends. Otherwise, the process 4100 determines (at 4130) whether there are any other ranges to playback. That is, the process 4100 may have reached the end of the list. In this example, when there are no more clips or ranges to play, the process 4100 ends. Otherwise, the process 4100 continues (at 4135) playback starting from a range of a next item. In some embodiments, when the process 4100 finishes playing a last item in the list view, the playback continues from the first item in the list.

IX. Markers

Some embodiments of the media editing application provide markers for marking different media clips. In some embodiments, the markers are reference points that a user can place within media clips to identify specific frames or samples. The user can use these markers to flag different locations on a clip with editing notes or other descriptive information.

In some embodiments, a user can use the markers for task management. For example, the markers may have "to do" notes associated with them. These notes can be notes that an editor makes as reminders to himself or others regarding tasks that have to be performed. Accordingly, some embodiments displays (1) the notes associated with the marker and (2) a check box to indicate whether the task associated with the marker has been completed.

In some embodiments, markers are classified by appearance. For example, an informational marker may appear in one color while a to-do marker may appear in another color. In several of the examples described below, markers are added to a clip in a list view of the event browser. However, the markers may be added in a different view or in a timeline. For example, the markers may be added in a filmstrip view that displays filmstrip representations of different clips.

Figure 42:
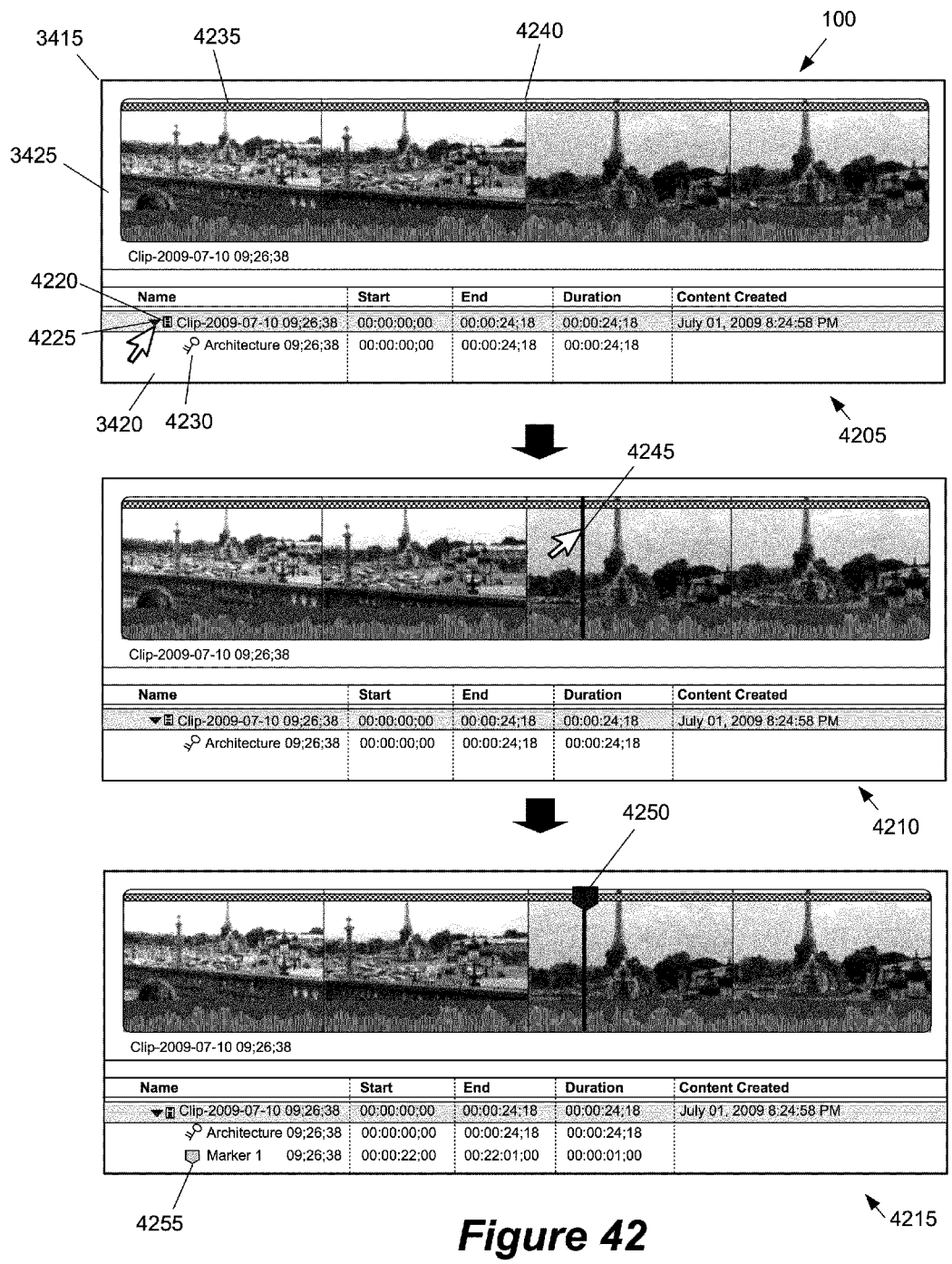
FIG. 42 illustrates adding a marker to a clip using the list view.

FIG. 42 illustrates adding a marker to a clip using the list view 3415. Three operational stages 4205-4215 of the GUI 100 are shown in this figure. As shown in the first stage 4205, the preview section 3425 of the list view 3415 displays a filmstrip representation 4240 of a video clip. To display the representation 4240, a user has selected a video clip information item 4220 from the list section 3420 of the list view. Also, the user has selected a UI item 4225 in the list section 3420 of the list view 3415 to display information regarding a keyword associated with the video clip. Specifically, the keyword information 4230 indicates a range of the video clip associated with the keyword. The association of the keyword to the range of the video clip is represented in the preview section 3425 with a bar 4235 that spans horizontally across the filmstrip representation 4240.

In the second stage 4210, the user selects an upper edge of the filmstrip representation 4240. When the user selects the upper edge, a line 4245 moves along a virtual timeline to the selected location. The user can drag the line along the virtual timeline and use it as a reference point to specify a location for the marker.

The third stage 4215 illustrates associating a marker with a video clip. Here, to associate the marker with the video clip, the user selects a menu item for adding a marker or selecting a hotkey. The marker is associated with the video clip at a specific point in the duration of the video clip. This is indicated by the list section that lists information 4255 related to the marker. In the example illustrated in FIG. 42, the marker information 4255 indicates that the name of the marker is "Marker 1". The marker information 4255 also indicates that a range (i.e., one second) of the video clip is associated with the marker. A marker representation is also added to the filmstrip representation 4240 in the preview section 3425. Specifically, a marker 4250 is added to a position corresponding to the selected location described in the list view.

In some embodiments, once a marker is added, the user can reposition or delete the marker. For example, a user can reposition the marker 4250 in the preview section 3425 by dragging the marker to a new location. Alternatively, the user can delete the marker by selecting and removing the marker (e.g., by pressing a delete key). When there are multiple markers, the media editing application may allow the user to navigate between the markers. For example, the media editing application may provide a hotkey or a selectable UI item for navigating to the next/previous marker.

In the example described above, the marker 4250 is added with the user specifying a location along the duration using the filmstrip representation 4240 in a list view. In some embodiments, these markers can also be added, deleted, or modified in a different view (e.g., thumbnail view, filmstrip view). These markers can also be added, deleted, or modified in the timeline. Several examples of modifying markers in the timeline are described below by reference to FIG. 51.

In some embodiments, the user can add a marker during playback of the video clip associated with the filmstrip. For example, the user can select the filmstrip representation and play the video clip (e.g., by selecting a play button or a hotkey). As the preview of the video clip plays (e.g., in a preview display area), the line 4245 moves horizontally across the virtual timeline of the filmstrip representation 4240. The user can identify a location within the clip and pause the playback (e.g., by selecting a pause button or a pause hotkey). The user can then mark the location. Instead of pausing the video clip, the user may simply mark a location as the video clip plays (e.g., by selecting a menu item for marking a clip or by selecting a hotkey).

Figure 43:
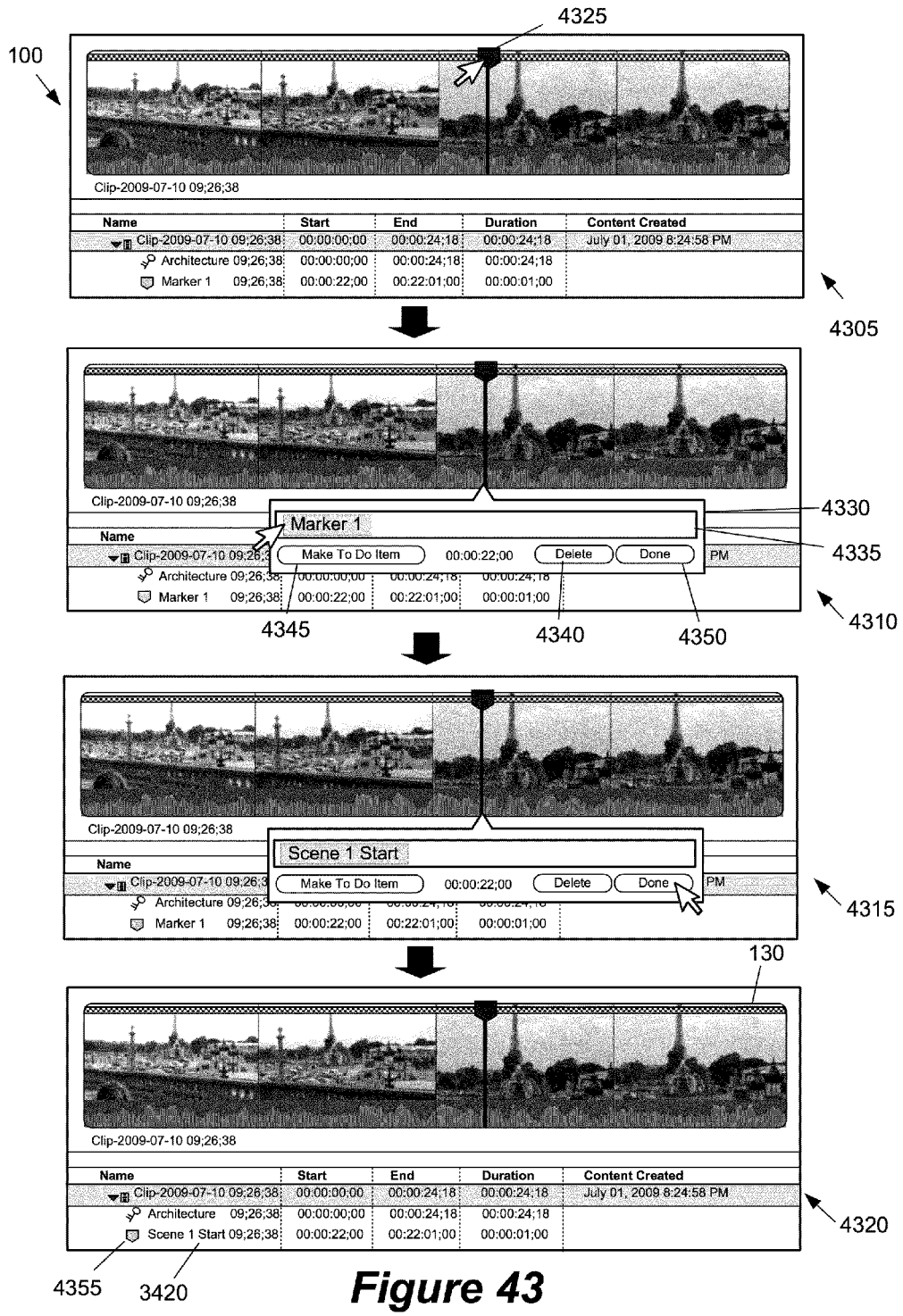
FIG. 43 provides an illustrative example of editing a marker.

FIG. 43 provides an illustrative example of editing a marker. Four operational stages 4305-4320 of the GUI 100 are shown in this figure. In the first stage 4305, a user selects a marker 4325. The selection causes a marker editor 4330 to appear as illustrated in the second stage 4310. The marker editor includes a text field 4335 for specifying a name or description of the marker, a control 4340 for deleting the marker, a control 4345 for defining the marker as a to-do item, and a control 4350 for applying changes to the marker or closing the marker editor 4330.

In the second stage 4310, the user types in the text field 4335 to provide a descriptive name or note for the marker 4325. The third stage 4315 illustrates the marker editor after the user inputs a different name for the marker. Lastly, the fourth stage 4320 illustrates the event browser 130 after the user selects the control 4350. Here, the marker information 4355 in the list section 3420 indicates that the name of the marker has been changed from "Marker 1" to "Scene 1 Start".

Figure 44:
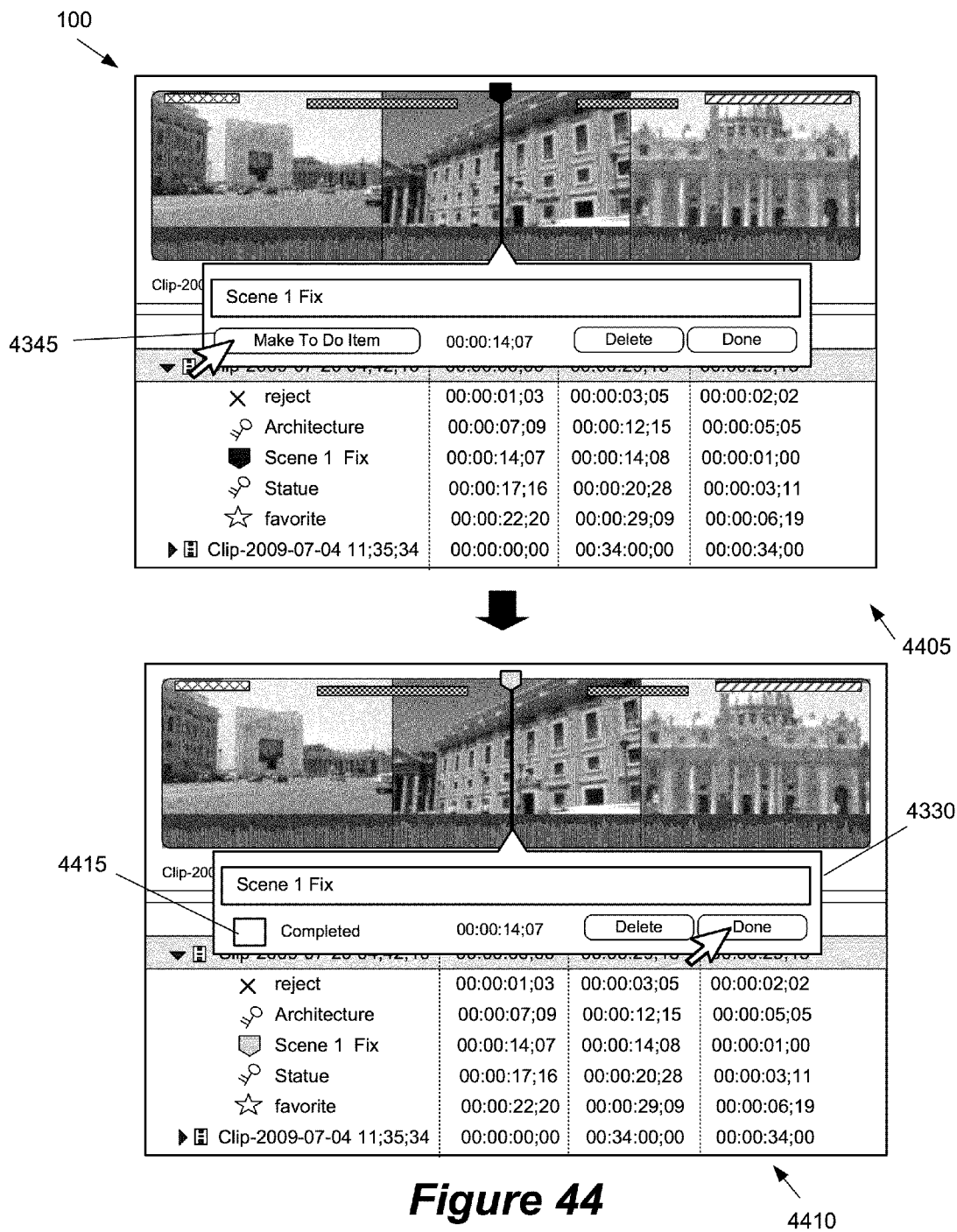
FIG. 44 provides an illustrative example of defining a marker as a to-do item.

FIG. 44 provides an illustrative example of defining a marker as a to-do item. Two operational stages 4405 and 4410 of the GUI 100 are shown in this figure. The first stage 4405 illustrates a selection of the control 4345 for defining the marker as a to-do item. The second stage 4410 illustrates the GUI 100 after the user selects the control 4345. As shown in the second stage 4410, the selection causes the marker to change its appearance. In the example illustrated in FIG. 44, the marker changes color (e.g., from blue to red). Also, in the marker editor 4330, the control 4345 is replaced with a control 4415 or check box for indicating whether the to-do item is a completed item. In some embodiments, a selection of this control causes the marker to appear differently. For example, the marker may change from a red color to a green color to indicate that the task is completed.

Figure 45:
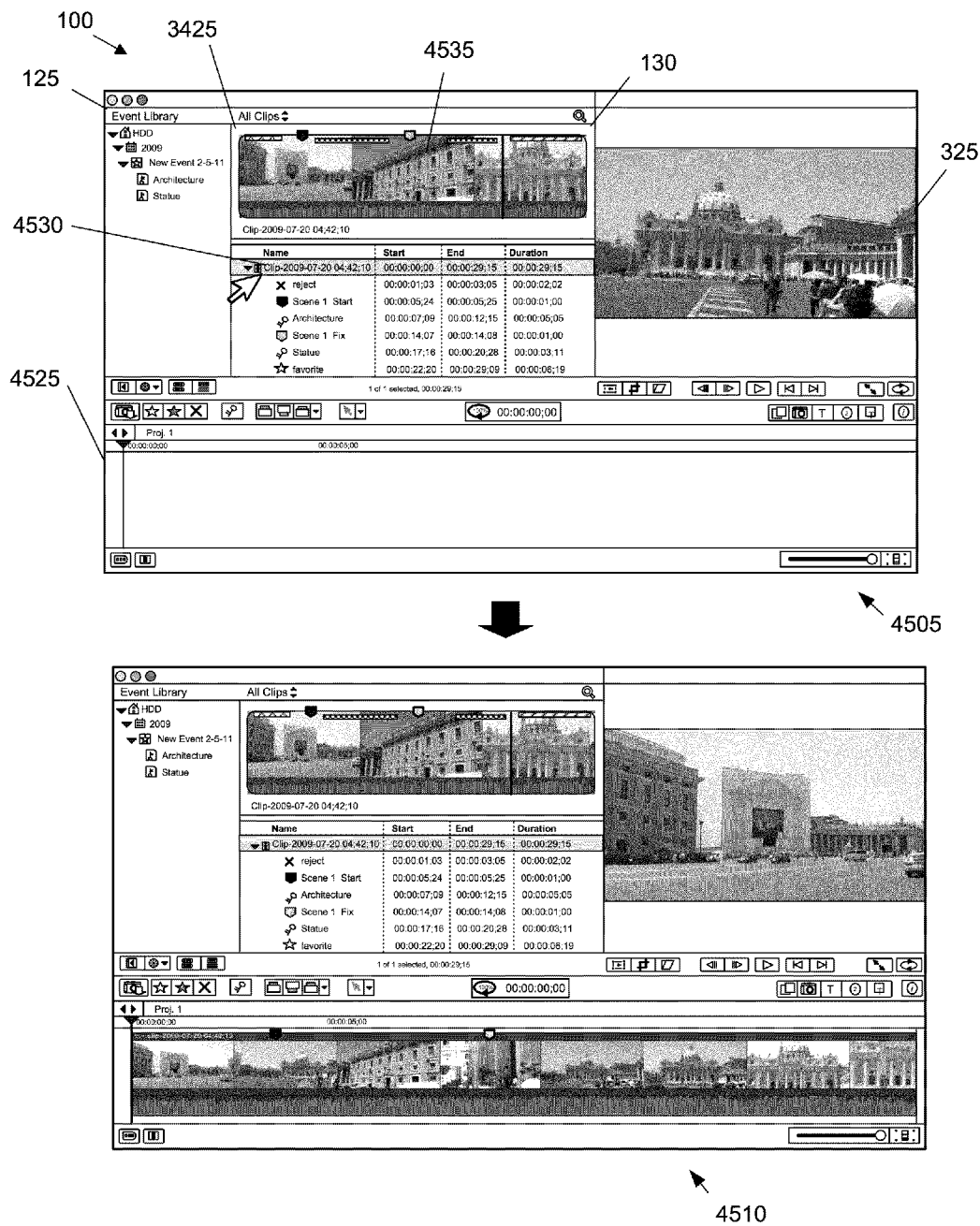
FIG. 45 provides an illustrative example of adding a video clip to a timeline.

FIG. 45 provides an illustrative example of adding a video clip to a timeline. In this example, the GUI 100 includes the preview display area 325, the event library 125, the event browser 130, and the timeline 4525. Two operational stages 4505 and 4510 of the GUI 100 are illustrated in this figure. The preview display area 325, the event library 125, and the event browser 130 are the same as those described above (e.g., FIGS. 1, 3, 34).

The first stage 4505 illustrates a selection of a video clip to add to the timeline 4525. Here, the user selects the video clip from the list view by selecting the video clip information 4530. To add the video clip, the user can drag the video clip information 4530 in the list section or the representation 4535 in the preview section 3425 to the timeline. The user can also select a hotkey to add the video clip to the timeline. As mentioned above, a range of the clip may be added to the timeline. For example, a range of a clip may be added by selecting a filmstrip representation in a keyword collection that represents a range of a video clip associated with a keyword. A range of a clip can also be selected from any one or more of the keywords or other items (e.g., ratings marker) displayed in the list view. Alternatively, the user can use a range selector to define a range of a clip to add to the timeline.

X. Timeline Search And Index

Some embodiments provide a novel timeline search tool for searching and navigating a timeline. In some embodiments, the search tool includes a search field for searching for clips in the timeline based on their names or associated keywords. The search tool includes a display area for displaying search results. In some such embodiments, each result is user-selectable such that a selection of the result causes the timeline to navigate to the position of the clip in the timeline. Accordingly, the timeline search tool allows a content editor to navigate the timeline to identify clips.

Figure 46:
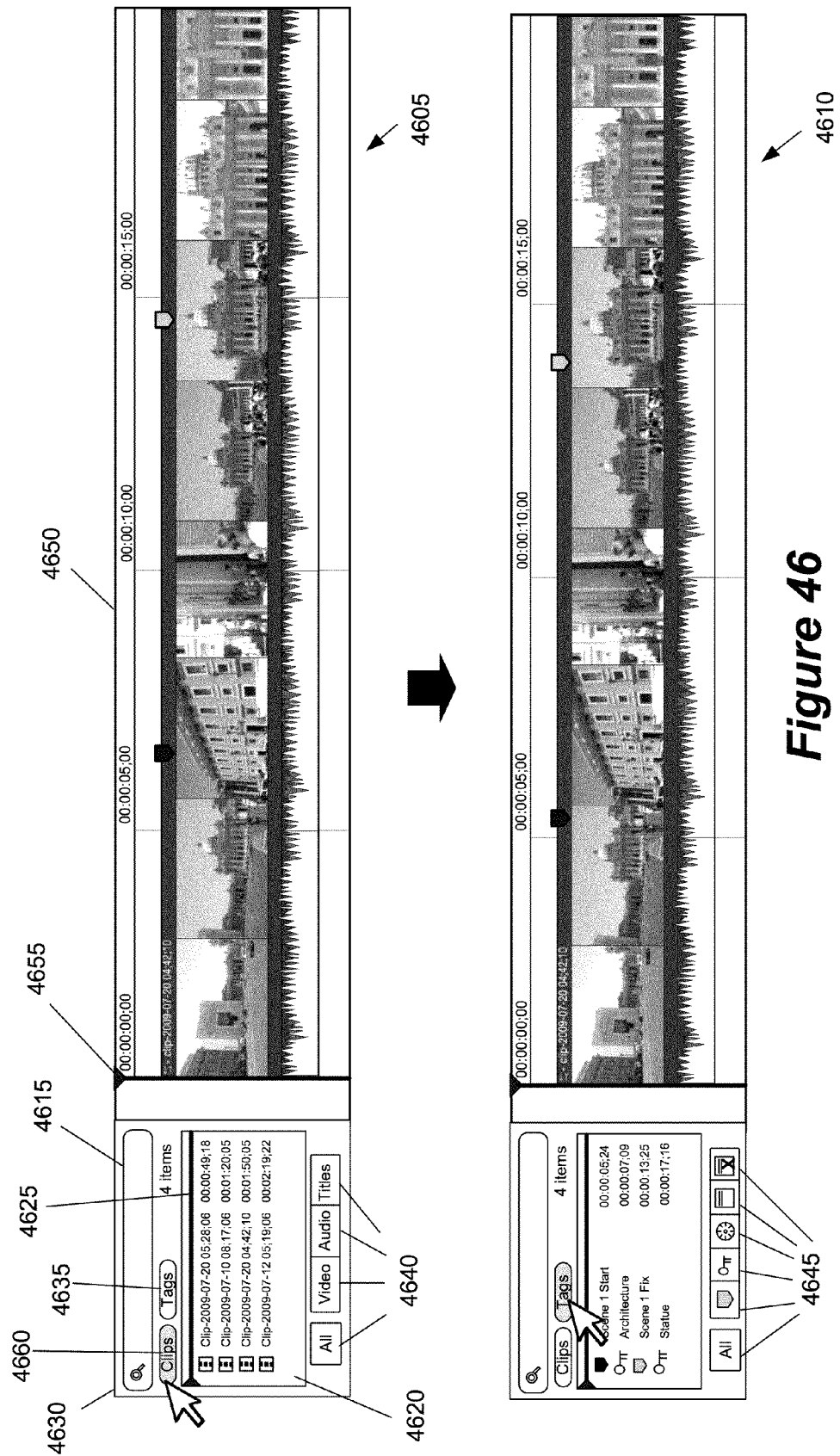
FIG. 46 provides an illustrative example of a timeline search tool according to some embodiments.

FIG. 46 provides an illustrative example of a timeline search tool 4630 according to some embodiments. Two operational stages 4605 and 4610 are shown in this figure. As shown in FIG. 46, the timeline search tool 4630 includes (1) a search field 4615 for specifying one or more search parameters, (2) a control 4660 for entering a clip view, (3) a control 4635 for entering a keyword view, (4) an index area 4620, and (5) an index playhead 4625.

In the first stage 4605, a timeline 4650 displays one of several different clips that are in a composite presentation. A user or content editor might have added these clips to the timeline in a current editing session or by opening a composite project (alternatively may be referred to as a "project") that was defined in a previous editing session. As shown in FIG. 46, the timeline search tool 4630 is displayed adjacent to the timeline 4650. However, the timeline search tool 4630 may be displayed elsewhere in some embodiments. For example, the timeline search tool may be provided in its own window separate from the timeline 4650. In the example illustrated in FIG. 46, the timeline search tool 4630 may be closed or opened (e.g., by selecting a toolbar button, menu item, shortcut key, etc).

The first stage 4605 shows the timeline search tool 4630 in a clip view. At any time, the user can switch to a keyword view by selecting the control 4635. In the clip view, the index area 4620 lists each clip (e.g., a range of a clip) that is added to the timeline 4650. One or more scrollbars may be displayed when the list of clips does not fit in the index area 4620.

Each particular clip listed in the index area 4620 represents an index to the particular clip in the timeline 4650. The user can select any one of the indices to navigate to a position of a corresponding clip in the timeline 4650. For example, when the composite presentation is for a two-hour program with many ranges of different clips, the user can select an index for a clip range and quickly navigate to the clip range in the timeline 4650.

In the example illustrated in FIG. 46, the clips are listed in chronological order starting with a first clip in the timeline 4650 and ending with a last clip in the timeline. Also, each clip includes (1) a clip icon that indicates the type of clip (e.g., video, audio, title), (2) a clip name, and (3) time duration. A user can choose what types of clips are listed in the index area 4620 by selecting one or more controls from a set of controls 4640. For example, the user can specify whether only video clips, audio clips, or title clips are displayed in the index area 4620. In some embodiments, instead of different icons, the index area 4620 displays the clips differently. For example, each clip may be represented by one or more thumbnail images, waveform, etc.

The second stage 4610 shows the timeline search tool 4630 in a keyword view. At any time, the user can switch to a clip view by selecting the control 4660. In the keyword view, the index area 4620 lists each keyword that is associated with one or more ranges of a clip in the timeline. These keywords may be user-specified keywords or analysis keywords in some embodiments. In addition to keywords, some embodiments list markers (e.g., ratings marker, to-do markers, etc.). In some embodiments, the index area 4620 lists smart collections. For example, the index area 4620 may list different smart collections related to an analysis keyword such as one person, two persons, a group of people, wide shot, close-up, etc. Similar to the clip view, one or more scrollbars may be displayed when the list of items does not fit in the index area 4620.

Not unlike the listing of clips in the clip view, each item (e.g., keyword, marker, smart collection) represents an index to the item in the timeline 4650. The user can select any one of the indices to navigate to a position of a corresponding item in the timeline 4650. In the example illustrated in the second stage 4610, each item in the index area 4620 includes an icon that indicates its type, name, and time duration. Also, the items are listed in the index area 4620 in chronological order starting with a first item in the timeline 4650 and ending with a last item in the timeline.

In the second stage 4610, a user can choose which types of items are displayed in the index area 4620 by selecting one or more controls of a set of controls 4645 below the index area. For example, the user can specify that only markers, keywords, incomplete to-do markers, or completed to-do markers be displayed in the index area.

As shown in FIG. 46, the index playhead 4625 is positioned at the top of index area 4620 above any other items (e.g., clip, keyword, and marker in both views). In the clip view, the position of the index playhead 4625 provides a reference point to one or more clips that is displayed in the timeline 4650. For example, in the first stage 4605, the position of the index playhead 4625 indicates that the timeline is displaying a first clip in the composite presentation that the user is creating. Similarly, in the keyword view, the position of the index playhead 4625 provides a reference point to one or more items (e.g., keywords, markers) that is associated with a particular clip in the timeline 4650. The position of the index playhead 4625 also corresponds to a timeline playhead 4655 in the timeline. This index playhead 4625 moves synchronously with the timeline playhead 4655, in some embodiments.

Figure 47:
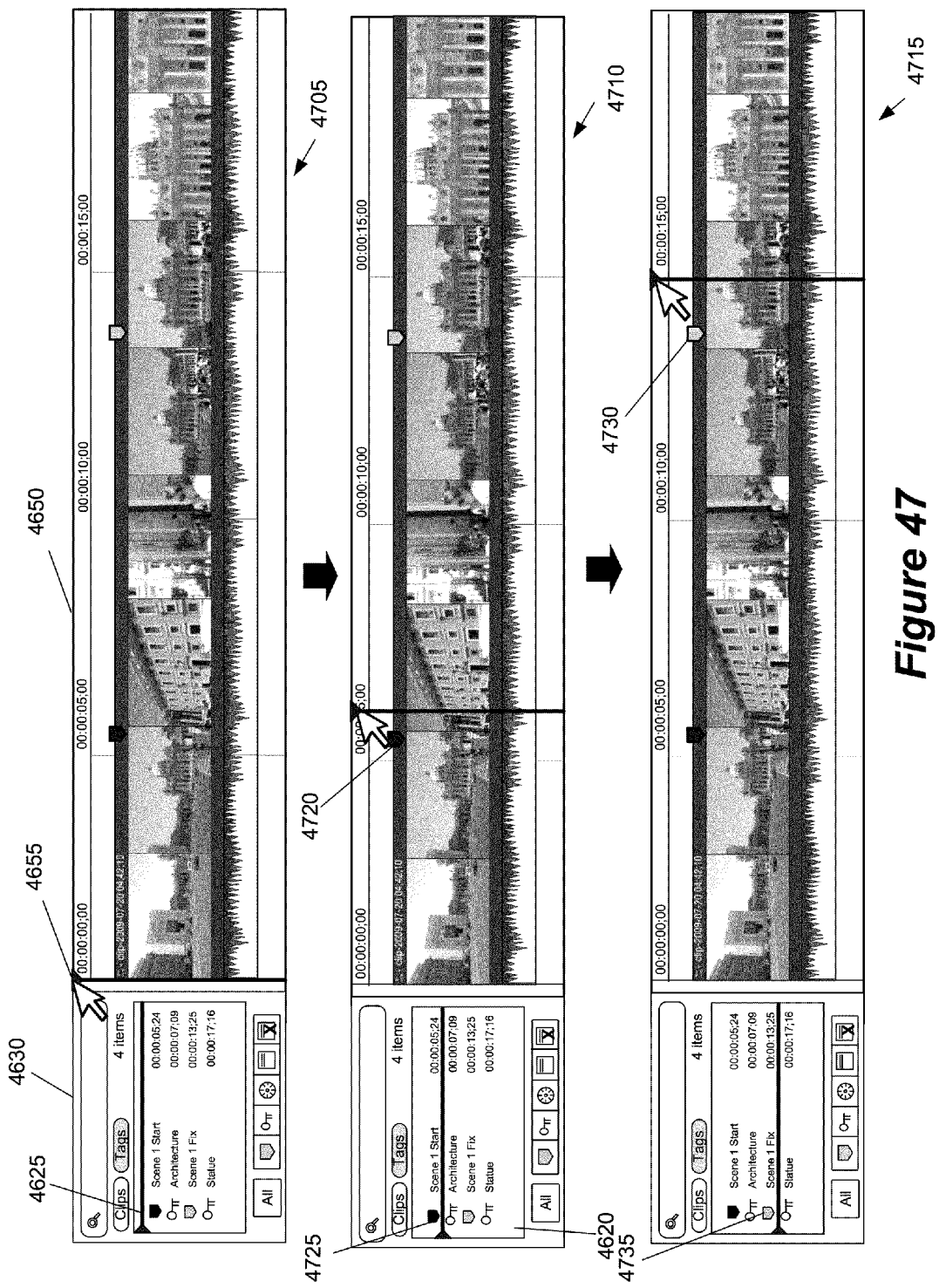
FIG. 47 provides an illustrative example of the association between the timeline playhead and the index playhead.

FIG. 47 provides an illustrative example of the association between the timeline playhead 4655 and the index playhead 4625. Specifically, in three operational stages 4705-4715, this figure illustrates how the index playhead 4625 is moved when a user selects and moves the timeline playhead 4655.

In the first stage 4705, the timeline playhead 4655 is situated at a position on the timeline 4650 that corresponds to a starting point of the composite presentation. The timeline search tool 4630 is in a keyword view and displays a list of keywords and markers. The position of the index playhead 4625 corresponds to the position of the timeline playhead 4655. This is shown in the first stage 4705 as the index playhead is situated at the top of the index area 4620 above the keywords and markers.

The second stage 4710 shows a selection and movement of the timeline playhead 4655 past a first marker 4720. As shown, the movement causes the index playhead 4625 to be moved down by following the chronological order of the indices in the index area 4620. Specifically, in the second stage 4710, the index playhead 4625 is moved to a position below a first marker item 4725 corresponding to the first marker 4720 in the timeline 4650.

The third stage 4715 shows a selection and movement of the timeline playhead 4655 past a second marker 4730. As shown, the movement causes the index playhead 4625 to be moved down in the list of markers and keywords. Specifically, in the third stage 4715, the index playhead 4625 is moved to a position below a second marker item 4735 corresponding to the second marker 4730 in the timeline 4650.

Figure 48:
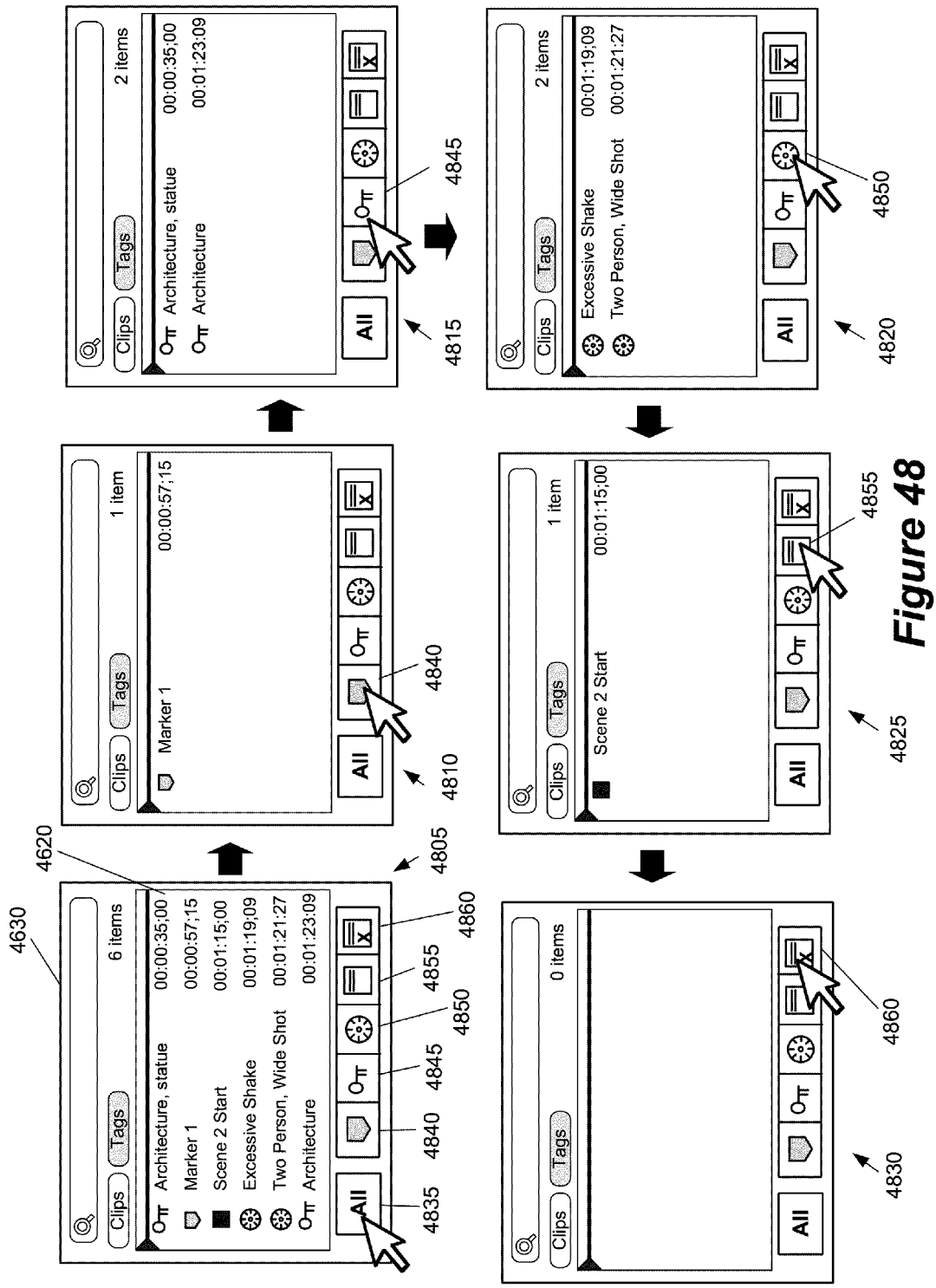
FIG. 48 provides an illustrative example of filtering the timeline search tool.

FIG. 48 provides an illustrative example of filtering the timeline search tool 4630. Specifically, this figure illustrates in six operational stages 4805-4830 how the set of controls 4835-4860 can be used to filter the index area 4620. In this example, as the search tool is in a keyword view, only the set of controls 4835-4860 related to keyword search is shown below the index area 4620.

In the first stage 4805, the index area lists all keywords and markers associated with clips in the timeline. Specifically, the control 4835 for showing all items is activated, which causes the index area 4620 to list each item. The second stage 4810 shows selection of a control 4840, which causes the index area 4620 to display only markers.

The third stage 4815 shows selection of a control 4845 for displaying only keywords. Accordingly, in the third stage 4815, only keywords are listed in the index area 4620. Specifically, the index area 4620 lists two selectable keyword items. The first item corresponds to a range of a clip associated with both first and second keywords. The second item corresponds to a range associated with the first keyword. In some embodiments, the time (e.g., time code) listed for each item (e.g., clip, keyword, marker, etc.) in the index area 4620 corresponds to a starting point of the range of the item along the sequence or composite presentation. For example, in the third stage 4815, the first range associated with the two keywords is around 35 seconds into the sequence.

The fourth stage 4820 shows selection of a control 4850 for displaying only analysis keywords. This causes the index area 4620 display only two selectable items for analysis keywords associated with the clips in the sequence. The fifth stage 4825 shows selection of a control 4855 that causes the index area to display only to-do markers. The sixth stage 4830 shows selection of a control 4860 that causes the index area 4620 to only list completed to-do markers. In the sixth stage 4830, the index area 4620 is empty because the clips in the timeline are not associated with any completed to-do markers.

Figure 49:
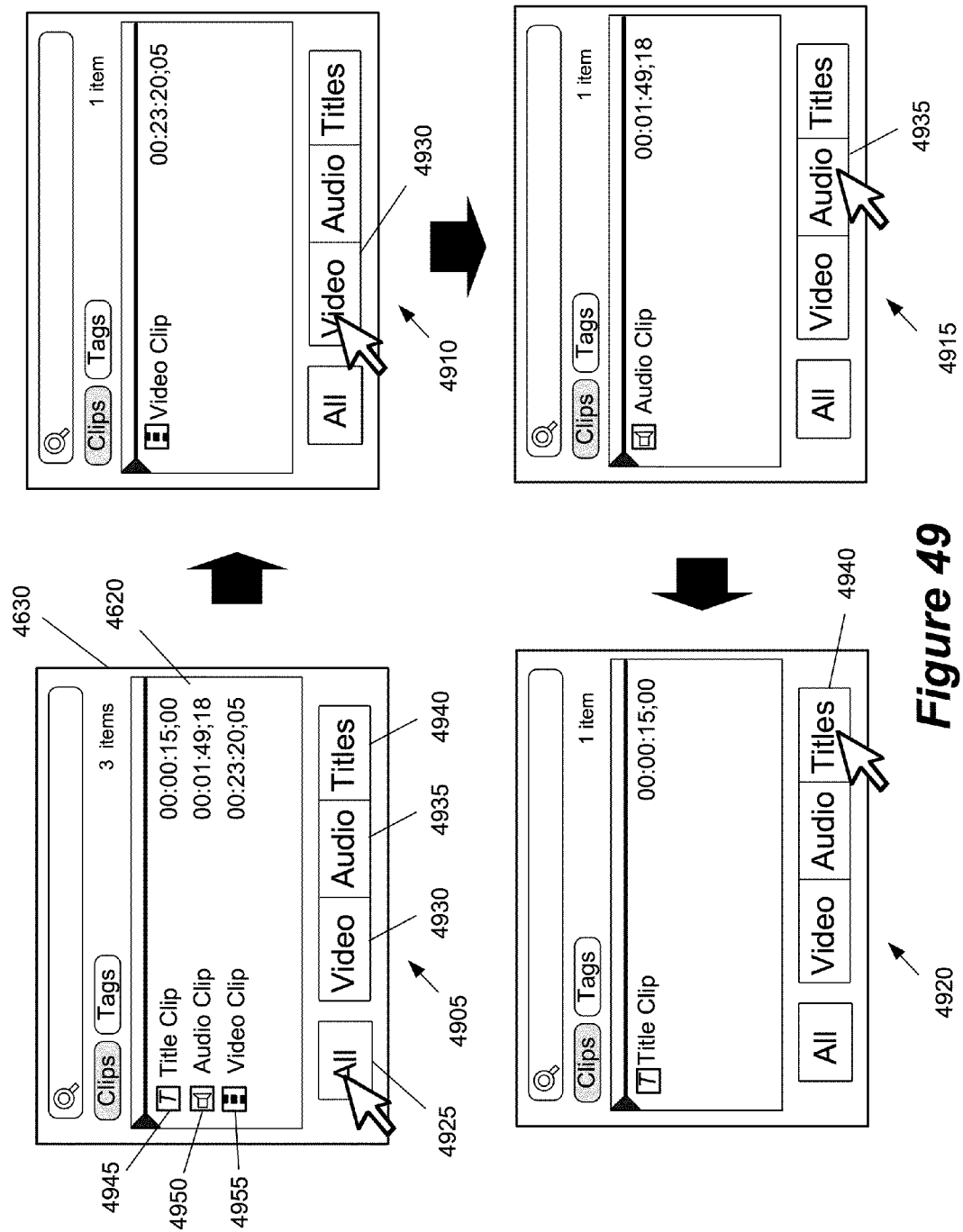
FIG. 49 provides an illustrative example of filtering the timeline search tool based on video, audio, and titles.

In the previous example, the timeline search tool 4630 is filtered based on keywords, markers, analysis keywords, to-do markers, and completed to-do markers. FIG. 49 provides an illustrative example of filtering the timeline search tool 4630 based on video, audio, and titles. Four operational stages 4905-4920 are illustrated in this figure. In this example, as the timeline search tool 4630 is in a clips view mode, only the set of controls 4925-4940 relating to clips search is shown below the index area 4620.

In the first stage 4905, the index area 4620 lists each clip in the timeline because the control 4925 corresponding to all clips is activated. Specifically, the index area 4620 lists a title clip 4945, an audio clip 4950, and a video clip 4955. In some embodiments, title clips are synthesized clips generated by a media editing application. For example, a user might add one or more title clips to a composite presentation using a title effects tool. This title effects tool may provide different options for defining a title clip to add to the composite presentation.

In contrast to audio and video clips, title clips do not reference any source media on a disk, in some embodiments. In general, titles may play a critical role in movies, providing important bookends (e.g., opening titles and closing credits), and conveying time and dates within the movie. Titles, especially in the lower third of the screen, are also used in documentaries and informational videos to convey details about onscreen subjects or products.

As shown in the second stage 4910, the selection of the control 4930 for showing only video clips causes the index area 4620 to only list a video clip 4955. The third stage 4915 shows selection of a control 4935 for displaying only audio clips. The selection of the control 4935 causes the index area 4620 to only list the audio clip 4950. The fourth stage 4920 shows selection of a control 4940 for displaying only title clips, which causes the index area 4620 to list only the title clip 4945.

Figure 50:
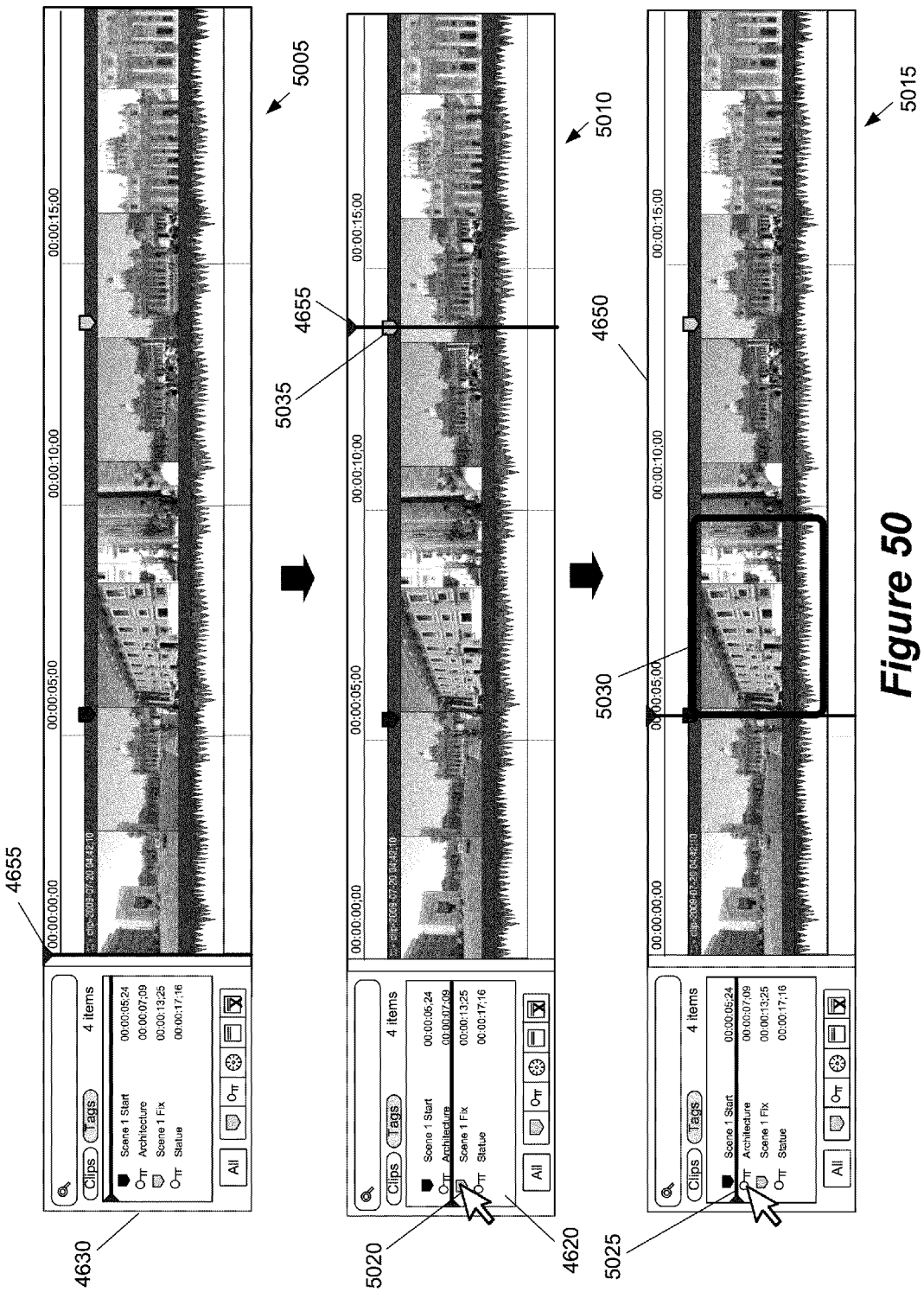
FIG. 50 provides an illustrative example of navigating the timeline using the search tool.

FIG. 50 provides an illustrative example of navigating the timeline using the timeline search tool 4630. Three operational stages 5005-5015 are shown in this figure. In the first stage 5005, the timeline playhead 4655 is situated at a position on the timeline that corresponds to a starting point of the composite presentation. The timeline search tool 4630 is in a keyword search mode and displays a list of keywords and markers.

The second stage 5010 shows a selection of a to-do marker item 5020 in the index area 4620. As shown, the selection causes the timeline playhead 4655 to move to a position of a marker 5035 corresponding to the to-do marker item 5020 in the index area 4620. The third stage 5015 shows a selection of a keyword item 5025 in the index area 4620. The selection causes the playhead to be moved to a starting point of a range 5030 associated with the keyword corresponding to the keyword item 5025. The selection also causes the clip range 5030 associated with the keyword to be selected in the timeline 4650. This provides a visual indication to the user of the range of the sequence that is tagged with the keyword. In some embodiments, when multiple keywords are selected from the index area 4620, the ranges of the keywords are selected in the timeline and the timeline may move such that the beginning or starting point of a range associated with a first keyword in the index area 4620 is aligned with the timeline's playhead. In some embodiments, the selection mechanism allows users to inspect the timeline and perform a number of different operations. These operations include removing items from the timeline (e.g., clips, tags and Markers), editing operations (e.g., adding effects), etc.

In the example described above, the user selects a keyword and marker in the timeline search tool 4630 to navigate the timeline 4650. This is particularly useful when the timeline is densely populated with multiple different clips (e.g., ranges of clips). For example, when the composite presentation is a long presentation, there may be many clips (e.g., audio clips, subtitles, video clips, titles, images). In such a situation, the timeline search tool 4630 can be used to locate a particular item and navigate to the particular item in the timeline 4650. In some embodiments, the timeline search tool 4630 allows the user to navigate to the items (e.g., clips, keywords, markers) in a similar manner as navigating to items in a list. For example, a user can select an item through a directional key (e.g., up key, down key), which causes the timeline to navigate to the position of the item.

Figure 51:
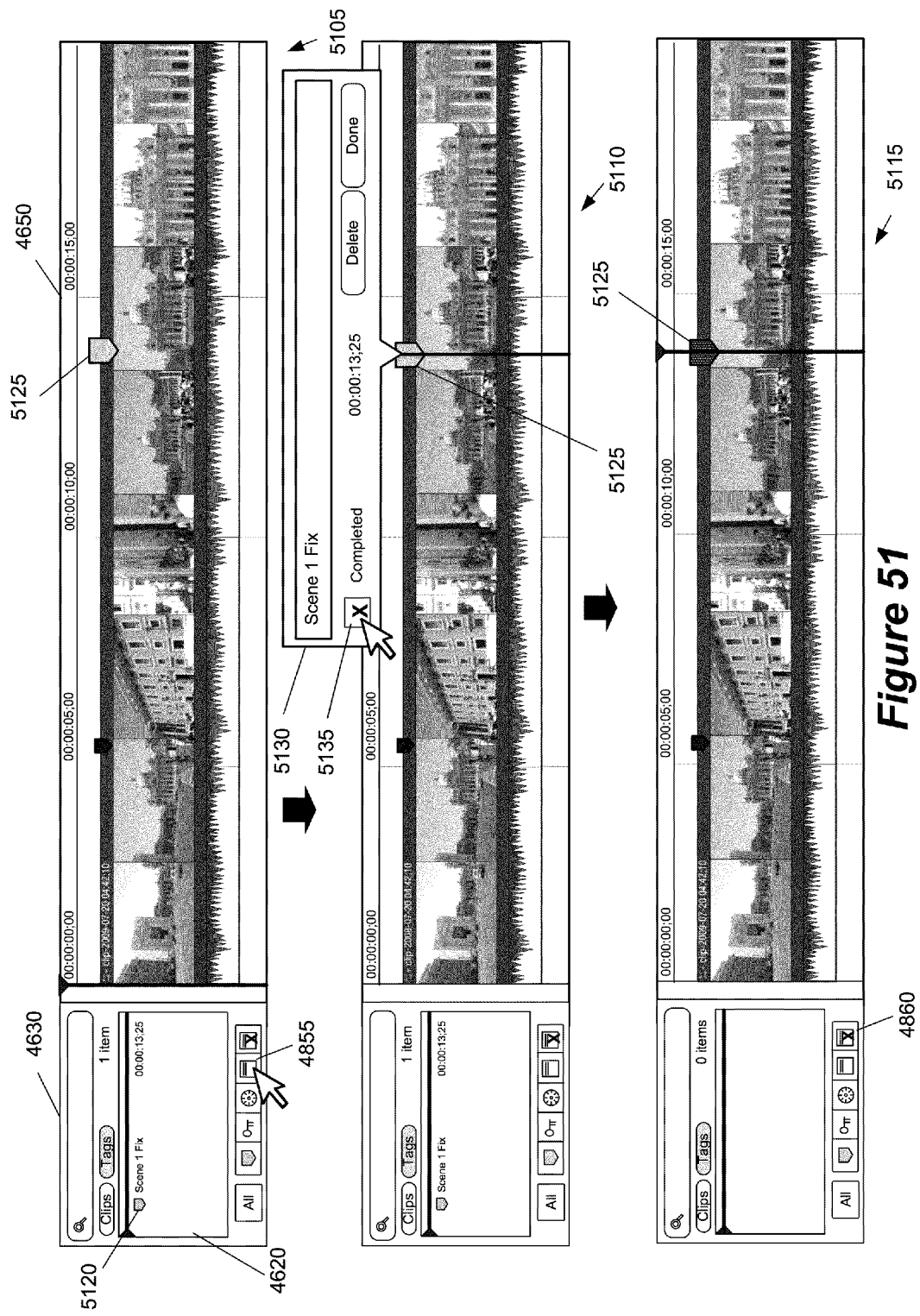
FIG. 51 provides an example workflow for searching the timeline for a to-do marker using the search tool and checking the to-do marker as a completed item.

FIG. 51 provides an example workflow for searching the timeline 4650 for a to-do marker using the timeline search tool 4630 and specifying the to-do marker as a completed item (e.g., by selecting a checkbox). Three operational stages 5105-5115 are shown in this figure. In the first stage 5105, the control 4855 for displaying only to-do markers with an incomplete flag is selected. The selection causes the index area 4620 to display only a marker item 5120 corresponding to a to-do marker 5125 in the timeline. The user then selects this marker item 5120, which causes navigation across the timeline to the to-do marker 5125.

The second stage 5110 shows the timeline 4650 after the user selects (e.g., through a double click operation) the to-do marker 5125 on the timeline. As shown, the selection causes a popup window 5130 to appear. The pop-up window includes information related to the to-do marker and a check box 5135 for flagging the to-do marker as being a completed item.

The third stage 5115 shows the timeline 4650 after the user selects a check box 5135 to flag the to-do marker 5125 as a completed item. In the third stage 5115, the appearance of the marker 5125 is different from its appearance in the first and second stages 5105 and 5110. Specifically, in this example, the marker changes color (e.g., from red to green) to indicate that the to-do task is completed. Also, the index area 4620 that displays incomplete to-do markers is cleared as the to-do marker 5125 has been flagged as being a completed item. Also, the control 4860 can be selected to display each completed task in the index area 4620.

In the example described above, the to-do marker 5125 is checked as being completed using the timeline. In some embodiments, the to-do marker may be flagged as being completed using the timeline search tool 4630. For example, instead of flagging the marker using the pop-up window 5130, the marker item 5120 may be selected to mark the to-do marker 5125 as a completed item.

Figure 52:
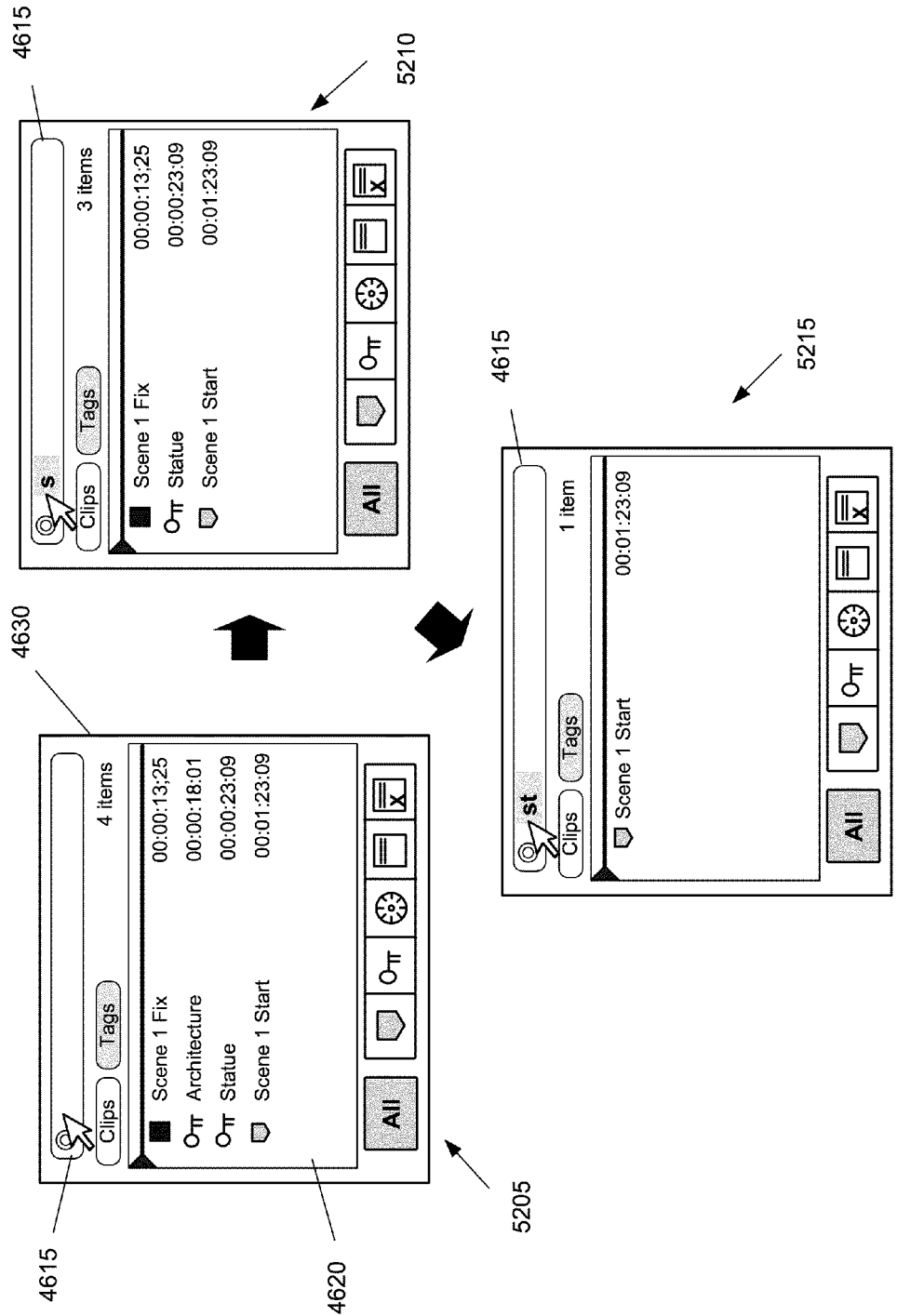
FIG. 52 provides an illustrative example of using the timeline search tool to search a list of keywords and markers.

FIG. 52 provides an illustrative example of using the timeline search tool 4630 to search a list of keywords and markers. Specifically, this figure illustrates in three operational stages 5205-5215 how the search field 4615 can be used to filter the index area 4620 of the timeline search tool 4630. In this example, as the search tool is in a keyword view mode, only the set of controls related to keyword search is shown below the index area 4620.

In the first stage 5205, the index area 4620 lists all keywords or markers that are associated with the clips in the timeline. The user inputs a letter "s" into the search field 4615 in the second stage 5210. This causes the index area 4620 to only display keywords and markers that includes the letter "s". The third stage 5215 illustrates inputting an additional letter into the search field 4615. Specifically, the user inputs the letter "t" in addition to the previous input of the letter "s". This causes the index area 4620 to only display each keyword or marker that includes the sequence of letters "st".

Figure 53:
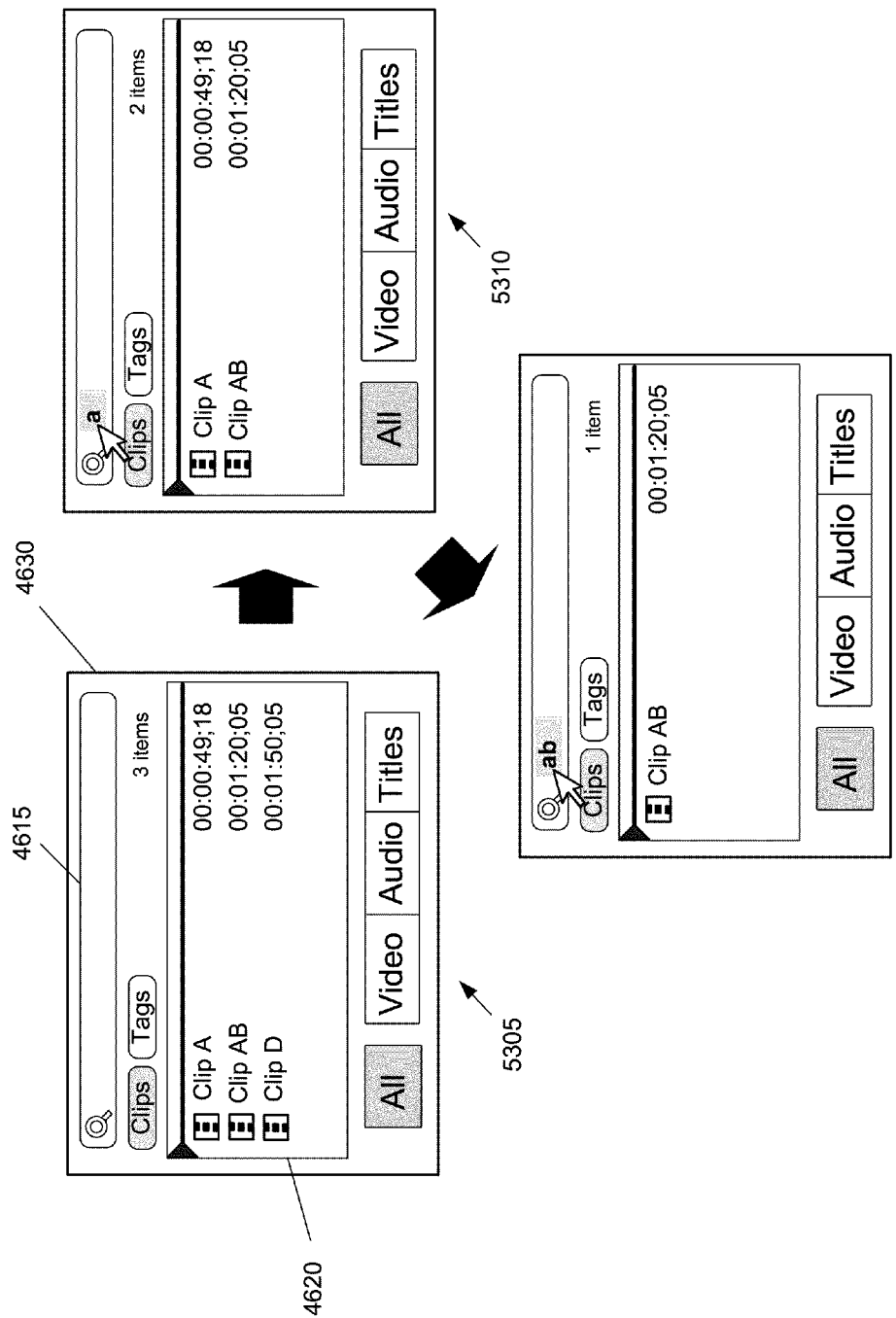
FIG. 53 provides an illustrative example of using the timeline search tool to search a list of clips.

FIG. 53 provides an illustrative example of using the timeline search tool 4630 to search a list of clips. Specifically, this figure illustrates in three operational stages 5305-5315 how the search field 4615 can be used to filter the index area 4620 of the timeline search tool 4630 based on clips. In this example, as the timeline search tool 4630 is in a clip view mode, only the set of controls related to clips searches is shown below the index area 4620.

In the first stage 5305, the index area 4620 lists all clips in the timeline. In the second stage 5310, the user inputs a letter "a" into the search field 4615. This causes the index area 4620 to only display clips that includes the letter "a". The third stage 5315 illustrates inputting an additional letter into the search field 4615. Specifically, the user inputs the letter "b" in addition to the previous input of the letter "a". This causes the index area 4620 to only display each clip that includes the sequence of letters "ab".

Figure 54:
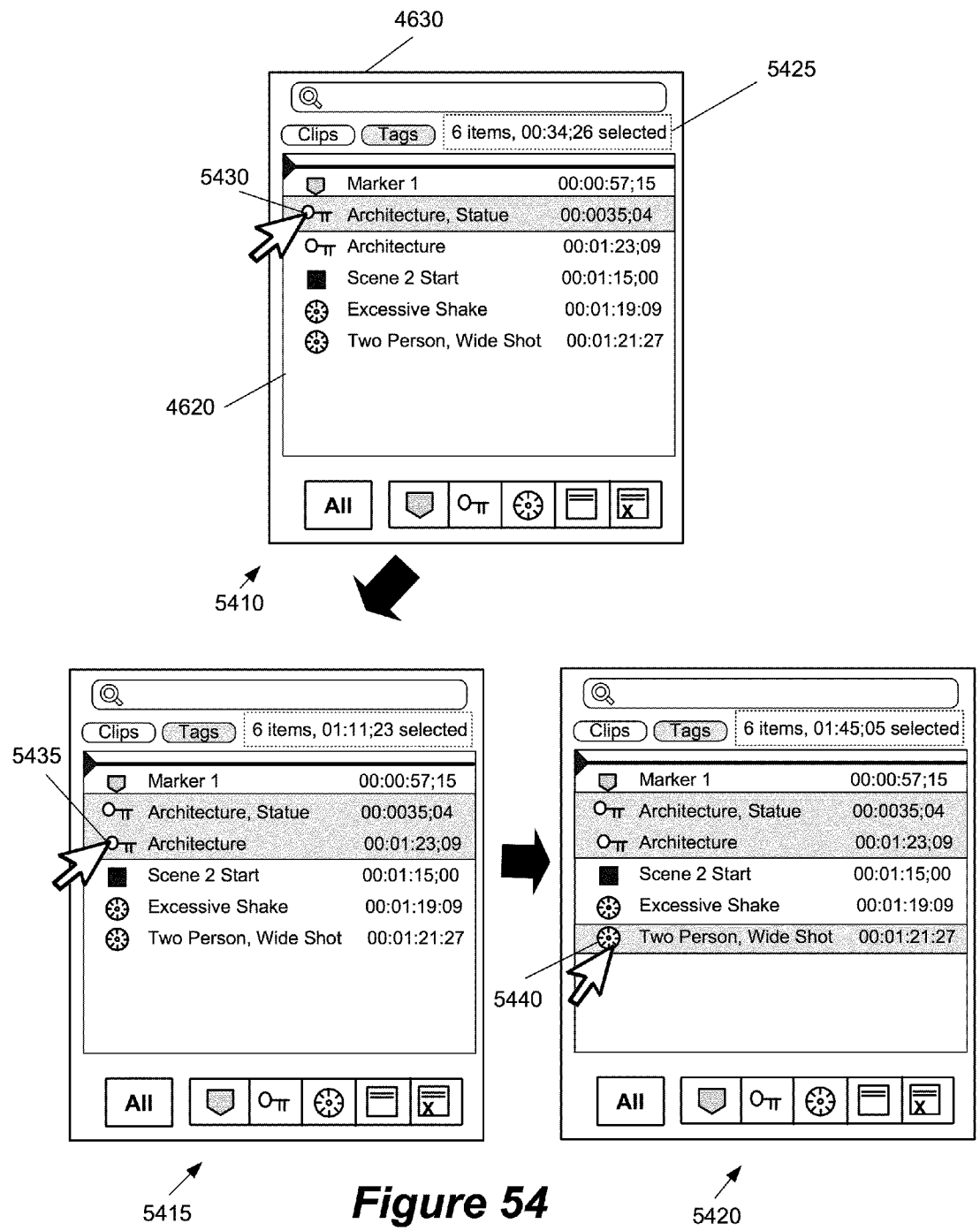
FIG. 54 provides an illustrative example of using the timeline search tool to display a time duration for ranges of clips.

FIG. 54 provides an illustrative example of using the timeline search tool 4630 to display time duration for ranges of clips (e.g., that are associated with one or more keywords). Three operational stages 5410-5420 of the timeline search tool 4630 are illustrated in this figure.

As shown in the first stage 5410, a user selects a first keyword item 5430 in the index area 4620 of the timeline search tool 4630. The selection causes the timeline search tool 4630 to display a total time for the range of a clip associated with a keyword corresponding to the first keyword item 5430. Specifically, the total time is displayed in a display area 5425.

In the second stage 5415, the user selects a second keyword item 5435, while selecting the first keyword item 5430. This causes the total time of the two ranges of clips associated with the keywords to be displayed in the display area 5425. The third stage 5420 shows the total time of three clip ranges in the display area 5425. However, in this third stage, the total duration includes a duration for a clip range that is associated with a set of analysis keywords that correspond to an analysis keyword item 5440.

In the example described above, a total duration is displayed when multiple items corresponding to one or more keywords are selected from the index area 4620 of the timeline search tool 4630. Displaying the total time can be useful in a number of different ways. For example, an editor may be restricted to adding only 30 seconds of stock footage. Here, when the stock footage is tagged as such, the editor can select those items corresponding to the stock footage in the index area 4620 and know whether the total duration exceeds 30 seconds.

Figure 55:
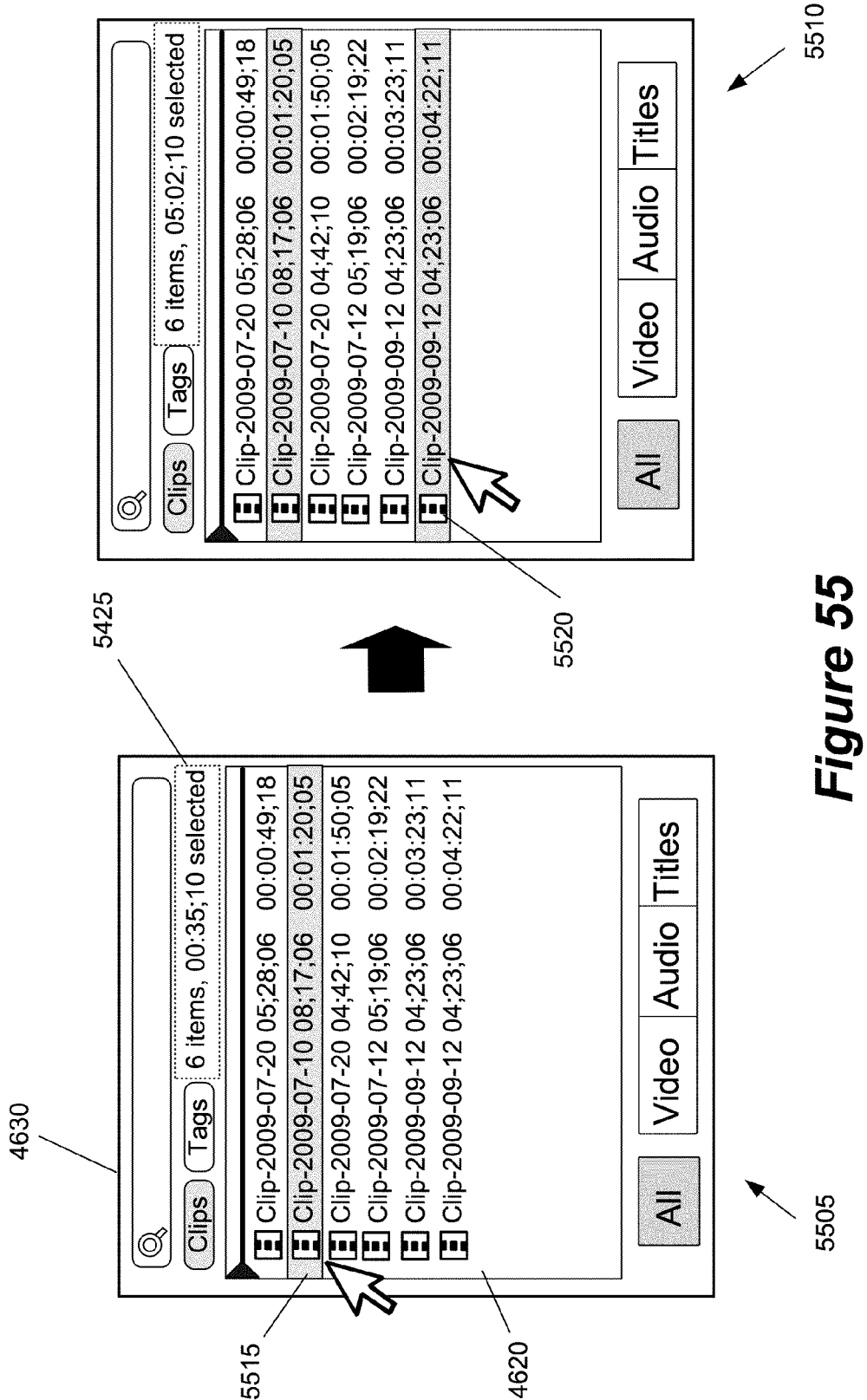
FIG. 55 provides an illustrative example of displaying the total time of selected clip items in the index area of the timeline search tool.

FIG. 55 provides an illustrative example of displaying the total time of several clips in the timeline search tool 4630. This figure is similar to the previous example. However, in the example illustrated in FIG. 55, the user selects multiple items corresponding to different clips. Specifically, in the first state 5505, the user selects a first item 5515 to display a total duration for a first clip in the display area 5425 of the timeline search tool 4630. In the second stage 5510, the user selects a second item 5520 corresponding to a second clip, while selecting the first item 5515. This causes the display area 5425 to display the total duration of both the first and second clips.

Figure 56:
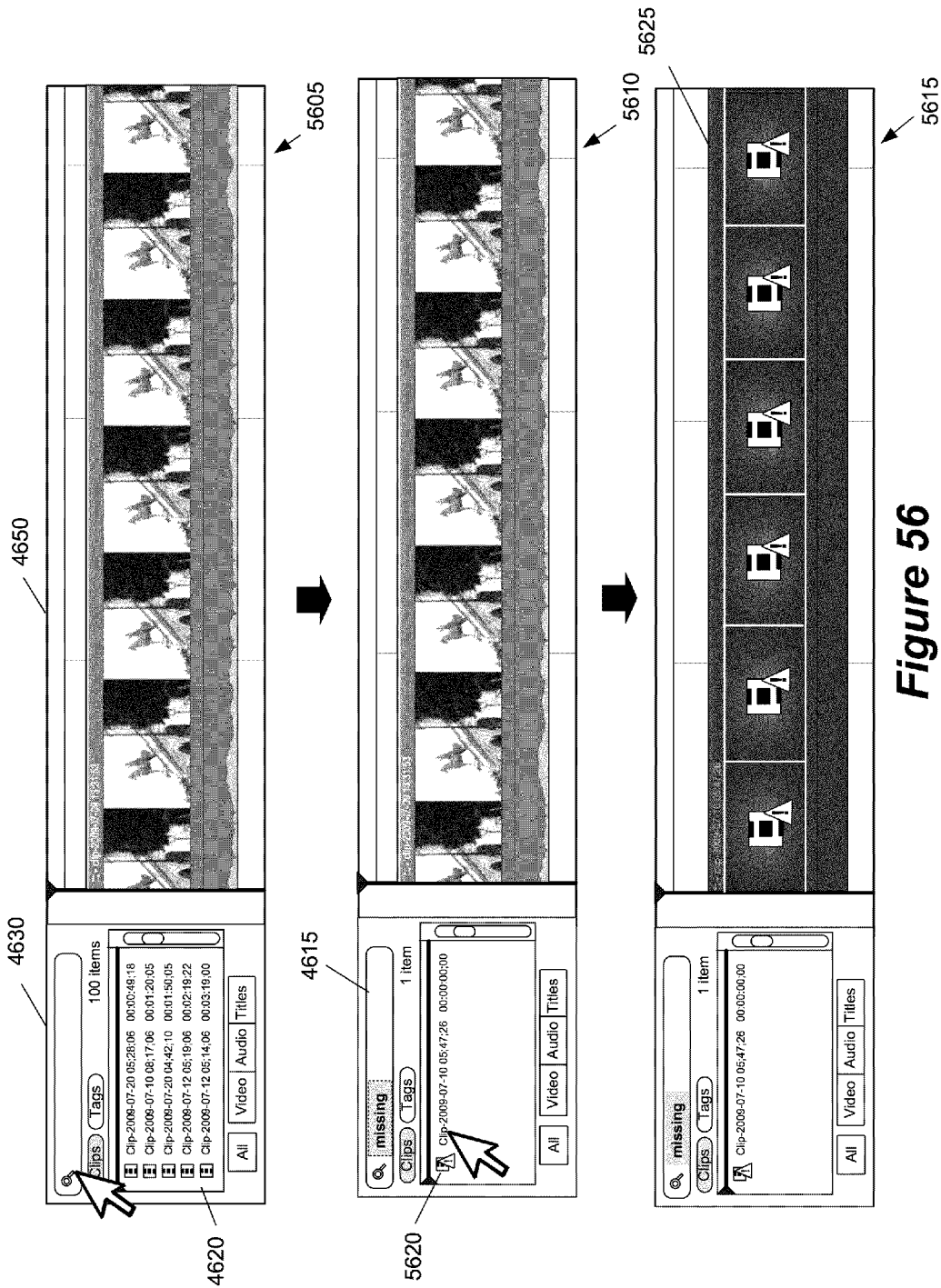
FIG. 56 provides an illustrative example of using the timeline search tool to find missing clips.

In some embodiments, the timeline search tool 4630 allows a user to find missing clips. A missing clip is a clip imported into the media editing application that does not link back to its source. For example, a user might have moved or deleted a source file on a hard disk to break the link between the application's file entry and the source file. FIG. 56 provides an illustrative example of using the timeline search tool 4630 to find missing clips.

In the first stage 5605, the timeline 4650 includes a number of different clips. This is indicated by the listing of clips in the index area 4620 of the timeline search tool 4630. The second stage 5610 shows the timeline 4650 after a search parameter for finding missing clips is inputted by the user into the search field 4615 of the timeline search tool 4630. In some embodiments, the search parameter is a predefined search parameter or keyword to search for missing clips in the timeline. In this example, the user types the word "missing" into the search field 4615. However, a different word or parameter can be used, in some embodiments.

As shown in the second stage 5610, the input causes the index area 4620 of the timeline search tool 4630 to display an index item 5620 for a missing or offline clip. The user then selects the index item 5620 to navigate to the missing clip.

The third stage 5615 shows the timeline 4650 after the user selects the index item 5620. Specifically, the selection causes the timeline to be navigated to the missing clip. Here, the user can select the index item 5620 or the clip representation 5625 to delete the clip from the project. Alternatively, the user can reestablish the broken link. For example, a selection of the index item 5620 may cause a clip inspector to be displayed. This clip inspector allows the user to identify the location of the missing clip in order to reestablish the broken link.

Figure 57:
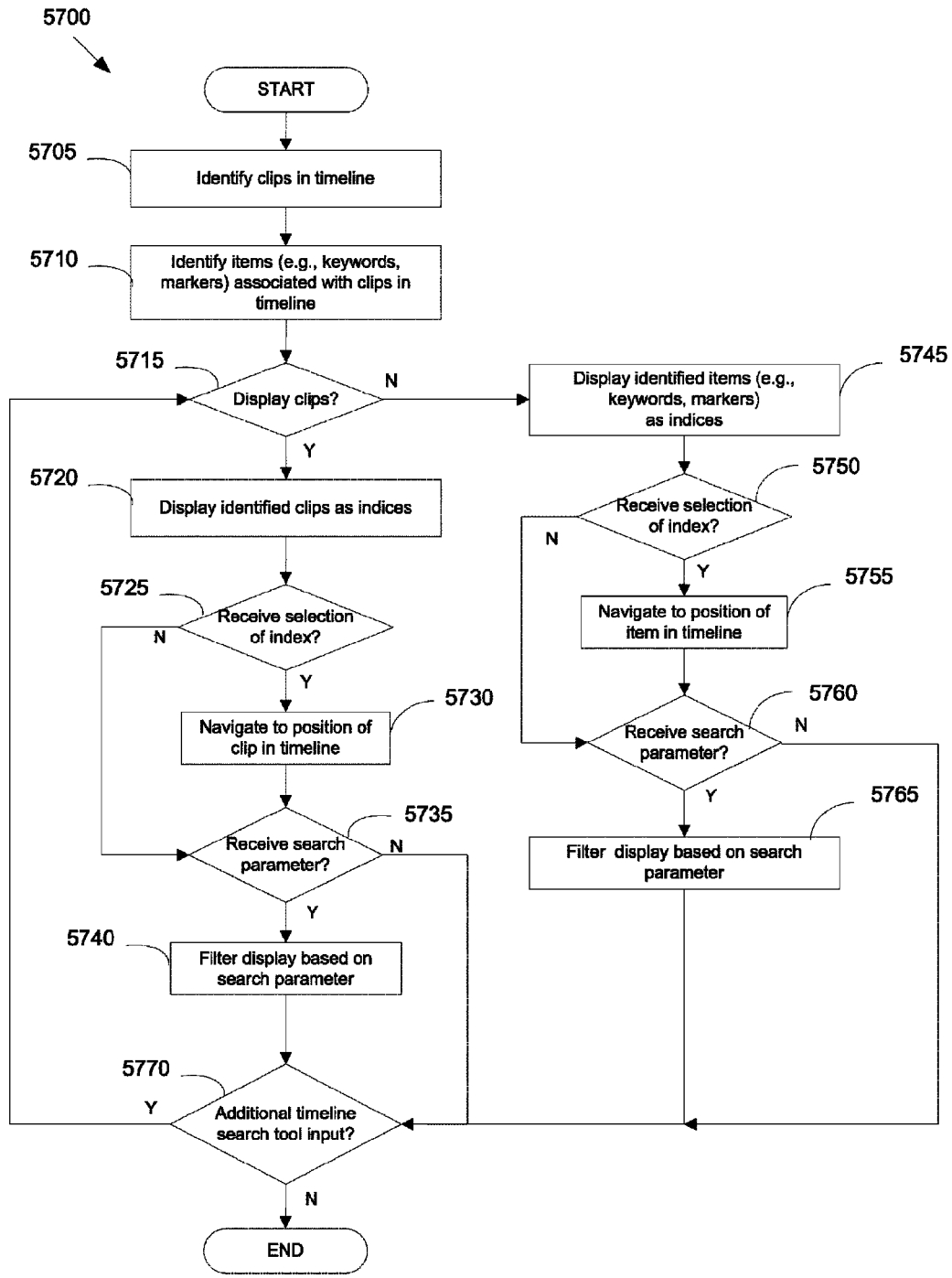
FIG. 57 conceptually illustrates a process for searching and navigating a timeline of a media editing application.

FIG. 57 conceptually illustrates a process 5700 for searching and navigating a timeline of a media editing application. In some embodiments, the process is performed through a timeline search tool of the media editing application. As shown in this figure, the process 5700 begins by identifying (at 5705) clips in the timeline. Next, the process identifies (at 5710) items (e.g., keywords, markers) associated with the clips in the timeline. Examples of such associated items include media clips, keywords, smart collections, markers, etc.

The process 5700 then determines (at 5715) whether it is in a clip view mode. When the determination is made that the process is in a clip view mode, the process 5700 displays (at 5720) identified clips as indices in an index display area. Next, the process 5700 determines (at 5725) whether it has received a selection of a listed index item. In some embodiments, the process 5700 continuously monitors user actions in the clip view mode to make this determination.

When the determination is made that the process 5700 has received a selection of a listed index item, the process navigates (at 5730) to the position of the selected clip in the timeline. At 5735, the process 5700 determines whether it has received any search parameter.

When the determination is made that the process has received some search parameters, the process filters (at 5740) the indices displayed in index display area based on the received search parameters. The process then goes on to 5770. In some embodiments, the process 5700 continuously monitors a search field to determine whether the user has inputted a search parameter (e.g., a letter, a number).

Back at 5715, when the process 5700 determines that it is not in a clip view mode or is in a keyword view mode, the process displays (at 5745) the identified items (e.g., keywords, markers) as indices in the index display area. The process 5700 then determines (at 5750) whether it has received a selection of a listed index item. When the determination is made that the process 5700 has not received a selection of a listed index item, the process 5700 transitions to 5760. In contrast, when the determination is made that the process 5700 has received a selection of a listed index item, the process navigates (at 5755) to the position of the selected item in the timeline.

The process 5700 then determines (at 5760) whether any search parameter has been received. When the determination is made that a search parameter has not been received, the process transitions to 5770. In contrast, when the determination is made that a search parameter has been received, the process 5700 filters (at 5765) the indices displayed in index display area based on the received search parameters. The process then goes on to 5770.

At 5770, the process 5700 determines whether there is any additional input for the timeline search tool. If it is determined that there is additional input for the timeline search tool, the process 5700 returns to 5715 to continue its navigation and filtering. Otherwise, the process 5700 terminates.

Figure 58:
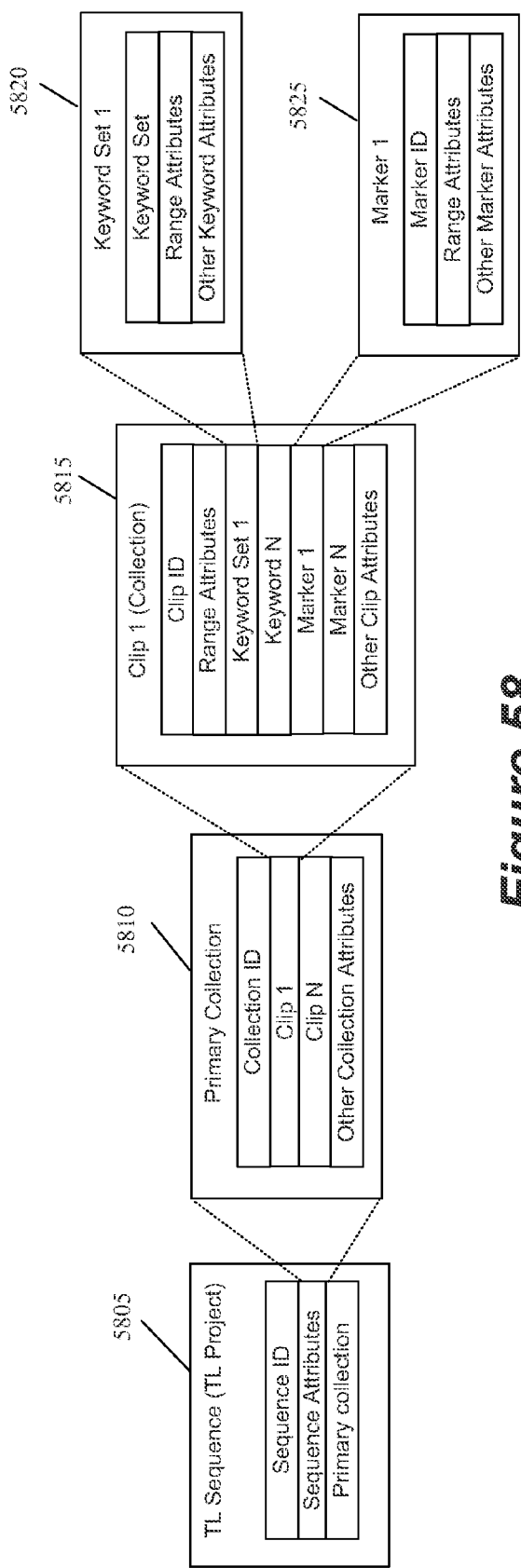
FIG. 58 conceptually illustrates several example data structures for a searchable and navigable timeline.

For some embodiments of the invention, FIG. 58 conceptually illustrates several example data structures for a searchable and navigable timeline. In some embodiments, the data structures are all contained within a project data structure that contains a single sequence for generating a composite presentation. FIG. 58 illustrates a timeline sequence 5805 that includes a primary collection data structure 5810. Here, the primary collection data structure 5810 is in itself an array of one or more clip objects or collection objects. Several examples of such clip objects are described above by reference to FIG. 5.

As shown in FIG. 58, the sequence 5805 includes (1) a sequence ID, (2) sequence attributes, and (3) the primary collection 5810. The sequence ID identifies the timeline sequence 5805. In some embodiments, a user sets the sequence attributes for the project in the timeline. For example, the user might have specified several settings that correspond to these sequence attributes when creating the project.

The primary collection 5810 includes the collection ID and the array of clips. The collection ID identifies the primary collection. The array includes several clips (i.e., clip 1 to clip N). These represent clips or collections that have been added to the timeline. In some embodiments, the array is ordered based on the locations of media clips in the timeline and only includes clips in the primary lane of the primary collection. The application assumes that there is no gap between these items, and thus no timing data is needed between the items. When a clip collection stored in an event is added to a project in a timeline, some embodiments remove a sequence container data structure and copy the rest of the data structure (e.g., the clip and its components) into the data structure for the clip in the timeline.

As shown in FIG. 58, the clip 5815 includes (1) a clip ID, (2) range attributes, (3) a set of keywords, and (4) a set of markers. The clip ID uniquely identifies the clip 5815. In some embodiments, the range attributes indicate a total range and/or trimmed ranges associated with the clip 5815. In some embodiments, the clip 5815 is a compound clip that includes multiple clips. An example of a compound clip is described above by reference to FIG. 7.

In some embodiments, the clip 5815 includes a set of anchored items. Some embodiments include a set of anchored items for each clip or collection object. For example, each first clip that is anchored to a second clip may store an anchor offset that indicates a particular instance in time along the range of the second clip. That is, the anchor offset may indicate that the first clip is anchored x number of seconds and/or frames into the second clip. These times refer to the trimmed ranges of the clips in some embodiments.

In some embodiments, the timeline search tool displays the list of clips and provides a selectable link to each clip based on the array of clips. For example, the ordering of the clips in the array and the range attributes provide indications of starting and ending points along the timeline of each clip. As mentioned above by reference to FIG. 5, each clip can include other clip attributes such as one or more components, clip objects, notes, etc.

The keyword set 5820 represents keywords associated with the clip 5815. An example of such a keyword set is described above by reference to FIG. 5. As mentioned, the keyword set 5820 includes one or more keywords that are associated with a particular range of the clip 5815. In some embodiments, the keyword's range attributes indicate a starting point and an ending point of the range of a clip that is associated with the keyword. This may include the actual start time and end time. In some embodiments, the range attributes may be expressed differently. For example, instead of a start time and an end time, the range may be expressed as a start time and duration (from which the end time can be derived).

The marker 5825 includes a marker ID and range attributes. The marker ID identifies the marker 5825. In contrast to a keyword's range attributes, which may indicate a range or duration of time, the range attributes of the marker 5825 only indicate a single instance in time, in some embodiments. In addition, the marker 5825 may include attributes related a note field, an attribute which indicates whether the marker is a to-do marker, etc.

In some embodiments, the timeline search tool displays the list of keywords and markers, and provides a selectable link to each of these items based the marker and keyword associations of the clips in the array of clips. That is, the ordering of the clips, each clip's range attributes, each marker or keyword's range attributes all provide an indication of where each associated keyword or marker is located along the timeline.

One of ordinary skill will also recognize that the objects and data structures shown in FIG. 58 are just a few of many different possible configurations for a timeline search tool of some embodiments. For example, a keyword set may be represented as a single keyword instead of a set of one or more keywords. In some such embodiments, each keyword is associated with its own range attribute. Also, additional information regarding data structures are described in U.S. patent application Ser. No. 13/111,912, now published as U.S. Publication 2012/0209889, entitled "Data Structures for a Media-Editing Application". This Application is incorporated in the present application by reference.

XI. Software Architecture

Figure 59:
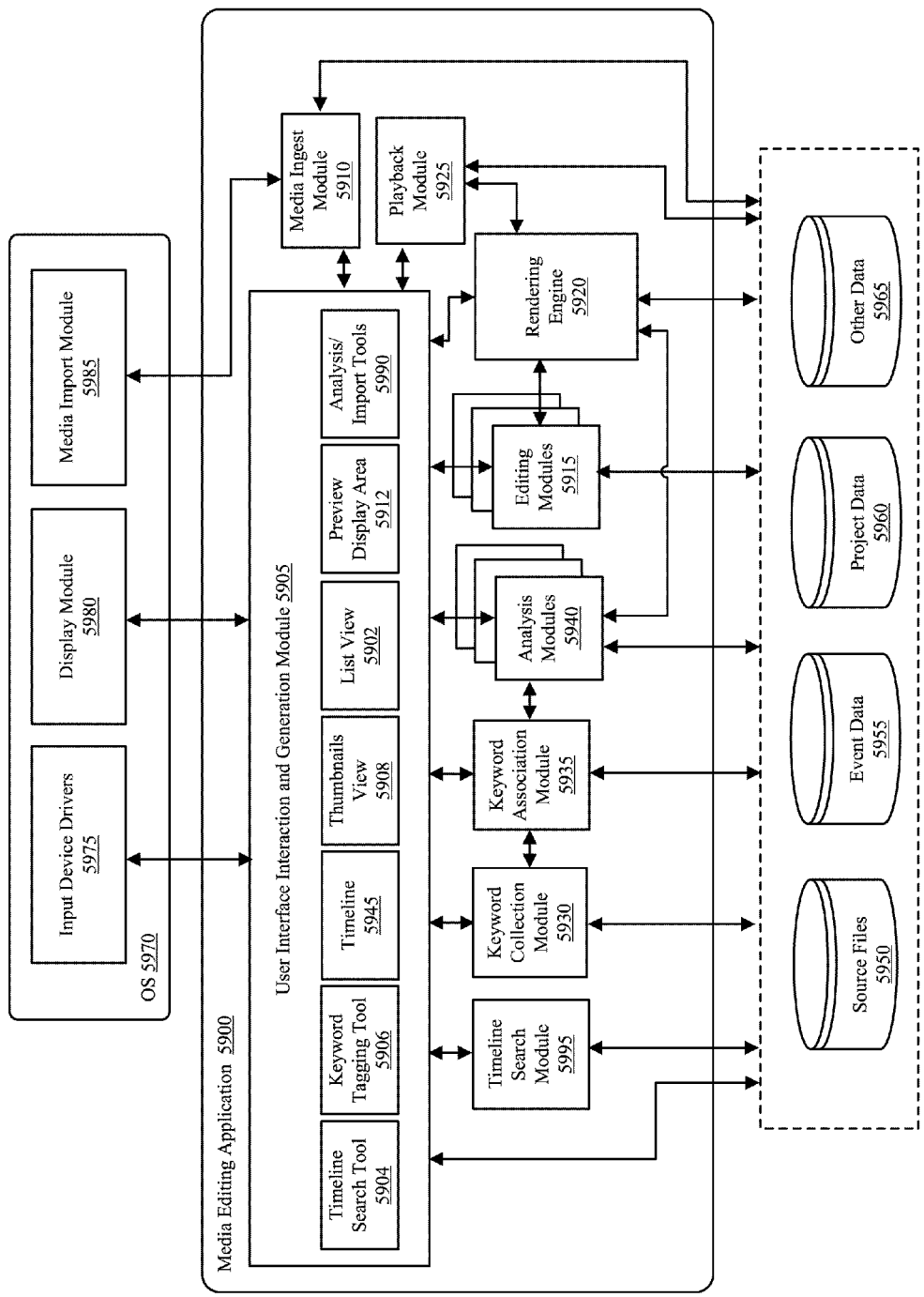
FIG. 59 conceptually illustrates a software architecture of a media editing application of some embodiments.

In some embodiments, the processes described above are implemented as software running on a particular machine, such as a computer or a handheld device, or stored in a machine readable medium. FIG. 59 conceptually illustrates the software architecture of a media editing application 5900 of some embodiments. In some embodiments, the media editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 5900 includes a user interface (UI) interaction and generation module 5905, a media ingest module 5910, editing modules 5915, a rendering engine 5920, a playback module 5925, analysis modules 5940, a keyword association module 5935, a keyword collection module 5930, and a timeline search module 5995. As shown, the user interface interaction and generation module 5905 generates a number of different UI elements, including a keyword tagging tool 5906, a timeline 5945, a timeline search tool 5904, a thumbnails view 5908, a list view 5902, a preview display area 5912, and a set of analysis and import tools 5990.

The figure also illustrates stored data associated with the media-editing application: source files 5950, event data 5955, project data 5960, and other data 5965. In some embodiments, the source files 5950 store media files (e.g., video files, audio files, combined video and audio files, etc.) imported into the application. The source files 5950 of some embodiments also store transcoded versions of the imported files as well as analysis data (e.g., people detection data, shake detection data, color balance data, etc.). The event data 5955 stores the events information used by some embodiments to populate the thumbnails view 5908 (e.g., filmstrip view) and the list view 5902. The event data 5955 may be a set of clip object data structures stored as one or more SQLite database (or other format) files in some embodiments. The project data 5960 stores the project information used by some embodiments to specify a composite presentation in the timeline 5945. The project data 5960 may also be a set of clip object data structures stored as one or more SQLite database (or other format) files in some embodiments.

In some embodiments, the four sets of data 5950-5965 are stored in a single physical storage (e.g., an internal hard drive, external hard drive, etc.). In some embodiments, the data may be split between multiple physical storages. For instance, the source files might be stored on an external hard drive with the event data, project data, and other data on an internal drive. Some embodiments store event data with their associated source files and render files in one set of folders, and the project data with associated render files in a separate set of folders.

FIG. 59 also illustrates an operating system 5970 that includes input device driver(s) 5975, display module 5980, and media import module 5985. In some embodiments, as illustrated, the device drivers 5975, display module 5980, and media import module 5985 are part of the operating system 5970 even when the media editing application 5900 is an application separate from the operating system 5970.

The input device drivers 5975 may include drivers for translating signals from a keyboard, mouse, touchpad, tablet, touchscreen, etc. A user interacts with one or more of these input devices, each of which send signals to its corresponding device driver. The device driver then translates the signals into user input data that is provided to the UI interaction and generation module 5905.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 5980 translates the output of a user interface for a display device. That is, the display module 5980 receives signals (e.g., from the UI interaction and generation module 5905) describing what should be displayed and translates these signals into pixel information that is sent to the display device. The display device may be an LCD, plasma screen, CRT monitor, touchscreen, etc.

The media import module 5985 receives media files (e.g., audio files, video files, etc.) from storage devices (e.g., external drives, recording devices, etc.) through one or more ports (e.g., a USB port, Firewire port, etc.) of the device on which the application 5900 operates and translates this media data for the media-editing application or stores the data directly onto a storage of the device.

The UI interaction and generation module 5905 of the media editing application 5900 interprets the user input data received from the input device drivers 5975 and passes it to various modules, including the timeline search module 5995, the editing modules 5915, the rendering engine 5920, the playback module 5925, the analysis modules 5940, the keyword association module 5935, and the keyword collection module 5930. The UI interaction and generation module 5905 also manages the display of the UI, and outputs this display information to the display module 5980. This UI display information may be based on information from the editing modules 5915, the playback module 5925, and the data 5950-5965. In some embodiments, the UI interaction and generation module 5905 generates a basic GUI and populates the GUI with information from the other modules and stored data.

As shown, the UI interaction and generation module 5905, in some embodiments, generates a number of different UI elements. These elements, in some embodiments, include the keyword tagging tool 5906, the timeline 5945, the timeline search tool 5904, the thumbnails view 5908, the list view 5902, the preview display area 5912, and the set of analysis/import tools 5990. All of these UI elements are described in many different examples above. For example, several operations performed with the thumbnails view 5908 are described above by reference to FIGS. 1-3 and 6-16. Several example operations performed with the list view 5902 are described above by reference to FIGS. 34-45. Also, several example operations performed with the set of analysis/import tools 5990 are described above by reference to FIGS. 24-28. In addition, several example operations performed with the timeline 5945 and the timeline search tool 5904 are described above by reference to FIGS. 46-57. Further, several example operations performed with the keyword tagging tool 5906 are described above by reference to FIGS. 18-23. As mentioned, the media editing application, in some embodiments, maintains a database of previous user input or interactions to provide an auto-complete feature. The media editing application, in some embodiments, maintains a list of common production and/or editing terms. In some embodiments, these data items are stored in the storage 5965.

The media ingest module 5910 manages the import of source media into the media-editing application 5900. Some embodiments, as shown, receive source media from the media import module 5985 of the operating system 5970. The media ingest module 5910 receives instructions through the UI interaction and generation module 5905 as to which files should be imported, then instructs the media import module 5985 to enable this import (e.g., from an external drive, from a camera, etc.). The media ingest module 5910 stores these source files 5950 in specific file folders associated with the application. In some embodiments, the media ingest module 5910 also manages the creation of event data structures upon import of source files and the creation of the clip and asset data structures contained in the events.

The editing modules 5915 include a variety of modules for editing media in the clip browser as well as in the timeline. The editing modules 5915 handle the creation of projects, addition and subtraction of clips from projects, trimming or other editing processes within the timeline, application of effects and transitions, or other editing processes. In some embodiments, the editing modules 5915 create and modify project and clip data structures in both the event data 5955 and the project data 5960.

The rendering engine 5920 handles the rendering of images for the media-editing application. In some embodiments, the rendering engine 5920 manages the creation of images for the media-editing application. When an image is requested by a destination within the application (e.g., the playback module 5925) the rendering engine 5920 outputs the requested image according to the project or event data. The rendering engine 5920 retrieves the project data or event data that identifies how to create the requested image and generates a render graph that is a series of nodes indicating either images to retrieve from the source files or operations to perform on the source files. In some embodiments, the rendering engine 5920 schedules the retrieval of the necessary images through disk read operations and the decoding of those images.

In some embodiments, the render engine 5920 performs various operations to generate an output image. In some embodiments, these operations include blend operations, effects (e.g., blur or other pixel value modification operations), color space conversions, resolution transforms, etc. In some embodiments, one or more of these processing operations are actually part of the operating system and are performed by a GPU or CPU of the device on which the application 5900 operates. The output of the rendering engine (a rendered image) may be stored as render files in storage 5965 or sent to a destination for additional processing or output (e.g., playback).

The playback module 5925 handles the playback of images (e.g., in a preview display area 5912 of the user interface). Some embodiments do not include a playback module and the rendering engine directly outputs its images for integration into the GUI, or directly to the display module 5980 for display at a particular portion of the display device.

The analysis modules 5940 perform analysis on clips. Each module may perform a particular type of analysis. Examples of such analysis include analysis of the number of people in the clip (e.g., one person, two persons, group) and/or a type of shot (e.g., a close-up, medium, or wide shot). Other types of analysis may include image stabilization analysis (e.g., camera movement), color balance analysis, audio analysis (e.g., mono, stereo, silent channels), metadata analysis, etc. As shown, the analysis modules 5940, in some embodiments, utilize the rendering engine 5920 to create copies of corrected media clips. For example, when excessive shake is detected in a portion of clip, the rendering engine 5920 may create a corrected version the clip.

In some embodiments, the analysis modules 5940 operate in conjunction with the keyword association module 5935 to associate each analyzed clip (e.g., a portion of a clip or an entire clip) with one or more keywords. For example, the keyword association module 5935 may receive range attributes from the analysis modules 5940 to associate a range of a clip with a keyword. In some embodiments, the keyword association module 5935 associates a clip object or a collection object with a keyword set. The association of a keyword set with a clip object or collection object is described above by reference to FIG. 5.

In some embodiments, the keyword collection module 5930 facilitates creation and deletion of keyword collections. For example, the keyword collection module 5930 may operate in conjunction with the keyword association module 5935 to create a keyword collection for each clip or portion of a clip associated with a keyword. The keyword collection module 5930, in some embodiments, allows a user to create or delete a keyword collection for a particular keyword prior to the particular keyword being associated with any clips. For example, the user can create different keyword collections, and then drag and drop different portions of clips to create the keyword association.

The timeline search module 5995 facilitates the search and navigation of the timeline 5945. In some embodiments, the search and navigation is based on a sequence associated with the timeline 5945. For example, a sequence in the timeline may include multiple different clips. Each clip may include range attributes indicating its position along the sequence. In some embodiments, based on the sequence and the range attributes, the timeline search module 5995 provides links to clip or collection objects that allow the timeline 5945 to be navigated. In some embodiments, the timeline search module 5995 provides a list of other items (e.g., keywords, markers) and a selectable link to each of these items based associations of the items with the clips or collections in the sequence. That is, the ordering of the clips, each clip's range attributes, and each item's range attributes all provide an indication of the location along the timeline of each item. In some embodiments, the timeline search module 5995 provides a search result by filtering the list of items in the timeline search tool 5904. Several examples of filtering the list of items in a timeline search tool are described above by reference to FIGS. 53 and 54.

While many of the features of the media-editing application 5900 have been described as being performed by one module (e.g., the UI interaction and generation module 5905, the media ingest module 5910, etc.), one of ordinary skill in the art will recognize that the functions described herein might be split up into multiple modules. Similarly, functions described as being performed by multiple different modules might be performed by a single module in some embodiments (e.g., the playback module 5925 might be part of the UI interaction and generation module 5905).

XII. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. "Computer" is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 60:
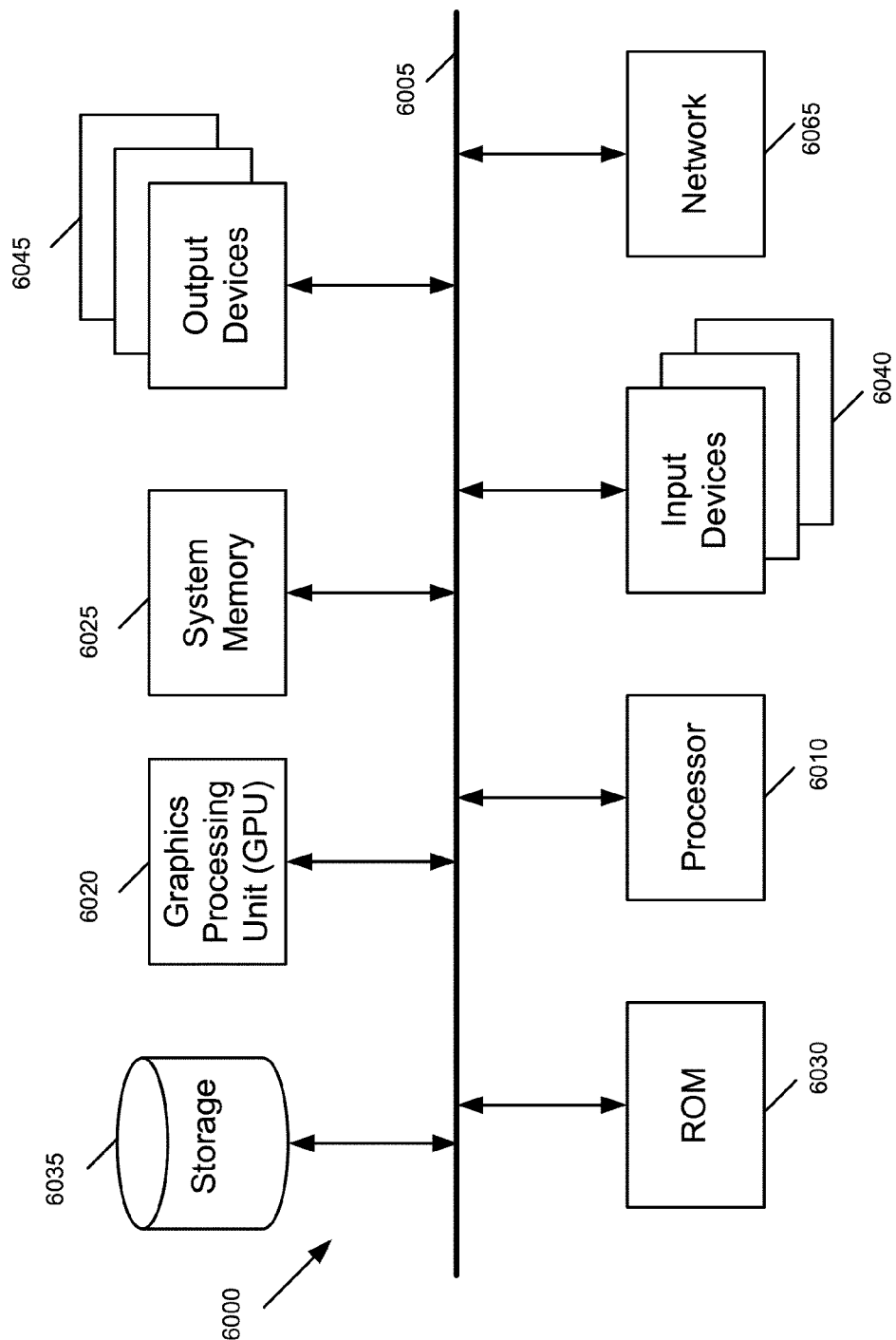
FIG. 60 conceptually illustrates an electronic system with which some embodiments of the invention are implemented.

FIG. 60 illustrates a computer system with which some embodiments of the invention are implemented. Such a computer system includes various types of computer readable media and interfaces for various other types of computer readable media. Computer system 6000 includes a bus 6005, at least one processing unit (e.g., a processor) 6010, a graphics processing unit (GPU) 6020, a system memory 6025, a read-only memory 6030, a permanent storage device 6035, input devices 6040, and output devices 6045.

The bus 6005 collectively represents all system, peripheral, and chipset buses that communicatively connect the numerous internal devices of the computer system 6000. For instance, the bus 6005 communicatively connects the processor 6010 with the read-only memory 6030, the GPU 6020, the system memory 6025, and the permanent storage device 6035.

From these various memory units, the processor 6010 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 6020. The GPU 6020 can offload various computations or complement the image processing provided by the processor 6010.

The read-only-memory (ROM) 6030 stores static data and instructions that are needed by the processor 6010 and other modules of the computer system. The permanent storage device 6035, on the other hand, is a read-and-write memory device. This device is a non-volatile memory unit that stores instructions and data even when the computer system 6000 is off. Some embodiments of the invention use a mass storage device (such as a magnetic or optical disk and its corresponding disk drive) as the permanent storage device 6035.

Other embodiments use a removable storage device (such as a floppy disk, flash drive, or ZIP® disk, and its corresponding disk drive) as the permanent storage device. Like the permanent storage device 6035, the system memory 6025 is a read-and-write memory device. However, unlike storage device 6035, the system memory is a volatile read-and-write memory such as a random access memory. The system memory stores some of the instructions and data that the processor needs at runtime. In some embodiments, the invention's processes are stored in the system memory 6025, the permanent storage device 6035, and/or the read-only memory 6030. For example, the various memory units include instructions for processing multimedia items in accordance with some embodiments. From these various memory units, the processor 6010 retrieves instructions to execute and data to process in order to execute the processes of some embodiments.

The bus 6005 also connects to the input and output devices 6040 and 6045. The input devices enable the user to communicate information and commands to the computer system. The input devices 6040 include alphanumeric keyboards and pointing devices (also called "cursor control devices"). The output devices 6045 display images generated by the computer system. The output devices include printers and display devices, such as cathode ray tubes (CRT) or liquid crystal displays (LCD).

Finally, as shown in FIG. 60, bus 6005 also couples the computer 6000 to a network 6065 through a network adapter (not shown). In this manner, the computer can be a part of a network of computers (such as a local area network ("LAN"), a wide area network ("WAN"), an intranet, or a network of networks such as the Internet. Any or all components of computer system 6000 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by a device such as an electronics device, a microprocessor, a processor, a multi-processor (e.g., a chip with several processing units on it) and includes sets of instructions for performing various operations. The computer program excludes any wireless signals, wired download signals, and/or any other ephemeral signals Examples of hardware devices configured to store and execute sets of instructions include, but are not limited to, application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The present application describes a graphical user interface that provides users with numerous ways to perform different sets of operations and functionalities. In some embodiments, these operations and functionalities are performed based on different commands that are received from users through different input devices (e.g., keyboard, track pad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

While the invention has been described with reference to numerous specific details, one of ordinary skill in the art will recognize that the invention can be embodied in other specific forms without departing from the spirit of the invention. In addition, a number of the Figures (including FIGS. 17, 40, 41, 28, and 57) conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process.

What is claimed is:

1. A non-transitory machine readable medium storing a program having a user interface (UI), the program for execution by at least one processing unit, the UI comprising:

a timeline for creating a composite presentation from a plurality of media clips associated with a plurality of tags, each tag associating with one or more ranges of one or more media clips, each range spanning from a starting point along a duration of a media clip to an ending point, wherein a set of media clips is associated with a set of markers, each marker associating with a particular point in a duration of a media clip, the set of markers comprising at least one task marker, the task marker indicating whether a task is complete or incomplete; and a timeline search tool for:

displaying the plurality of tags as user-selectable items;

when a user-selectable item for a tag is selected, navigating the timeline to a starting point of a range of a media clip that associates with the tag and selecting the range of the media clip from the starting point to the range's ending point; and when a user-selectable item for a marker associating with a media clip is selected, navigating the timeline to the particular point in the duration of the media clip that associates with the marker.

2. The non-transitory machine readable medium of claim 1, wherein the timeline search tool is further for:

displaying a list of all media clips that are in the timeline and are part of the composite presentation; and navigating the timeline to a media clip and selecting the media clip in the timeline when the media clip is selected from the list of media clips.

3. The non-transitory machine readable medium of claim 1, wherein the timeline search tool is further for receiving a search parameter and filtering the plurality of tags displayed in the timeline search tool to display only each tag that satisfies the search parameter.

4. The non-transitory machine readable medium of claim 1, wherein the plurality of tags comprises at least a keyword that marks both the starting and ending points of the keyword's range along the duration of the media clip.

5. The non-transitory machine readable medium of claim 1, wherein the set of markers further comprises at least a ratings marker, the ratings marker associated with a rating.

6. The non-transitory machine readable medium of claim 4, wherein the keyword is an analysis keyword that is automatically associated with a range of a media clip based on an analysis of the content of the media clip.

7. The non-transitory machine readable medium of claim 4, wherein the UI further comprises a set of controls for filtering a search to only markers, to only keywords, or to only markers and keywords.

8. The non-transitory machine readable medium of claim 1, wherein the timeline search tool is further for displaying a total time duration of the range associated with the tag when the user-selectable item for the tag is selected.

9. The non-transitory machine readable medium of claim 1, wherein a selection of multiple user-selectable items for multiple tags displays a total time duration of different ranges associated with the multiple tags.

10. The non-transitory machine readable medium of claim 1, wherein the timeline search tool is further for displaying the plurality of media clips as a plurality of user selectable items, and displaying a total time duration of a particular media clip when a user selectable item corresponding to the particular media clip is selected.

11. The non-transitory machine readable medium of claim 10, wherein a selection of multiple user-selectable items corresponding to different media clips displays a total time duration of the different media clips.

12. A method for providing a user interface (UI), the method comprising:
  providing a timeline for creating a composite presentation from a plurality of media clips associated with a plurality of tags, each tag associating with one or more ranges of one or more media clips, each range spanning from a starting point along a duration of a media clip to an ending point, wherein a set of media clips is associated with a set of markers, each marker associating with a particular point in a duration of a media clip, the set of markers comprising at least one task marker, the task marker indicating whether a task is complete or incomplete; and
  providing a timeline search tool for:
    displaying the plurality of tags as a list of user-selectable items;
    searching for one or more ranges of media clips in the timeline by filtering the list to only display each tag that satisfies a search parameter;
    navigating the timeline to a starting point of a tag's range in a media clip when a user-selectable item corresponding to the tag is selected from the timeline search tool; and
    navigating the timeline to a marker's point in a duration of a media clip when a user-selectable item corresponding to the marker is selected from the timeline search tool.

13. The method of claim 12 further comprising providing a preview display area for displaying a preview of the composite presentation starting from the starting point of the tag's range when the user-selectable item for the tag is selected from the timeline search tool.

14. The method of claim 12, wherein a selection of multiple user-selectable items corresponding to different tags associated with different media clips displays a total duration of the different tags.

15. The method of claim 12, wherein the timeline search tool is further for:
  displaying a list of all media clips that are in the timeline and are part of the composite presentation; and
  searching for one or more media clips in the timeline by filtering the list to only display each media clip that satisfies a search parameter.

16. The method of claim 15, wherein the timeline search tool further comprises a set of controls for specifying whether to search for only video clips or only audio clips in the timeline.

17. The method of claim 15, wherein the timeline search tool further comprises at least one control for specifying whether to search for only title clips in the timeline.

18. The method of claim 12, wherein the timeline search tool is further for searching the timeline for task markers.

19. The method of claim 18, wherein the timeline displays a user-selectable item for each task marker, each user selectable item allowing a user to specify whether a task is complete or incomplete.

20. A non-transitory machine readable medium storing a program having a user interface (UI), the program for execution by at least one processing unit, the UI comprising:
  a timeline for creating a composite presentation from a plurality of media clips associated with a plurality of tags, each tag associating with one or more ranges of one or more media clips, each range spanning from a starting point along a duration of a media clip to an ending point, wherein a set of media clips is associated with a set of markers, each marker associating with a particular point in a duration of a media clip, the set of markers comprising at least one task marker, the task marker indicating whether a task is complete or incomplete; and
  a timeline search tool for:
    displaying the plurality of tags as a list of user-selectable items;
    searching for one or more ranges of media clips in the timeline by filtering the list to only display each tag that satisfies a search parameter;
    navigating the timeline to a starting point of a tag's range in a media clip when a user-selectable item corresponding to the tag is selected from the timeline search tool; and
    navigating the timeline to a marker's point in a duration of a media clip when a user-selectable item corresponding to the marker is selected from the timeline search tool.

21. The non-transitory machine readable medium of claim 20, wherein the UI further comprises a playhead that moves along the timeline to the starting point of the tag's range in the media clip when the user-selectable item corresponding to the tag is selected from the timeline search tool.

22. The non-transitory machine readable medium of claim 21, wherein the playhead moves along the timeline to the marker's point in duration of the media clip when the user-selectable item corresponding to the marker is selected from the timeline search tool.

23. The non-transitory machine readable medium of claim 21, wherein the playhead is a first playhead, wherein the timeline search tool displays the plurality of media clips as an ordered sequence of media clips, the UI further comprising a second playhead that moves, synchronously with the first playhead, along the ordered sequence.

24. The non-transitory machine readable medium of claim 20, wherein the timeline search tool is further for:
displaying a list of all media clips that are in the timeline and are part of the composite presentation; and
searching for one or more media clips in the timeline by filtering the list to only display each media clip that satisfies a search parameter.

25. The non-transitory machine readable medium of claim 24, wherein the UI further comprises a preview display area that displays a preview of the media clip when the media clip is selected.

26. The non-transitory machine readable medium of claim 20, wherein the timeline search tool is further for searching the timeline for each missing clip that does not link back to a source file.

\* \* \* \* \*